United States Patent
Bapat et al.

(10) Patent No.: US 11,386,285 B2
(45) Date of Patent: *Jul. 12, 2022

(54) SYSTEMS AND METHODS OF PERSON RECOGNITION IN VIDEO STREAMS

(71) Applicant: GOOGLE LLC, Mountain View, CA (US)

(72) Inventors: Akshay R. Bapat, Mountain View, CA (US); George Alban Heitz, Mountain View, CA (US); Rizwan Ahmed Chaudhry, Palo Alto, CA (US); Navneet Dalal, Atherton, CA (US); James Edward Stewart, Mountain View, CA (US); Jennifer Bush, Mountain View, CA (US); Joe Delone Venters, Alameda, CA (US); Kara Gates, Mountain View, CA (US); Timothy Butler, Mountain View, CA (US); Yohannes Kifle, San Carlos, CA (US); Anton Bastov, Mountain View, CA (US)

(73) Assignee: Google LLC, Mountain View, CA (US)

(*) Notice: Subject to any disclaimer, the term of this patent is extended or adjusted under 35 U.S.C. 154(b) by 63 days.

This patent is subject to a terminal disclaimer.

(21) Appl. No.: 16/888,379

(22) Filed: May 29, 2020

(65) Prior Publication Data

US 2020/0293818 A1 Sep. 17, 2020

Related U.S. Application Data

(63) Continuation of application No. 16/565,365, filed on Sep. 9, 2019, now Pat. No. 10,685,257, which is a (Continued)

(51) Int. Cl.
*G06K 9/62* (2022.01)
*H04N 7/18* (2006.01)
(Continued)

(52) U.S. Cl.
CPC .......... *G06K 9/6218* (2013.01); *G06V 20/46* (2022.01); *G06V 40/10* (2022.01);
(Continued)

(58) Field of Classification Search
CPC ............. G06K 9/6218; G06K 9/00362; G06K 9/00744; G06K 9/00228; G06K 9/00268;
(Continued)

(56) References Cited

U.S. PATENT DOCUMENTS 4,967,046 A 10/1990 Priesemuth
5,237,409 A 8/1993 Blum et al.
(Continued)

FOREIGN PATENT DOCUMENTS

EP 1024666 A2 8/2000
JP 2010198755 A 9/2010
(Continued)

OTHER PUBLICATIONS

Application of the Antibody Response, (online), published on Mar. 15, 1999, retrieved on Dec. 20, 2018. Retrieved from http://www.jimmunol.org/content/162/6/3647, all pages.
(Continued)

*Primary Examiner* — Ali Bayat
(74) *Attorney, Agent, or Firm* — Colby Nipper PLLC

(57) ABSTRACT

A method for recognizing persons in video streams includes obtaining a live video stream, detecting a first person in the live video stream, determining from analysis of the live video stream first information that identifies an attribute of the first person, determining based on at least some of the first information that the first person is not identifiable to the computing system, storing at least some of the first information, receiving a user classification of the first person as being a stranger, and deleting the stored first information.

20 Claims, 21 Drawing Sheets

Related U.S. Application Data continuation of application No. 15/676,848, filed on Aug. 14, 2017, now Pat. No. 10,410,086.

(60) Provisional application No. 62/512,697, filed on May 30, 2017.

(51) Int. Cl.
| | |
|---|---|
| *G08B 13/196* | (2006.01) |
| *G06V 20/40* | (2022.01) |
| *G06V 40/10* | (2022.01) |
| G06F 16/45 | (2019.01) |
| G06V 40/16 | (2022.01) |
| H04N 5/232 | (2006.01) |

(52) U.S. Cl.
CPC ... *G08B 13/1966* (2013.01); *G08B 13/19645* (2013.01); *G08B 13/19663* (2013.01); *G08B 13/19697* (2013.01); *H04N 7/18* (2013.01); G06F 16/45 (2019.01); G06V 20/44 (2022.01); G06V 40/161 (2022.01); G06V 40/168 (2022.01); G06V 40/172 (2022.01); H04N 5/23219 (2013.01)

(58) Field of Classification Search
CPC ..... G06K 9/00288; G06K 2009/00738; G06K 2009/00328; G06K 9/00295; G06K 9/00778; G06K 2209/27; G08B 13/19645; G08B 13/1966; G08B 13/19663; G08B 13/19697; H04N 7/18; H04N 5/23219; G06F 16/45
USPC ........................................................ 382/118
See application file for complete search history.

(56) References Cited

U.S. PATENT DOCUMENTS

| | | |
|---|---|---|
| D339,543 S | 9/1993 | Martin |
| 6,046,745 A | 4/2000 | Moriya et al. |
| 6,144,375 A | 11/2000 | Jain et al. |
| D450,059 S | 11/2001 | Itou |
| 6,366,296 B1 | 4/2002 | Boreczky et al. |
| 6,400,378 B1 | 6/2002 | Snook |
| 6,424,370 B1 | 7/2002 | Courtney |
| 6,476,858 B1 | 11/2002 | Ramirez-Diaz et al. |
| 6,496,598 B1 | 12/2002 | Harman |
| 6,535,793 B2 | 3/2003 | Allard |
| 6,571,050 B1 | 5/2003 | Park |
| 6,600,784 B1 | 7/2003 | Divakaran et al. |
| 6,611,653 B1 | 8/2003 | Kim et al. |
| 6,628,835 B1 | 9/2003 | Brill et al. |
| 6,643,416 B1 | 11/2003 | Daniels et al. |
| 6,647,200 B1 | 11/2003 | Tanaka |
| D483,281 S | 12/2003 | Cobigo |
| 6,665,423 B1 | 12/2003 | Mehrotra et al. |
| 6,697,103 B1 | 2/2004 | Fernandez |
| 6,741,977 B1 | 5/2004 | Nagaya et al. |
| D491,956 S | 6/2004 | Ombao et al. |
| 6,792,676 B2 | 9/2004 | Haji et al. |
| 6,816,184 B1 | 11/2004 | Brill et al. |
| D499,740 S | 12/2004 | Ombao et al. |
| D510,584 S | 10/2005 | Tierney |
| 6,970,183 B1 | 11/2005 | Monroe |
| 7,016,415 B2 | 3/2006 | Alvarez |
| 7,023,469 B1 | 4/2006 | Olson |
| 7,142,600 B1 | 11/2006 | Schonfeld et al. |
| D555,661 S | 11/2007 | Kim |
| 7,403,116 B2 | 7/2008 | Bittner |
| 7,421,455 B2 | 9/2008 | Hua et al. |
| 7,421,727 B2 | 9/2008 | Ova et al. |
| 7,433,493 B1 | 10/2008 | Miyoshi et al. |
| 7,440,613 B2 | 10/2008 | Xu |
| 7,447,337 B2 | 11/2008 | Zhang et al. |
| D584,749 S | 1/2009 | Smith et al. |
| D590,412 S | 4/2009 | Saft et al. |
| D607,001 S | 12/2009 | Ording |
| 7,629,995 B2 | 12/2009 | Salivar et al. |
| 7,685,519 B1 | 3/2010 | Duncan et al. |
| 7,760,908 B2 | 7/2010 | Curtner |
| 7,765,482 B2 | 7/2010 | Wood et al. |
| D621,413 S | 8/2010 | Rasmussen |
| D625,323 S | 10/2010 | Matsushima et al. |
| 7,813,525 B2 | 10/2010 | Aggarwal |
| 7,823,066 B1 | 10/2010 | Kuramura |
| 7,920,626 B2 | 4/2011 | Fernandez et al. |
| 7,924,323 B2 | 4/2011 | Walker et al. |
| D638,025 S | 5/2011 | Saft et al. |
| 7,995,056 B1 | 8/2011 | Cressy et al. |
| 8,115,623 B1 | 2/2012 | Green |
| 8,122,038 B2 | 2/2012 | Handy et al. |
| 8,130,839 B2 | 3/2012 | Kawashima et al. |
| 8,200,669 B1 | 6/2012 | Lampietro et al. |
| 8,204,273 B2 | 6/2012 | Chambers et al. |
| 8,284,258 B1 | 10/2012 | Cetin et al. |
| 8,295,597 B1 | 10/2012 | Sharma et al. |
| 8,300,890 B1 | 10/2012 | Gaikwad et al. |
| 8,305,447 B1 | 11/2012 | Wong |
| 8,390,684 B2 | 3/2013 | Piran et al. |
| 8,401,232 B2 | 3/2013 | Fan |
| 8,494,234 B1 | 7/2013 | Bozinovic et al. |
| 8,515,128 B1 | 8/2013 | Hildreth |
| 8,525,665 B1 | 9/2013 | Trundle et al. |
| 8,537,219 B2 | 9/2013 | Desimone et al. |
| D690,757 S | 10/2013 | Bart et al. |
| 8,577,091 B2 | 11/2013 | Ivanov et al. |
| 8,587,653 B1 | 11/2013 | Vidunas et al. |
| 8,613,070 B1 | 12/2013 | Borzycki et al. |
| 8,676,493 B2 | 3/2014 | M et al. |
| 8,688,483 B2 | 4/2014 | Watts |
| 8,707,194 B1 | 4/2014 | Jenkins et al. |
| 8,775,242 B2 | 7/2014 | Tavares |
| 8,780,201 B1 | 7/2014 | Scalisi |
| 8,854,457 B2 | 10/2014 | De Vleeschouwer et al. |
| 8,861,804 B1 | 10/2014 | Johnson |
| 8,902,085 B1 | 12/2014 | Ray et al. |
| 8,941,733 B2 | 1/2015 | Albers et al. |
| 8,941,736 B1 | 1/2015 | Scalisi |
| 8,942,438 B2 | 1/2015 | Ivanov et al. |
| 8,953,848 B2 | 2/2015 | Ivanov et al. |
| 8,958,602 B1 | 2/2015 | Lane et al. |
| 8,966,368 B2 | 2/2015 | Kuramura |
| 8,982,141 B2 | 3/2015 | Freyhult |
| 9,014,429 B2 | 4/2015 | Badawy |
| 9,025,836 B2 | 5/2015 | Ptucha |
| 9,064,393 B2 | 6/2015 | He |
| 9,082,018 B1 | 7/2015 | Laska et al. |
| 9,124,858 B2 | 9/2015 | Jang et al. |
| 9,158,974 B1 | 10/2015 | Laska et al. |
| 9,172,911 B2 | 10/2015 | Kristiansen et al. |
| 9,213,903 B1 | 12/2015 | Laska et al. |
| 9,269,243 B2 | 2/2016 | Shet et al. |
| 9,325,905 B2 | 4/2016 | Noyes |
| 9,361,011 B1 | 6/2016 | Burns et al. |
| 9,373,076 B1 | 6/2016 | Appelman |
| D764,958 S | 8/2016 | Scalisi |
| 9,420,331 B2 | 8/2016 | Laska et al. |
| 9,432,631 B2 * | 8/2016 | Allegra ................ H04W 4/029 |
| D765,530 S | 9/2016 | Scalisi |
| 9,449,229 B1 | 9/2016 | Laska et al. |
| 9,479,822 B2 | 10/2016 | Laska et al. |
| 9,516,053 B1 | 12/2016 | Muddu et al. |
| 9,575,178 B2 | 2/2017 | Kanamori et al. |
| D782,495 S | 3/2017 | Laska et al. |
| 9,600,723 B1 | 3/2017 | Pantofaru et al. |
| 9,602,860 B2 | 3/2017 | Laska et al. |
| 9,613,524 B1 | 4/2017 | Lamb et al. |
| 9,621,798 B2 | 4/2017 | Zhang et al. |
| D789,363 S | 6/2017 | Jentz et al. |
| D789,364 S | 6/2017 | Jentz et al. |
| D789,365 S | 6/2017 | Jentz et al. |
| D789,367 S | 6/2017 | Jentz et al. |
| 9,674,453 B1 | 6/2017 | Tangeland et al. |

(56) References Cited

U.S. PATENT DOCUMENTS

| | | |
|---|---|---|
| D793,268 S | 8/2017 | Ye |
| D795,109 S | 8/2017 | Olodort et al. |
| 9,753,994 B2 | 9/2017 | Anderson |
| D800,201 S | 10/2017 | Song |
| D805,570 S | 12/2017 | Shi |
| D806,154 S | 12/2017 | Shi |
| 9,940,523 B2 | 4/2018 | Laska et al. |
| 9,997,053 B2 | 6/2018 | Maneskiold et al. |
| 10,063,815 B1 | 8/2018 | Spivey et al. |
| 10,108,862 B2 | 10/2018 | Laska et al. |
| 10,410,086 B2 | 9/2019 | Bapat et al. |
| 10,685,257 B2 | 6/2020 | Bapat et al. |
| 2001/0024517 A1 | 9/2001 | Labelle |
| 2002/0002425 A1 | 1/2002 | Dossey et al. |
| 2002/0113813 A1 | 8/2002 | Yoshimine |
| 2002/0126224 A1 | 9/2002 | Lienhart |
| 2003/0063093 A1 | 4/2003 | Howard |
| 2003/0101104 A1* | 5/2003 | Dimitrova ............. H04N 7/163 705/27.1 |
| 2004/0100560 A1 | 5/2004 | Stavely et al. |
| 2004/0109059 A1 | 6/2004 | Kawakita |
| 2004/0123328 A1 | 6/2004 | Coffey et al. |
| 2004/0125908 A1 | 7/2004 | Cesmeli |
| 2004/0133647 A1 | 7/2004 | Ozkan et al. |
| 2004/0143602 A1 | 7/2004 | Ruiz et al. |
| 2004/0174434 A1 | 9/2004 | Walker et al. |
| 2005/0047672 A1 | 3/2005 | Ben-Ezra et al. |
| 2005/0057653 A1 | 3/2005 | Maruya |
| 2005/0074140 A1 | 4/2005 | Grasso et al. |
| 2005/0132414 A1 | 6/2005 | Bentley et al. |
| 2005/0151851 A1 | 7/2005 | Schnell |
| 2005/0246119 A1 | 11/2005 | Koodali |
| 2006/0056056 A1 | 3/2006 | Ahiska et al. |
| 2006/0072847 A1 | 4/2006 | Chor et al. |
| 2006/0093998 A1 | 5/2006 | Vertegaal |
| 2006/0195716 A1 | 8/2006 | Bittner |
| 2006/0228015 A1 | 10/2006 | Brockway et al. |
| 2006/0239645 A1 | 10/2006 | Curtner |
| 2006/0274949 A1* | 12/2006 | Gallagher ........... G06K 9/00697 382/228 |
| 2007/0002141 A1 | 1/2007 | Lipton et al. |
| 2007/0014554 A1 | 1/2007 | Sasaki |
| 2007/0041727 A1 | 2/2007 | Lee et al. |
| 2007/0061862 A1 | 3/2007 | Beger et al. |
| 2007/0132558 A1 | 6/2007 | Rowe et al. |
| 2007/0220569 A1 | 9/2007 | Ishii |
| 2007/0257986 A1 | 11/2007 | Ivanov et al. |
| 2008/0051648 A1 | 2/2008 | Suri et al. |
| 2008/0122926 A1 | 5/2008 | Zhou et al. |
| 2008/0170123 A1 | 7/2008 | Alberston et al. |
| 2008/0178069 A1 | 7/2008 | Stallings |
| 2008/0184245 A1 | 7/2008 | St. Jean |
| 2008/0192129 A1 | 8/2008 | Walker et al. |
| 2008/0244453 A1 | 10/2008 | Cafer |
| 2008/0270363 A1 | 10/2008 | Hunt et al. |
| 2008/0303903 A1* | 12/2008 | Bentley ............. G08B 13/19656 348/143 |
| 2008/0316311 A1 | 12/2008 | Albers et al. |
| 2009/0016599 A1 | 1/2009 | Eaton |
| 2009/0018996 A1 | 1/2009 | Hunt et al. |
| 2009/0033746 A1 | 2/2009 | Brown et al. |
| 2009/0100007 A1 | 4/2009 | Campbell et al. |
| 2009/0141939 A1 | 6/2009 | Chambers et al. |
| 2009/0207257 A1 | 8/2009 | Jung et al. |
| 2009/0232416 A1 | 9/2009 | Murashita |
| 2009/0244291 A1 | 10/2009 | Saptharishi et al. |
| 2009/0262189 A1 | 10/2009 | Marman |
| 2009/0288011 A1 | 11/2009 | Piran et al. |
| 2009/0316956 A1 | 12/2009 | Higuchi et al. |
| 2009/0319829 A1 | 12/2009 | Takayama |
| 2010/0002070 A1 | 1/2010 | Ahiska et al. |
| 2010/0002071 A1 | 1/2010 | Ahiska et al. |
| 2010/0002911 A1 | 1/2010 | Wu |
| 2010/0004839 A1 | 1/2010 | Yokoyama et al. |
| 2010/0008547 A1* | 1/2010 | Yagnik ............... G06F 16/70 382/118 |
| 2010/0033573 A1 | 2/2010 | Malinovski et al. |
| 2010/0455594 | 2/2010 | Jenks et al. |
| 2010/0066822 A1* | 3/2010 | Steinberg ........... G06K 9/00208 348/77 |
| 2010/0133008 A1 | 6/2010 | Gawski et al. |
| 2010/0162114 A1 | 6/2010 | Roth |
| 2010/0210240 A1 | 8/2010 | Mahaffey et al. |
| 2010/0245107 A1 | 9/2010 | Fulker et al. |
| 2010/0304731 A1 | 12/2010 | Bratton et al. |
| 2011/0001605 A1 | 1/2011 | Kiani et al. |
| 2011/0167369 A1 | 7/2011 | Van Os |
| 2011/0199488 A1 | 8/2011 | Gorilovskij et al. |
| 2011/0199535 A1 | 8/2011 | Isu et al. |
| 2011/0254972 A1 | 10/2011 | Yaguchi |
| 2011/0255741 A1 | 10/2011 | Jung et al. |
| 2011/0255775 A1 | 10/2011 | McNamer et al. |
| 2011/0291925 A1 | 12/2011 | Israel |
| 2011/0312350 A1 | 12/2011 | Agerholm |
| 2012/0052972 A1 | 3/2012 | Bentley et al. |
| 2012/0098918 A1 | 4/2012 | Murphy |
| 2012/0176496 A1 | 7/2012 | Carbonell et al. |
| 2012/0195363 A1 | 8/2012 | Laganiere et al. |
| 2012/0257000 A1 | 10/2012 | Singhal |
| 2013/0027581 A1 | 1/2013 | Price et al. |
| 2013/0125039 A1 | 5/2013 | Murata |
| 2013/0128022 A1 | 5/2013 | Bose |
| 2013/0145270 A1 | 6/2013 | Piran et al. |
| 2013/0201329 A1 | 8/2013 | Thornton |
| 2013/0242093 A1 | 9/2013 | Cobb et al. |
| 2013/0301939 A1 | 11/2013 | Ochi |
| 2014/0013243 A1 | 1/2014 | Flynn, III |
| 2014/0044404 A1 | 2/2014 | Grundmann et al. |
| 2014/0056479 A1 | 2/2014 | Bobbit et al. |
| 2014/0068349 A1 | 3/2014 | Scott et al. |
| 2014/0075370 A1 | 3/2014 | Guerin et al. |
| 2014/0082497 A1 | 3/2014 | Chalouhi et al. |
| 2014/0098227 A1 | 4/2014 | Chen |
| 2014/0142907 A1 | 5/2014 | Gellaboina et al. |
| 2014/0146125 A1 | 5/2014 | Kristiansen et al. |
| 2014/0149078 A1 | 5/2014 | Lee et al. |
| 2014/0160294 A1 | 6/2014 | Naylor |
| 2014/0172906 A1 | 6/2014 | Sud |
| 2014/0198237 A1 | 7/2014 | Noyes |
| 2014/0210646 A1 | 7/2014 | Subramanya |
| 2014/0300722 A1 | 10/2014 | Garcia |
| 2014/0313142 A1 | 10/2014 | Yairi |
| 2014/0313542 A1 | 10/2014 | Benchorin et al. |
| 2014/0320740 A1 | 10/2014 | Wan et al. |
| 2014/0347475 A1 | 11/2014 | Divakaran et al. |
| 2015/0022660 A1 | 1/2015 | Kavadeles |
| 2015/0046184 A1 | 2/2015 | Cocco et al. |
| 2015/0054949 A1 | 2/2015 | Scalisi |
| 2015/0054981 A1 | 2/2015 | Saiki et al. |
| 2015/0074535 A1 | 3/2015 | Silberstein et al. |
| 2015/0098613 A1 | 4/2015 | Gagvani et al. |
| 2015/0138353 A1 | 5/2015 | Yang et al. |
| 2015/0156030 A1 | 6/2015 | Fadell |
| 2015/0181088 A1 | 6/2015 | Wu et al. |
| 2015/0194134 A1 | 7/2015 | Dureau et al. |
| 2015/0201152 A1 | 7/2015 | Cho et al. |
| 2015/0234571 A1 | 8/2015 | Lee et al. |
| 2015/0235551 A1 | 8/2015 | Maneskiold et al. |
| 2015/0242687 A1 | 8/2015 | Seo |
| 2015/0242994 A1 | 8/2015 | Shen |
| 2015/0279182 A1 | 10/2015 | Kanaujia et al. |
| 2015/0339702 A1 | 11/2015 | Lin et al. |
| 2015/0341599 A1 | 11/2015 | Carey |
| 2016/0006932 A1 | 1/2016 | Zhang et al. |
| 2016/0006988 A1 | 1/2016 | Zhao |
| 2016/0026862 A1 | 1/2016 | Anderson |
| 2016/0027196 A1 | 1/2016 | Schiffer |
| 2016/0041724 A1 | 2/2016 | Kirkby et al. |
| 2016/0042621 A1 | 2/2016 | Hogg et al. |
| 2016/0072831 A1 | 3/2016 | Rieke |
| 2016/0092737 A1 | 3/2016 | Laska et al. |
| 2016/0092738 A1 | 3/2016 | Laska et al. |
| 2016/0103559 A1 | 4/2016 | Maheshwari et al. |

(56) References Cited

U.S. PATENT DOCUMENTS

| | | | |
|---|---|---|---|
| 2016/0103887 | A1 | 4/2016 | Fletcher et al. |
| 2016/0110612 | A1 | 4/2016 | Sabripour |
| 2016/0117951 | A1 | 4/2016 | Fleischer et al. |
| 2016/0189531 | A1 | 6/2016 | Modi et al. |
| 2016/0195716 | A1 | 7/2016 | Nakanuma |
| 2016/0219248 | A1 | 7/2016 | Reznik et al. |
| 2016/0235344 | A1 | 8/2016 | Auerbach |
| 2016/0241818 | A1 | 8/2016 | Palanisamy et al. |
| 2016/0274771 | A1 | 9/2016 | Seong |
| 2016/0307418 | A1 | 10/2016 | Pantus et al. |
| 2016/0316176 | A1 | 10/2016 | Laska et al. |
| 2016/0316256 | A1 | 10/2016 | Laska et al. |
| 2016/0321257 | A1 | 11/2016 | Chen |
| 2016/0321889 | A1 | 11/2016 | Gagvani et al. |
| 2016/0335861 | A1 | 11/2016 | Shimura |
| 2016/0360116 | A1 | 12/2016 | Penha et al. |
| 2016/0366036 | A1 | 12/2016 | Gupta |
| 2016/0371534 | A1* | 12/2016 | Koul ..................... G06K 9/325 |
| 2017/0019605 | A1 | 1/2017 | Ahiska et al. |
| 2017/0039729 | A1 | 2/2017 | Wang et al. |
| 2017/0048495 | A1 | 2/2017 | Scalisi |
| 2017/0085843 | A1 | 3/2017 | Scalisi |
| 2017/0111494 | A1 | 4/2017 | Kidron et al. |
| 2017/0123492 | A1 | 5/2017 | Marggraff et al. |
| 2017/0162230 | A1 | 6/2017 | Maliuk et al. |
| 2017/0163929 | A1 | 6/2017 | Maliuk et al. |
| 2017/0180678 | A1 | 6/2017 | Fish et al. |
| 2017/0257612 | A1 | 9/2017 | Emeott et al. |
| 2017/0272706 | A1 | 9/2017 | Jeong |
| 2017/0301203 | A1 | 10/2017 | Matsuura |
| 2018/0004784 | A1 | 1/2018 | Tompkins |
| 2018/0089328 | A1 | 3/2018 | Bath et al. |
| 2018/0096197 | A1 | 4/2018 | Kephart |
| 2018/0121035 | A1 | 5/2018 | Filippi et al. |
| 2018/0139332 | A1 | 5/2018 | Kerzner |
| 2018/0144314 | A1 | 5/2018 | Miller |
| 2018/0182148 | A1 | 6/2018 | Yanagisawa |
| 2018/0218053 | A1 | 8/2018 | Koneru |
| 2018/0219897 | A1 | 8/2018 | Muddu et al. |
| 2018/0249134 | A1 | 8/2018 | Siminoff et al. |
| 2019/0004639 | A1 | 1/2019 | Faulkner |

FOREIGN PATENT DOCUMENTS

| | | | |
|---|---|---|---|
| JP | 2011044171 | A1 | 3/2011 |
| JP | 2012048689 | A | 3/2012 |
| WO | 2007011709 | A2 | 1/2007 |
| WO | 2009138037 | A1 | 11/2009 |
| WO | 2016205213 | A | 12/2016 |
| WO | 2017078793 | A1 | 5/2017 |

OTHER PUBLICATIONS

Author unknown, "Ch. 1 Configuring Main System" (GEOvision), 2009 (Applicant points out, in accordance with MPEP 609.04(a), that the year of publication, 2009, is sufficiently earlier than the effective U.S. filing date, so that the particular month of publication is not in issue.), https://web.archive.org/web/20090520185506/https://videos.cctvcamerapros.com/pdf/geovision/geovision-8-manual-ch1.pdf, 79 pgs.

Ballan et al., Event Detection and Recognition for Semantic Annotation of Video, Multimed Tools App., Jan. 2011, 51:279-302 pgs.

Birk, Deterministic Load-Balancing Schemes for Disk-Based Video-on-Demand Storage Servers, 14 IEEE Symposium on Mass Storage Systems, Sep. 1995, pp. 1725.

Castellanos, Event Detection in Video Using Motion Analysis, 1st ACM Int'l Workshop on Analysis and Retrieval of Tracked Events & Motion in Imagery Streams, Oct. 2010, pp. 57-62.

Central Intelligence Agency, "Words of Estimative Probability", May 25, 2018, 12 pgs.

Clustered/Stacked Filled Bar Graph Generator, (online), website crawled on Mar. 26, 2014, retrieved on Dec. 31, 2018. Retrieved from https://web.archive.org/web/20140326054333/http://www.burningcutlery.com/80/derek/bargraph, all pages.

D.D. Buzan, S. Sclaroff, & G. Kollios, "Extraction & Clustering of Motion Trajectories in Video," 2 Proceedings the 17th Intl Conf on Pattern Recognition 521-524 (Aug. 2004).

Delbruck, Frame-free dynamic digital vision, 2008 Intl Symp. on Secure Life Electronics, Advanced Electronics for Quality Life & Socy, Mar. 2008, pp. 21-26.

Ellis, Model-based vision for automatic alarm interpretation, IEEE 1990 Intl Carnahan conf on Security Tech, Oct. 1990, pp. 62-67.

F. Zhou, F. De La Torre, & J.K. Hodgins, Aligned Cluster Analysis for Temporal Segmentation of Human Motion, 8 IEEE Int'l Conference on Automatic Face & Gesture Recognition 1-7 (Sep. 2008).

F18921W email notification and motion alarm, Jun. 4, 2013, pp. 1-4, http://foscam.us/forum/F18921W-email-notification-and-motion-alarm-t5874.html Google Inc, International Search Report and Written Opinion, PCT/JS2015/039425, dated Sep. 28, 2015, 12 pp.

File.savedemo.png, (online), graph uploaded on Apr. 3, 2014, retrieved on Dec. 20, 2018, retrieved from http://wiki.freepascal.org/File:Savedemo.png, all pages.

Google LLC, EP Patent Certificate, EP Patent No. 3022720, Jan. 31, 2018, 1 pg.

Google LLC, PCT/US2018/046811, International Search Report/Written Opinion, dated Mar. 14, 2019, 16 pp.

Google, Notification of Registration, EU004086437, Jul. 13, 2017, 6 pgs.

Google, Patent Certificate for Design, Certificate No. 4493940, Patent No. ZL201730288012.3, Jan. 30, 2018, 1 pg.

Google. Inc, International Search Report and Written Opinion, PCT/US2015/039425, dated Sep. 28, 2015, 12 pgs.

Graph Maker, (online), graphs uploaded on Oct. 26, 2013, & Oct. 27, 2013 & Nov. 17, 2013, retrieved on Dec. 20, 2018, Retrieved from https://forunn.unitv.conn/threads/released-graph-maker-ugui-ngui-dfgui-line-graphs-bar-graphs-pie-graphs-etc.202437, all pages.

Gresham, Review: izon Wi-Fi Video Monitor and its companion iOS App, Nov. 21, 2012, p. 18, www.idownloadblog.com/2012/11/21/stem-izon-review.

Halliquist, How do I set up activity alerts, 2013 (Applicant points out, in accordance with MPEP 609.04(a), that the year of publication, 2013, is sufficiently earlier than the effective U.S. filing date, so that the particular month of publication is not in issue.), pp. 1-3, http://support.dropcam.com/entries/27880086-How-Do-l-Set-Up-Activity-Alerts.

Histograms, (online), publication date unknown, retrieved on Dec. 20, 2018. retrieved from https://root.cern.ch/root/htmldoc/guides/users-guide/Histograms.html, all pages.

ISPY, Motion Detection Setting Up Motion Detection, Dec. 11, 2011, pp. 1-3, https://www.ispyconnect.com/userguide-motion-detection.aspx.

IZON App Guide, Jun. 2014, pp. 1-30, www.izoncam.com/wp-content/uploads/2014/06/IZON-App-Guide.pdf.

James Drinkwater, "HOWTO: set up motion detection in a Mobotix Network Camera," http://www.networkwebcams.com/ip-camera-learning-center/2010/03/03/howto-set-up-motion-in-a-mobotix-camera/, Mar. 3, 2010.

Jiang et al., High-Level Event Recognition in Unconstrained Videos, Intl J. Multimed Info. Retr., Jun. 2013, 2:73-101 pgs., 2013.

L. Li., Whuang, I.Y.H. Gu, & Q. Tian, "Statistical Modeling of Complex Backgrounds for Foreground Object Detection," 13 IEEE Transactions on Image Processing, 1459-1472, (Nov. 2004).

L.L. Zelnik-Manor, "Event Based Analysis of video," 2 Proceedings of the 2001 IEEE Computer Socy Conf on Computer Vision and Pattern Recognition, pp. 123-130, Feb. 2001.

(56) References Cited

OTHER PUBLICATIONS

Literature Review—Graphical Tools, (Online), publication date unknown, retrieved on Dec. 20, 2018. Retrieved from https://www.stat.auckland.ac.nz/-joh024/LitReviews/LitReviewGraphicalTools.pdf, all pages.

Logitech, Logitech Alert Video Security System: Getting to Know, 2010 (Applicant points out, in accordance with MPEP 609.04(a), that the year of publication, 2010, is sufficiently earlier than the effective U.S. filing date, so that the particular month of publication is not in issue.), pp. 1-9, www.logitech.com/assets/32688/good-to-know.pdf.

M. Camplani, T. Mantecon, & L. Salgado, "Accurate Depth-Color Scene Modeling for 3D Contents Generation with Low Cost Depth Cameras," 19 IEEE Intl Conf. on Image Processing 1741-1744 (Oct. 2012).

Medioni, Event detection and analysis from video streams, 23 IEEE Transactions on Pattern Analysis and Machine Intelligence, Aug. 2001, pp. 873-889.

Revis, How to Set Up Motion Detection of your D-Link Camera, Apr. 9, 2014, pp. 1-8, http://blog.dlink.com/How-to-Set-Up-Motion-Detection-of-your-D-Link-Camera.

Schraml, A spatio temporal clustering method using real-time motion analysis on event based 3-D vision, 2010 IEEE Comp. Socy Conf on Comp. Vision & Pattern Recognition Workshops, Jun. 2010, pp. 57-63.

Shim, A Study of Surveillance System of Objects Abnormal Behavior by Blob Composition Analysis, 8 Intl J of Security & Its Applications, Mar. 2014, pp. 333-340.

Yoon, Event Dectection from MPEG Video in the Compressed Domain, 15th Intl. Conf on Pattern Recognition, Sep. 2000, p. 819-822.

You Tube, Sky News Live A (screenshot of website illustrating live stream video with timeline having preview thumbnail of past images within the stream) accessed Mar. 23, 2016, 2 pp. www.youtube.com/watch?v=y60wDzZt8yg.

Yuri Ivanov and Christopher Wren, "Towards Spacial Queries for Spatial Surveillance Tasks," May 2006, https://www.researchgate.net/profile/yuri 1vanOv2/publication/215439735 Towards Spacial Queries for Spatial Surveillance Tasks/links/0c960539e6408cb328000000.pdf, 1-9 pg.

Google LLC, Extended European Search Report, Application No. 18156967.4, dated Oct. 17, 2018, 12 pgs.

Google LLC, International Search Report | Written Opinion, PCT/US2018/032770, dated Nov. 2, 2018, 18 pgs.

Franco et al, "Incremental template updating for face recognition in home environments," Pattern Recognition 43, Aug. 2010, pp. 2891-2903 Year: 2010).

Akhtar, Zahid, et al. "Biometric template update under facial aging." 2014 IEEE Symposium on Computational Intelligence in Biometrics and Identity Management (CIBIM). IEEE, Dec. 9-12, 2014. (Year: 2014).

Prosecution History from U.S. Appl. No. 15/676,848, dated Apr. 16, 2019 through Aug. 2, 2019, 15 pp.

Prosecution History from U.S. Appl. No. 16/565,365, dated Oct. 29, 2019 through Mar. 31, 2020, 39 pp.

Response to Summons to Attend Oral Proceedings pursuant to Rule 115(1) EPC including Main Request from European Patent Application No. 18156967.4, dated Apr. 22, 2021, filed Oct. 15, 2021, 14 pp.

Main Request and First Auxiliary from European Patent Application No. 18156967.4, filed Oct. 15, 2021, 36 pp.

Second and Third Auxiliary from European Patent Application No. 18156967.4, filed Oct. 15, 2021, 47 pp.

* cited by examiner

SYSTEMS AND METHODS OF PERSON RECOGNITION IN VIDEO STREAMS

RELATED APPLICATIONS

This application is a continuation of U.S. patent application Ser. No. 16/565,365, filed Sep. 9, 2019, which is a continuation of U.S. patent application Ser. No. 15/676,848, filed Aug. 14, 2017 and issued as U.S. Pat. No. 10,410,086 on Sep. 10, 2019, which claims priority to U.S. Provisional Patent Application No. 62/512,697, filed May 30, 2017, each of which is hereby incorporated by reference in its entirety.

This application is related to U.S. patent application Ser. No. 15/676,868, filed Aug. 14, 2017; U.S. patent application Ser. No. 15/207,458, filed Jul. 11, 2016; U.S. patent application Ser. No. 15/207,459, filed Jul. 11, 2016; and U.S. patent application Ser. No. 15/594,518, filed May 12, 2017, each of which is hereby incorporated by reference in its entirety.

TECHNICAL FIELD

This relates generally to analysis of visual information, including but not limited to, recognizing persons in a video stream.

BACKGROUND

Video surveillance produces a large amount of continuous video data over the course of hours, days, and even months. Such video data includes many long and uneventful portions that are of no significance or interest to a reviewer. In some existing video surveillance systems, motion detection is used to trigger alerts or video recording. However, using motion detection as the only means for selecting video segments for user review may still produce too many video segments that are of no interest to the reviewer. For example, some detected motions are generated by normal activities that routinely occur at the monitored location, and it is tedious and time consuming for a reviewer to manually scan through all of the normal activities recorded on video to identify a small number of activities that warrant special attention. In addition, when the sensitivity of the motion detection is set too high for the location being monitored, trivial movements (e.g., movements of tree leaves, shifting of the sunlight, etc.) can account for a large amount of video being recorded and/or reviewed. On the other hand, when the sensitivity of the motion detection is set too low for the location being monitored, the surveillance system may fail to record and present video data on some important and useful events.

It is a challenge to accurately identify and categorize meaningful segments of a video stream, and to convey this information to a user in an efficient, intuitive, and convenient manner. Human-friendly techniques for discovering, categorizing, and notifying users of events of interest are in great need.

SUMMARY

Accordingly, there is a need for systems and/or devices with more efficient, accurate, and intuitive methods for entity (e.g., person) and event identification, categorization, and presentation. Such systems, devices, and methods optionally complement or replace conventional systems, devices, and methods for entity and event identification, categorization, and/or presentation.

Users of home monitoring systems can potentially be bombarded with alerts and notifications about unimportant and trivial events if the systems do not employ some recognition/identification and categorization processes. The large number of unnecessary or incomplete information places a larger burden on the users and makes it more difficult to identify and respond to important events. For example, a user who receives motion notifications every time a household member walks in front of the camera may not be able to distinguish the motion notification for a burglar sneaking through the room. Thus, it is beneficial to be able to recognize the type of event that occurred and the persons involved. For example, rather than sending a notification stating that "motion was detected," the system could send a notification detailing that "an unknown person was detected sneaking through the living room." The user can see at a glance the nature of the event and request more details (e.g., a clip of the event) and/or generate a response (e.g., alert the authorities).

In addition, recognition of individual people in events enables the systems to associate events with the particular persons involved (e.g., the event could be denoted as including the persons involved). For example, a user may wish to see a summary of all events involving his kids and could bring up a list of all events associated with them. As another example, a user may wish to find a particular event involving a particular person and the system would enable the user to narrow the search to only events involving the particular person.

In one aspect, some implementations include a method for recognizing a person in a video stream. In some implementations, the method includes: (1) obtaining a live video stream; (2) detecting one or more persons in the live video stream; (3) determining, from analysis of the live video stream, personally identifiable information that identifies a first person of the detected one or more persons; (4) determining, based on at least some of the personally identifiable information, that the first person is not a known person to the computing system; (5) in accordance with the determination that the first person is not a known person: (a) storing at least some of the personally identifiable information; and (b) requesting a user to classify the first person; and (6) in accordance with (i) a determination that a predetermined amount of time has elapsed since the request was transmitted and a response was not received from the user, or (ii) a determination that a response was received from the user classifying the first person as a stranger, deleting the stored personally identifiable information.

In some implementations, the determination that the first person is not a known person is made by comparing the personally identifiable information (PII) with previously stored PII of one or more known persons. In some implementations, only a preset number of images are stored (e.g., 100, 200, or 300 images). In some implementations, if the preset number of images (e.g., 300) has already been stored for a particular person, a previously stored image is deleted and the new image is saved (e.g., the oldest previously stored image is deleted, or the previously stored image with the lowest determined quality is deleted). In some implementations, if the PII closely matches previously stored PII for the person, the image is not saved (e.g., too cumulative).

In some implementations, the predetermined amount of time is 1 day, 1 week, 2 weeks, or 1 month. In some implementations, the predetermined amount of time is equal to a subscription storage length associated with the computing system.

In some implementations, the classifications include one or more of: a known person, a trusted person, an authorized person, a stranger, an unknown person, etc. In some implementations, the user designates a person as trusted, known, or unknown. In some implementations, the designation for untrusted persons is stored as well. In some implementations, the designation is associated with the image and/or the PII of the first person.

In some implementations, the computing system comprises one or more cameras communicatively coupled to a remote server system. In some implementations, storing at least some of the PII includes storing an image and corresponding PII for comparison with PII of subsequently detected persons. In some implementations, for each detected person, the method includes: (1) storing an image of the detected person and corresponding PII; (2) in accordance with a determination that the detected person is a known person to the computing system, associating the stored image and corresponding feature characterization information (also sometimes called personally identifiable information) with a label for the known person; and (3) in accordance with a determination that the detected person is not a known person to the computing system, generating a new label for the stored image and corresponding feature characterization information.

In some implementations, determining the personally identifiable information includes: (1) selecting one or images of the first person from the live video stream; and (2) characterizing a plurality of features of the first person based on the one or more images. In some implementations, the plurality of features is characterized based on an analysis of only a portion of the image (e.g., the portion containing the person or the person's face). In some implementations, a camera device determines the portion and sends the portion of the image, but not the remainder of the image, to a server system for further analysis and recognition. In some implementations, the method further includes acquiring from the camera a higher quality version of the portion of the image (e.g., with more pixels) and performing the characterization on the higher quality version. In some implementations, the plurality of features includes one or more features that can personally identify the first person. In some implementations, the plurality of features includes one or more facial features of the first person. In some implementations, the method includes: (1) generating a facial signature for the first person based on the characterization of the plurality of features; and (2) determining that the first person is not a known person is based on a comparison of the generated facial signature with one or more previously stored facial signatures.

In some implementations, the method further comprises: (1) identifying a pose of the first person; and (2) in accordance with a determination that an image of the first person in the identified pose has not previously been stored, storing (i) the image of the first person in the identified pose, and (ii) corresponding pose information. In some implementations, the method includes determining and storing quality information for the image, timing information for the image, location information for the image, and the like.

In some implementations, the method further includes: (1) receiving, from the user, a designation that the first person is not a person; and (2) responsive to the designation, storing the designation in association with the personally identifiable information of the first person. In some implementations, the first person is an image of a person (e.g., a picture or a scene on a display). In some implementations, the first person is an animal rather than a person. In some implementations, the first person is a reflection or shadow of a person. In some implementations, future detections of the first person are not notified as a result of the first person being designated as not a person. In some implementations, future detections of the first person are notified as activity not involving a person.

In some implementations, the method further includes, in accordance with the determination that the first person is not a known person, generating a timely notification of detection of an unknown person. In some implementations, a timely notification is a notification sent within 10 seconds, 1 minute, 10 minutes, or 1 hour. In some implementations, the notification comprises a real-time notification sent within 5 seconds, 10 seconds, or 30 seconds. In some implementations, the notification includes a cropped portion of the image of the first person and a high resolution (e.g., 4K) version of the image showing the camera's field of view.

In some implementations, the method further includes: (1) detecting a second person in the live video stream; (2) characterizing a plurality of features of the second person based on one or more images of the second person in the live video stream; and (3) determining whether the second person is a same person as the first person by comparing the plurality of characterized features of the second person with the stored PII of the first person.

In another aspect, in accordance with some implementations a computing system includes: (1) one or more processors; and (2) memory coupled to the one or more processors, the memory storing one or more programs configured to be executed by the one or more processors. In some implementations, the one or more programs include instructions for: (1) obtaining a live video stream; (2) detecting one or more persons in the live video stream; (3) determining, from analysis of the live video stream, personally identifiable information that identifies a first person of the detected one or more persons; (4) determining, based on at least some of the personally identifiable information, whether the first person is a known person to the computing system; (5) in accordance with a determination that the first person is not a known person: (a) storing at least some of the personally identifiable information; and (b) requesting a user to classify the first person; and (6) in accordance with (i) a determination that a predetermined amount of time has elapsed since the request was transmitted and a response was not received from the user, or (ii) a determination that a response was received from the user classifying the first person as a stranger, deleting the stored personally identifiable information.

In some implementations, detecting the one or more persons includes detecting the one or more persons within a first predefined threshold time (e.g., 5 seconds, 10, seconds, or 30 seconds).

In some implementations: (1) the one or more programs further include instructions for comparing the personally identifiable information of the first person with stored personally identifiable information of one or more persons previously classified by the user; and (2) determining that the first person is not a known person comprises determining that the personally identifiable information of the first person does not match, within a predetermined threshold, the stored personally identifiable information of the one or more persons previously classified by the user.

In some implementations, the one or more programs further include instructions for: (1) determining that the first person is a known person to the computing system; and (2)

in accordance with the determination that the first person is a known person, forgoing requesting the user to classify the first person.

In some implementations, the one or more programs further include instructions for forgoing generating a timely notification in accordance with the determination that the first person is a known person. In some implementations, the first person is determined to be a known person without having gone through an enrollment process (e.g., the person is determined to be a known person based on prior candid/unposed images).

In some implementations, the one or more programs further include instructions for generating a timely notification identifying the first person in accordance with the determination that the first person is a known person. In some implementations, the one or more programs further include instructions for: (1) determining a location of the first person; (2) determining whether the first person has previously been authorized by the user to access the location; and (3) generating the timely notification identifying the first person and the location in accordance with a determination that the first person has not previously been authorized to access the location. For example, a child may be allowed to play in the living room, but should not access the workshop, garage, or home office.

In another aspect, some implementations include a non-transitory computer-readable storage medium storing one or more programs. In some implementations, the one or more programs include instructions, which when executed by a computing system, cause the system to: (1) obtain a live video stream; (2) detect one or more persons in the live video stream; (3) determine, from analysis of the live video stream, personally identifiable information that identifies a first person of the detected one or more persons; (4) determine, based on at least some of the personally identifiable information, whether the first person is a known person to the computing system; (5) in accordance with a determination that the first person is not a known person: (a) store at least some of the personally identifiable information; and (b) request a user to classify the first person; and (6) in accordance with (i) a determination that a predetermined amount of time has elapsed since the request was transmitted and a response was not received from the user, or (ii) a determination that a response was received from the user classifying the first person as a stranger, delete the stored personally identifiable information.

In some implementations, the one or more programs further include instructions, which when executed by the computing system, cause the system to: (1) detect the first person by performing facial detection on a first frame in the live video stream; and (2) track the first person through time by analyzing a plurality of video frames in the live video stream, the plurality of video frames subsequent to the first frame. In some implementations, the detecting comprises analyzing the entire frame, whereas the tracking comprises analyzing only a portion of the frames (e.g., only an area at or around the location where the person was detected). In some implementations, the instructions include obtaining one or more additional live video streams; detecting one or more persons in the one or more additional live video streams; and determining whether any of the one or more persons in the one or more additional live video streams are known to the computing system. In some implementations, the instructions include determining, for each detected person of the one or more detected persons in the live video stream and the one or more detected persons in the one or more additional live video streams, whether the detected person is a same person as another of the one or more detected persons in the live video stream or the one or more detected persons in the one or more additional live video streams; and in accordance with a determination that a detected person is a same person as another detected person, tracking the detected person in all corresponding live video streams.

In some implementations, the one or more programs further include instructions, which when executed by the computing system, cause the system to: (1) for each video frame of the first frame and the plurality of video frames, determine an identification quality factor for the video frame; (2) select one or more video frames of the first frame and the plurality of video frames based on the determined identification quality factors; and (3) determine personally identifiable information based on an analysis of the selected one or more images.

In some implementations, the one or more programs further comprise instructions, which when executed by the computing system, cause the system to: (1) determine an activity of the first person based on the tracking of the first person; and (2) send a notification with identification of the first person and the determined activity. In some implementations, the system sends the notification to a user. In some implementations, based on the determined activity, the system sends a notification to the first person (e.g., in addition to, or alternative to, sending a notification to the user). In some implementations, the system instructs the camera that recorded the live video stream (or a nearby device) to provide an audible and/or visual alert upon determining that the activity is a nefarious activity (e.g., stealing a package, looking in a window, breaking a window, kicking a door, etc.). In some implementations, the audible alert comprises a verbal warning to the first person. In some implementations, the verbal warning includes reference to one or more detected qualities of the first person (e.g., the color and/or type of the first person's clothing). For example, the first person is wearing a hat and red jacket and the verbal warning says "You, with the hat and the red jacket, stop what you are doing."

In some implementations, the one or more programs further include instructions, which when executed by the computing system, cause the system to provide a notification to the first person in accordance with the determination that the first person is not a known person. In some implementations, the system instructs the camera that recorded the live video stream (or another device within audible range of the first person) to emit an audible alert, such as a siren or verbal warning. In some implementations, the system instructs the camera that recorded the live video stream (or another device within visual sight of the first person) to provide a visual alert, such as activation of a light or light ring (e.g., a red light ring). In some implementations, the system determines a time of day for the detection of the first person and provides a notification based on the time of day (e.g., provides a notification upon determining that it is nighttime).

In yet another aspect, in accordance with some implementations a method includes: (1) obtaining a plurality of images collected by one or more video cameras in a smart home environment, each image of the plurality of images including a detected person; (2) for each image of the plurality of images, obtaining personally identifiable information of the detected person, the personally identifiable information generated from analysis of the image; (3) grouping the plurality of images into a first group of a plurality of groups based on the personally identifiable information, each group of the plurality of groups representing a unique one of a plurality of detected persons; (4) receiving from a user a request to remove a first image from the first group; and (5) in response to the request: (a) removing the first image from the first group; and (b) disassociating the corresponding personally identifiable information from the first group. In some implementations, the plurality of images includes a plurality of image portions cropped from video feeds of the video cameras, each image portion including a detected person. In some implementations, the plurality of images is grouped based on similarities in the personally identifiable information (PII).

In some implementations: (1) the method further includes presenting to the user one or more images of the first group, including presenting the first image; and (2) the user request to remove the first image corresponds to a user selection of the first image and a subsequent user action.

In some implementations, the method further includes: (1) obtaining a new image including the detected person; (2) obtaining new personally identifiable information of the detected person, the new personally identifiable information generated from analysis of the new image; (3) determining that the new image includes the detected person based on a comparison of the new personally identifiable information with personally identifiable information associated with the first group; and (4) in accordance with the determination that the new image includes the detected person: (a) including the new image in the first group; and (b) associating the new personally identifiable information with the first group.

In some implementations, the method further includes, for each group of the plurality of groups, selecting an image of the group as a profile image for the group.

In some implementations, the profile image is selected based on a determined mood of the detected person in each image. In some implementations, only images of the person while happy are considered for the profile image. In some implementations, the image is selected based on a quality factor for each image. In some implementations, the image is selected based on a pose of the person in each image (e.g., only frontal images are considered).

In some implementations, the method further includes displaying a listing of the one or more groups, the listing including display of the profile image for each group. In some implementations, the listing includes one or more labels for each group (e.g., user labels such as the person's name and/or automated labels such as "Unidentified Person 1".

In some implementations, the method further includes displaying an event timeline corresponding to at least one of the one or more video cameras, including: (1) displaying on the timeline indication of one or more detected events; and (2) for at least one of the one or more detected events, displaying one or more profile images corresponding to one or more persons in the detected event.

In yet another aspect, some implementations include a server system having one or more processors and memory coupled to the one or more processors, the memory storing one or more programs configured to be executed by the one or more processors. In some implementations, the one or more programs including instructions for: (1) obtaining a plurality of images collected by one or more video cameras in a smart home environment, each image of the plurality of images including a detected person; (2) for each image of the plurality of images, obtaining personally identifiable information of the detected person, the personally identifiable information generated from analysis of the image; (3) grouping the plurality of images into a first group of a plurality of groups based on the personally identifiable information, each group of the plurality of groups representing a unique one of a plurality of detected persons; (4) receiving from a user a request to remove a first image from the first group; and (5) in response to the request: (a) removing the first image from the first group; and (b) disassociating the corresponding personally identifiable information from the first group.

In some implementations, the plurality of images are grouped into the first group in response to a determination that the personally identifiable information corresponding to each image in the plurality of images is within a similarity threshold to other personally identifiable information for the first group. In some implementations, in accordance with a determination that the PII is within a threshold amount to at least one PII of the first group, the image and PII is deemed to be of the first group. In some implementations, in accordance with a determination that the PII is within a threshold amount to an average or mean PII set for the group, the image and PII is deemed to be of the first group.

In some implementations, the one or more programs further include instructions for, for a first image of the plurality of images, adjusting the personally identifiable information based on a determined pose of the person in the image. In some implementations, the pose is normalized when determining the PII (e.g., a person's facial features are extrapolated from a profile-view image of the person).

In some implementations, the one or more programs further include instructions for, for a first image of the plurality of images, adjusting the personally identifiable information based on a camera operating mode. For example, the PII is adjusted to account for the camera being in a low-light mode (e.g., when determining skin tone, hair color, eye color, etc.). In some implementations, PII from low-light mode images is only compared with other PII from low-light mode images.

In some implementations: (1) the request to remove the first image comprises a request to assign the first image to a different group of the plurality of groups; (2) removing the first image from the first group comprises assigning the first image to the different group; and (3) disassociating the personally identifiable information of the first image comprises associating the personally identifiable information with the different group. For example, the user indicates that one of the images was incorrectly deemed to include the same detected person and instead includes a different person known to the user. In some implementations, the different group comprises a new group.

In some implementations, the one or more programs further include instructions for: (1) receiving from the user a request to remove a group of the plurality of groups; and (2) in response to the request: (a) deleting all images in the group; and (b) deleting corresponding personally identifiable information.

In some implementations, the personally identifiable information comprises facial feature information of the detected person. In some implementations, the personally identifiable information comprises a feature signature for the detected person, the feature signature generated based on analysis of the image.

In yet another aspect, some implementations include a non-transitory computer-readable storage medium storing one or more programs, the one or more programs comprising instructions, which when executed by a computing system, cause the system to: (1) obtain a plurality of images collected by one or more video cameras in a smart home environment, each image of the plurality of images including a detected person; (2) for each image of the plurality of images, obtain personally identifiable information of the detected person, the personally identifiable information generated from analysis of the image; (3) group the plurality of images into a first group of a plurality of groups based on the personally identifiable information, each group of the plurality of groups representing a unique one of a plurality of detected persons; (4) receive from a user a request to remove a first image from the first group; and (5) in response to the request: (a) remove the first image from the first group; and (b) disassociate the corresponding personally identifiable information from the first group.

In some implementations, the one or more programs further comprise instructions, which when executed by the computing system, cause the system to: (1) receive, from the user, identification information of the detected person for the first group; and (2) remove the first group from the plurality of groups based on the received identification information.

In some implementations: (1) the identification information indicates that the detected person is a stranger to the user; and (2) removing the first group comprises deleting (i) all images in the first group, and (ii) the corresponding personally identifiable information.

In some implementations: (1) the identification information indicates an identity of the detected person; and (2) removing the first group comprises combining the first group with another group representing the same identity. For example, the user identifies the group has images of Joe and the group is combined with another group of images for Joe.

In some implementations: (1) the request to remove the first image comprises a request to delete the first image; (2) removing the first image from the group comprises deleting the first image; and (3) disassociating the personally identifiable information of the first image comprises deleting the personally identifiable information.

In yet another aspect, some implementations include a camera system configured to perform any of the methods described herein. In some implementations, the camera system includes means for performing any of the actions described herein. In some implementations, the camera system includes one or more cameras and a server system.

Thus, systems are provided with more efficient and effective methods for monitoring and facilitating review of events and persons in video streams, thereby increasing the accuracy, effectiveness, efficiency, and user satisfaction with such systems. Such systems and methods may complement or replace conventional systems and methods for event and person monitoring and presentation.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DETAILED DESCRIPTION

Figure 1:
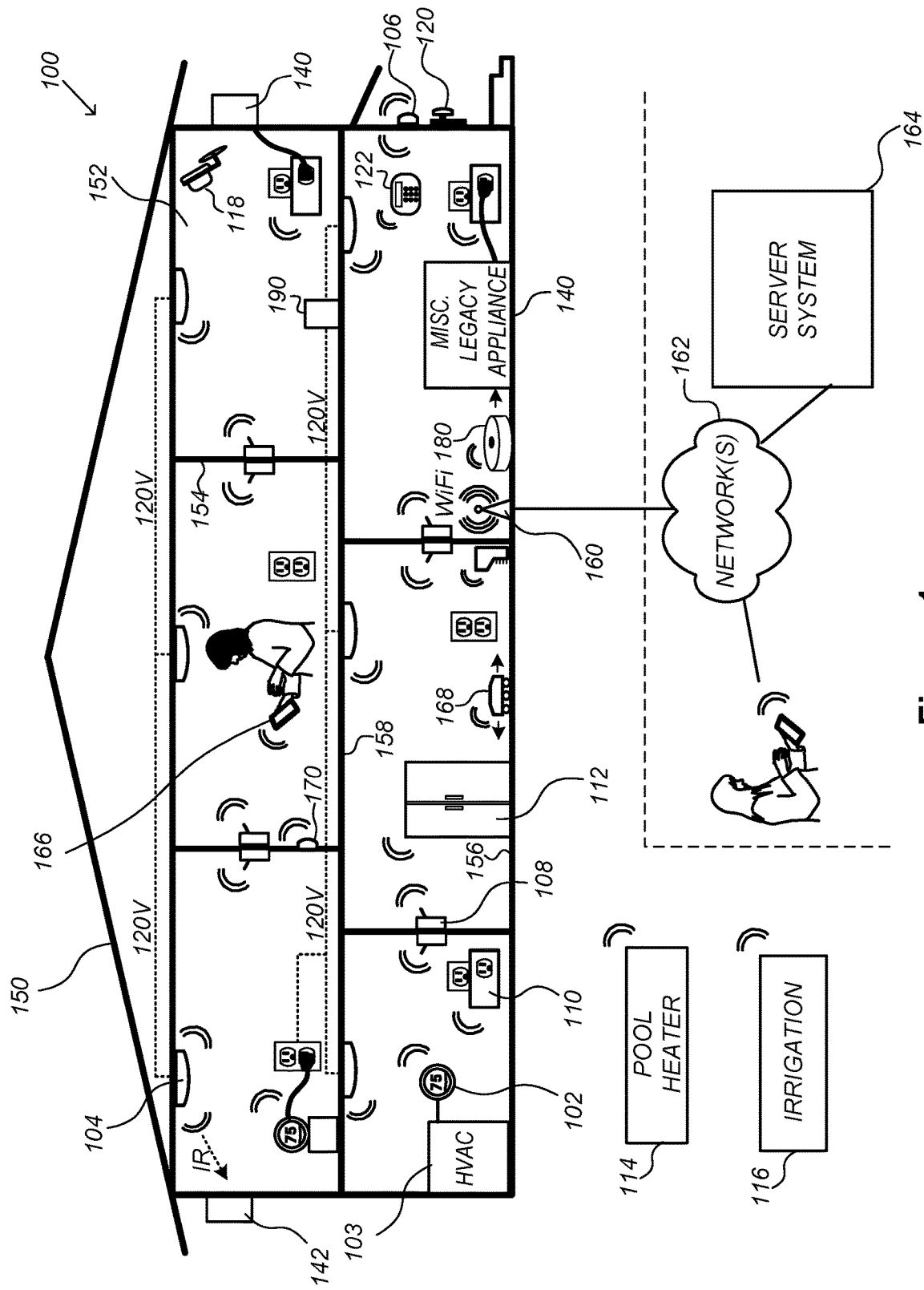
FIG. 1 is an example smart home environment in accordance with some implementations.

Due to the potentially large number of events that could occur within a smart home environment (many of which may be trivial) it is beneficial to provide additional details to a user when notifying the user of a given event. For example, rather than merely notifying a user that "motion has been detected," it is beneficial for a smart home monitoring system to be able to recognize, and inform the user, of the type of event that occurred and the persons/entities involved. This enables the user to more quickly and efficiently make a determination as to whether the event requires any action or further review by the user. Thus, the system may notify the user that "Your neighbor John just left a package at your front door." In this way, the user can more quickly and easily distinguish important events (e.g., events requiring an immediate response or more detailed review) from trivial ones that do not require further review or response.

Additionally, or alternatively, the monitoring system may use the additional details to make a determination as to whether a notification is needed. Thus, the system may forgo notifying the user of trivial events (e.g., "Your daughter Susan is watching in the living room" or "The tree outside your bedroom window is swaying in the breeze"), instead notifying the user when unrecognized persons are involved or potentially nefarious activities are detected. The system may also use the additional details to determine whether a communication to the detected person is necessary or helpful. For example, the system may determine that a visitor (e.g., an unrecognized person) is attempting to open a window into the home and flash lights or issue an audio alert, such as "You in the suit, you are not authorized to open that window." As another example, the system may determine that a visitor is an expected friend of an occupant of the home and acknowledge the friend's arrival, e.g., "John has been alerted to your arrival and will greet you momentarily."

Accordingly, some implementations include a system of multiple network-connected cameras that recognizes the persons in the scenes viewed by the cameras. In some implementations, the system is configured to alert users of the system whether someone appeared in the scene that was not present earlier in the scene. In some implementations, the system builds a library of all the known persons in the scene and presents that to the user for curation. In some implementations, the system does not require a training phase (e.g., where users of the system have to manually enroll) and starts learning immediately based on the persons that it finds in the scenes.

In some implementations, the system includes a camera-side face detection and face signature extraction process with in-cloud aggregation of face signatures from all cameras. In some implementations, the cloud-side service chooses which faces to recognize based on face properties computed when the face is detected. In some implementations, the cloud-side service updates the face library for each structure and allows users to curate it into various categories, such as known, unknown, and not-a-face.

Thus, in some implementations, a reviewing user gets a unique view of the persons in the view of their cameras. They do not have to keep track of several face libraries per camera. Furthermore, the rejection of poor quality and/or incorrectly categorized faces (e.g., via face library merges and deletes) creates a much better user experience.

In some implementations, the system includes server design and architecture for distinguishing known people from unknown people using one or more cameras connected to the internet. In some implementations, the system includes a data flow comprising the flow of video and metadata from the camera/sensor to one or more services in the cloud and eventually to a user of the system for monitoring on their client devices, specifically in relation to surfacing information about known vs. unknown people.

In some implementations, the information about identities of people is presented to the user in the form of push notifications and/or emails in context of a security/monitoring scenario. In some implementations, the information about the identities is also presented in a temporal fashion on a user's timeline of video history. In some implementations, the user is shown a library of identities in the form of images of faces of the people seen on which actions can be taken by the user.

In some instances, the issues of management of sensitive user data related to human face fingerprints and images arise. Details about its storage, curation and deletion are addressed below.

In some implementations, the system includes a client-server architecture comprised of one or more cloud-connected home monitoring visual sensors (e.g., video cameras) that provide input including video to a recognition service in the cloud. In some implementations, the service then recognizes those faces and provides the information to the clients in form of notifications, cuepoints on the timeline and images/snapshots. In some implementations, a cuepoint corresponds to initial detection of an event candidate. For example, detection of motion by a motion sensor, such as a camera. In some implementations, a cuepoint triggers performance of a more thorough event identification process (e.g., analysis of a video segment corresponding to the cuepoint).

In some implementations, the input includes a stream of face track data from camera(s) uploaded alongside with images of faces and video to a service (e.g., a cloud service that supports or provides smart home monitoring services).

In some implementations, this service is responsible for parsing the data, storing video and image data to cloud storage services, and/or forwarding the face track metadata to a second service.

In some implementations, the second service is the service that manages the face signature data and performs facial recognition. In some implementations, upon receiving face metadata from the first service, it matches one or more face signatures to a stored database and creates artifacts such as notifications and cuepoints. In some implementations, the second service updates a 'face model' for the person by adding the newly available information to it.

In some implementations, each face track or a group of face tracks is sent to the second service by the first service (after parsing from the stream of data from the camera) as individual requests in a traditional client-server request response pattern. In some implementations, the face track data is sent to the second service in a streaming fashion with a persistent connection between the first service and the second service for a given camera. In some implementations, face tracks are continually recognized for a given camera by the same service as long as the connection is maintained, which is generally as long as the camera maintains a stable connection with the second service.

In some implementations, the service provides for categorizing of faces into one or more buckets, such as 'Trusted', 'Known', 'Unknown', and 'Not a person'. For example, trusted can be distinguished from known for the purposes of providing different flavors of notifications or cuepoints associated with different privileges within the home. For instance, a user may want an alert for when the camera sees a trusted person but not when it sees a known person, or vice versa.

In some implementations, face images are shown to the user in the form of a 'face library' consisting of several snapshots of a face. In various implementations, all snapshots seen by all cameras in the system can be shown or only a subset (e.g., consisting of most informative images) for the identities can be shown. In some implementations, this decision is made by the second service.

In some implementations, a camera continuously sends images of the faces along with face track metadata. In some implementations, the server system stores these images, extracting them out of the metadata for subsequent retrieval by the mobile/desktop clients or by the server system for further processing. In some implementations, the server system receives metadata about the images and stores only a subset of images. In some implementations, until then, the image resides in server system's buffer.

In some implementations, the server system decides which images must be stored and communicates this to the camera. The camera then retrieves one or more of the images (e.g., a high quality version of a designated image) from its buffer, and sends it the server system and/or stores it in a cloud storage service for further use. In some implementations, the cloud service is responsible for managing, presenting and purging the sensitive face signature and image data appropriately.

In some implementations, metadata from one or more face tracks including qualitative and semantic properties of the image is stored by the server system upon completing the recognition process.

In some implementations, the image data is stored in a database organized by different 'face identities'(e.g., multiple facial images deemed to be of a same individual). In some implementations, each 'face identity' includes an image selected as an exemplar. In some implementations, the signatures from the exemplar images are also stored (e.g., either as is or as an aggregation). In some implementations, other information such as time and coordinates in the scene at which the face was seen is also stored. In some implementations, information from the user such as the category/name of the identity is also stored as part of the same database. In some implementations, the database is stored at the camera or 'structure' level, where, for example, a structure includes of several cameras belonging to the same household.

In some implementations, special attention is given to the act of the user categorizing an identity as an 'Unknown' person. In some implementations, upon receiving the unknown categorization, all the model data is deleted for that identity for the entire structure. In some implementations, the images are deleted as well. In some implementations, the deletion request is received by a first server service and is forwarded to a second server service which deletes the model. In some implementations, the first server service deletes the images. In some implementations, the second server service deletes the images as well as the model(s).

In some implementations, a same or similar set of steps as above are performed for a user request to delete or 'Forget a face.' For example, by navigating to the face library, locating the face of interest and clicking 'Forget this person.'

In some implementations, the service can also handle the deletion of individual 'exemplar' tracks and/or face images and signatures through the face library. In some implementations, upon this request, if the deletion of this face image/ signature means that all exemplars for the face are deleted, then the face identity is deleted as well.

In some implementations, if the user has not done the initial categorization of a face instance for a given length of time (e.g., for a subscription period), then the face images and model older than the said time are purged (deleted). In some implementations, only data which was captured by the camera whose subscription has expired is deleted. In some implementations, if this means that all face model data for the face identity would be deleted, then the face is deleted as well and it is no longer shown on the categorization screen on the user facing application.

Turning now to the figures, FIG. 1 is an example smart home environment 100 in accordance with some implementations. The smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2A) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come). In some implementations, the smart doorbell 106 includes some or all of the components and features of the camera 118. In some implementations, the smart doorbell 106 includes a camera 118.

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio). In some implementations, the cameras 118 are each configured to operate in a day mode and in a low-light mode (e.g., a night mode). In some implementations, the cameras 118 each include one or more IR illuminators for providing illumination while the camera is operating in the low-light mode. In some implementations, the cameras 118 include one or more outdoor cameras. In some implementations, the outdoor cameras include additional features and/or components such as weatherproofing and/or solar ray compensation.

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a server system 164 (also called a central server system and/or a cloud-computing system herein). The server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device. In some implementations, hub device 180 further comprises a local storage device for storing data related to, or output by, smart devices of smart home environment 100.

In some implementations, the data includes one or more of: video data output by a camera device, metadata output by a smart device, settings information for a smart device, usage logs for a smart device, and the like.

In some implementations, smart home environment 100 includes a local storage device 190 for storing data related to, or output by, smart devices of smart home environment 100. In some implementations, the data includes one or more of: video data output by a camera device (e.g., camera 118), metadata output by a smart device, settings information for a smart device, usage logs for a smart device, and the like. In some implementations, local storage device 190 is communicatively coupled to one or more smart devices via a smart home network (e.g., smart home network 202, FIG. 2A). In some implementations, local storage device 190 is selectively coupled to one or more smart devices via a wired and/or wireless communication network. In some implementations, local storage device 190 is used to store video data when external network conditions are poor. For example, local storage device 190 is used when an encoding bitrate of camera 118 exceeds the available bandwidth of the external network (e.g., network(s) 162). In some implementations, local storage device 190 temporarily stores video data from one or more cameras (e.g., camera 118) prior to transferring the video data to a server system (e.g., server system 164).

Figure 2A:
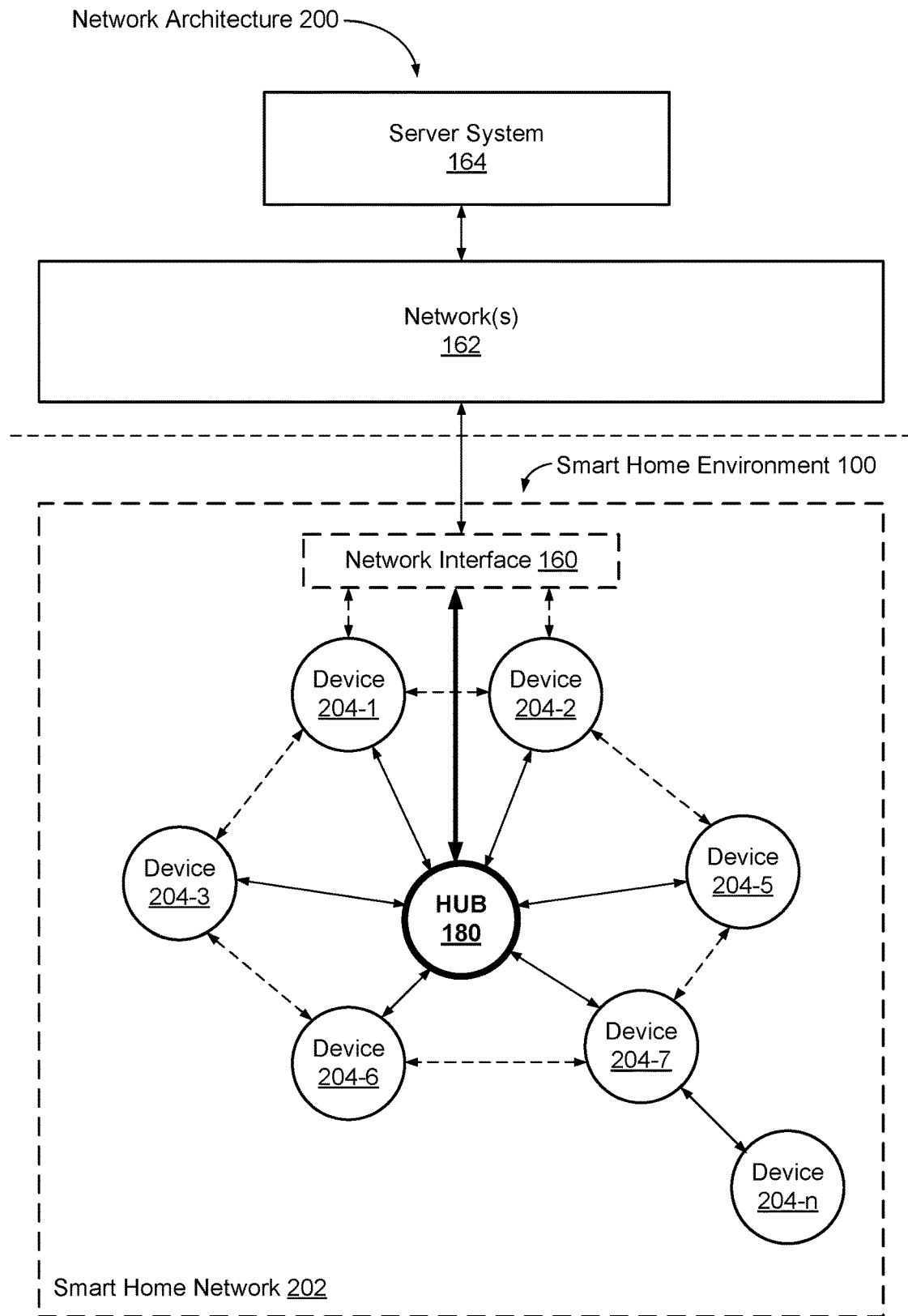
FIG. 2A is a block diagram illustrating a representative network architecture that includes a smart home network in accordance with some implementations.

FIG. 2A is a block diagram illustrating a representative network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-powered nodes using low-power communication protocols are able to send and/or receive messages across the entire smart home network 202, as well as over the Internet 162 to the server system 164. In some implementations, the mesh network enables the server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the server system 164 may communicate control commands to the low-powered nodes. For example, a user may use the electronic device 166 (e.g., a smart phone) to send commands over the Internet to the server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 2B:
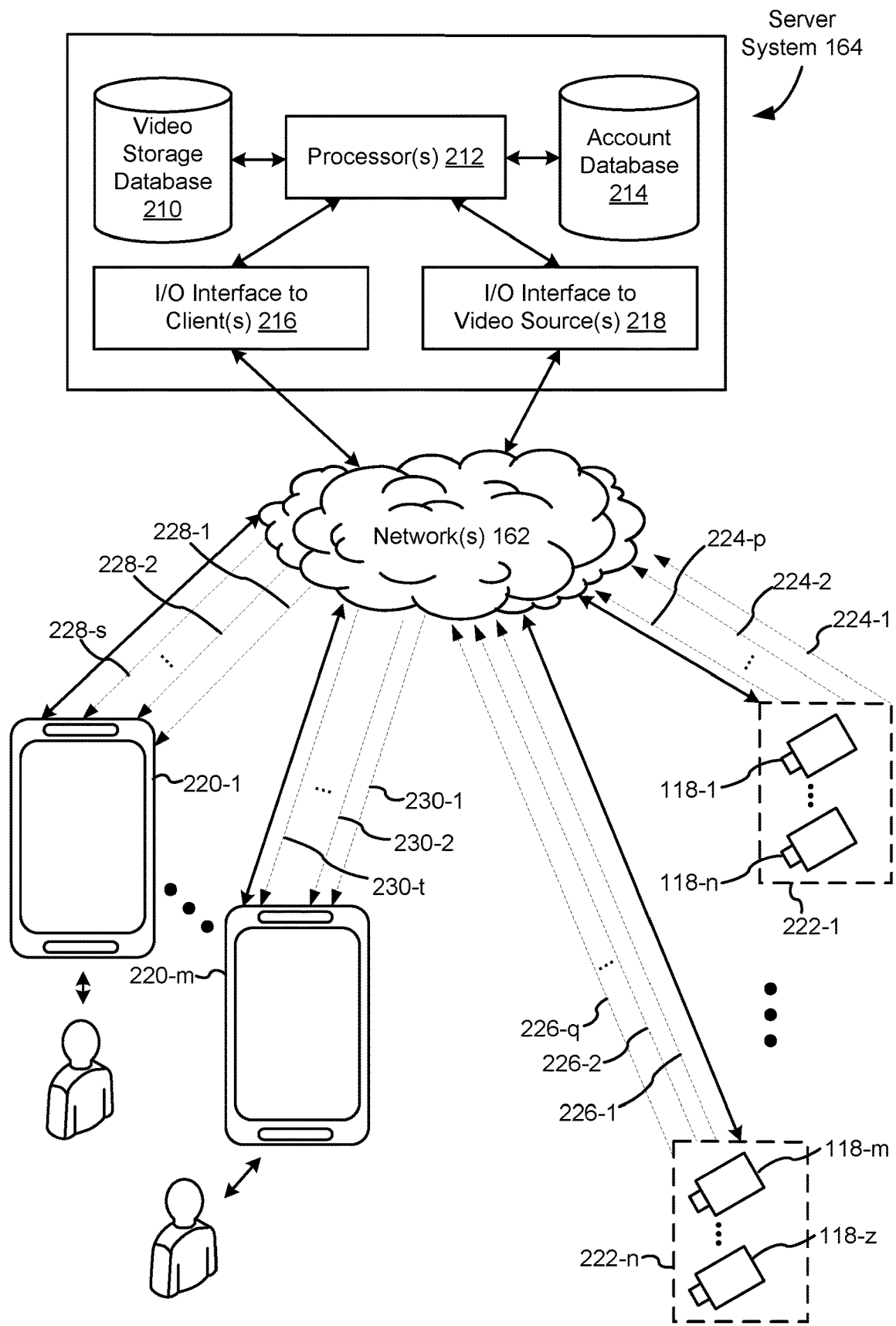
FIG. 2B is a representative operating environment in which a server system interacts with client devices and smart devices in accordance with some implementations.

FIG. 2B illustrates a representative operating environment in which a server system 164 provides data processing for monitoring and facilitating review of events (e.g., motion, audio, security, etc.) in video streams captured by video cameras 118. As shown in FIG. 2B, the server system 164 receives video data from video sources 501 (including cameras 118) located at various physical locations (e.g., inside homes, restaurants, stores, streets, parking lots, and/or the smart home environments 100 of FIG. 1). Each video source 501 may be bound to one or more reviewer accounts, and the server system 164 provides video monitoring data for the video source 501 to client devices 220 associated with the reviewer accounts. For example, the portable electronic device 166 is an example of the client device 220. In some implementations, the server system 164 is a video processing server that provides video processing services to video sources and client devices 220.

In some implementations, each of the video sources 501 includes one or more video cameras 118 that capture video and send the captured video to the server system 164 substantially in real-time. In some implementations, each of the video sources 501 includes a controller device (not shown) that serves as an intermediary between the one or more cameras 118 and the server system 164. The controller device receives the video data from the one or more cameras 118, optionally performs some preliminary processing on the video data, and sends the video data to the server system 164 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the server system 164.

In accordance with some implementations, each of the client devices 220 includes a client-side module. The client-side module communicates with a server-side module executed on the server system 164 through the one or more networks 162. The client-side module provides client-side functionality for the event monitoring and review processing and communications with the server-side module. The server-side module provides server-side functionality for event monitoring and review processing for any number of client-side modules each residing on a respective client device 220. The server-side module also provides server-side functionality for video processing and camera control for any number of the video sources 501, including any number of control devices and the cameras 118.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for reviewer accounts registered with the video processing server, where a respective user profile includes account credentials for a respective reviewer account, and one or more video sources linked to the respective reviewer account. The I/O interface to one or more video sources 218 facilitates communications with one or more video sources 501 (e.g., groups of one or more cameras 118 and associated controller devices). The video storage database 210 stores raw video data received from the video sources 501, as well as various types of metadata, such as motion events, event categories, event category models, event filters, and event masks, for use in data processing for event monitoring and review for each reviewer account.

Examples of a representative client device 220 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a handheld computer, a tablet computer, a laptop computer, a desktop computer, or a combination of any two or more of these data processing devices or other data processing devices.

The server-client environment shown in FIG. 2B includes both a client-side portion (e.g., the client-side module) and a server-side portion (e.g., the server-side module). The division of functionality between the client and server portions of operating environment can vary in different implementations. Similarly, the division of functionality between a video source 501 and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources 501 is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 501 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the server system 164, a client device 220, and a video source 501 cooperatively.

In some implementations, a video source 501 (e.g., a camera 118) transmits one or more streams of video data to the server system 164. In some implementations, the one or more streams may include multiple streams, of respective resolutions and/or frame rates, of the raw video captured by the camera 118. In some implementations, the multiple streams may include a "primary" stream with a certain resolution and frame rate, corresponding to the raw video captured by the camera 118, and one or more additional streams. An additional stream may be the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream.

In some implementations, one or more of the streams are sent from the video source 501 directly to a client device 220 (e.g., without being routed to, or processed by, the server system 164). In some implementations, one or more of the streams is stored at the camera 118 (e.g., in memory 406, FIG. 4) and/or a local storage device (e.g., a dedicated recording device), such as a digital video recorder (DVR). For example, in accordance with some implementations, the camera 118 stores the most recent 24 hours of video footage recorded by the camera. In some implementations, portions of the one or more streams are stored at the camera 118 and/or the local storage device (e.g., portions corresponding to particular events or times of interest).

In some implementations, the server system 164 transmits one or more streams of video data to a client device 220 to facilitate event monitoring by a user. In some implementations, the one or more streams may include multiple streams, of respective resolutions and/or frame rates, of the same video feed. In some implementations, the multiple streams include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream, as described in greater detail in U.S. patent application Ser. No. 15/594,518.

Figure 3A:
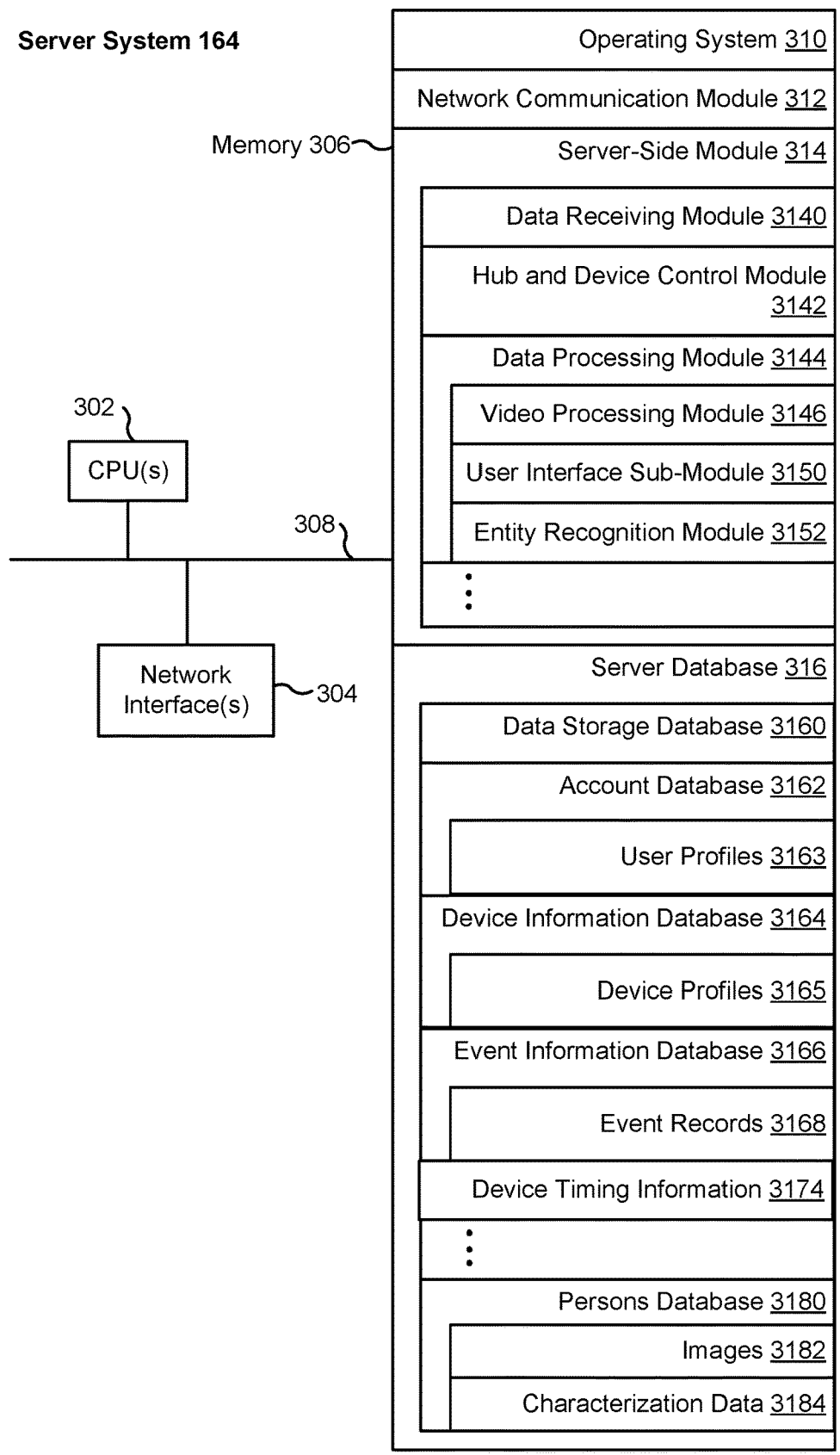
FIG. 3A is a block diagram illustrating a representative server system in accordance with some implementations.

FIG. 3A is a block diagram illustrating the server system 164 in accordance with some implementations. The server system 164 typically includes one or more processing units (CPUs) 302, one or more network interfaces 304 (e.g., including an I/O interface to one or more client devices and an I/O interface to one or more electronic devices), memory 306, and one or more communication buses 308 for interconnecting these components (sometimes called a chipset). The memory 306 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processing units 302. The memory 306, or alternatively the non-volatile memory within memory 306, includes a non-transitory computer readable storage medium. In some implementations, the memory 306, or the non-transitory computer readable storage medium of the memory 306, stores the following programs, modules, and data structures, or a subset or superset thereof:

- an operating system 310 including procedures for handling various basic system services and for performing hardware dependent tasks;
- a network communication module 312 for connecting the server system 164 to other systems and devices (e.g., client devices, electronic devices, and systems connected to one or more networks 162) via one or more network interfaces 304 (wired or wireless);
- a server-side module 314, which provides server-side functionalities for device control, data processing, and data review, including, but not limited to:
    - a data receiving module 3140 for receiving data from electronic devices (e.g., video data from a camera 118, FIG. 1) via the hub device 180, and preparing the received data for further processing and storage in the data storage database 3160;
    - a hub and device control module 3142 for generating and sending server-initiated control commands to modify operation modes of electronic devices (e.g., devices of a smart home environment 100), and/or receiving (e.g., from client devices 220) and forwarding user-initiated control commands to modify operation modes of the electronic devices;
    - a data processing module 3144 for processing the data provided by the electronic devices, and/or preparing and sending processed data to a device for review (e.g., client devices 220 for review by a user), including, but not limited to:
        - a video processor sub-module 3146 for processing (e.g., categorizing and/or recognizing) detected entities and/or event candidates within a received video stream (e.g., a video stream from cameras 118);
        - a user interface sub-module 3150 for communicating with a user (e.g., sending alerts, timeline events, etc. and receiving user edits and zone definitions and the like); and
        - an entity recognition module 3152 for recognizing detected persons and other entities, e.g., based on the determined characteristics; and
- a server database 316, including but not limited to:
    - a data storage database 3160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, where (optionally) all or a portion of the data and/or processing associated with the hub device 180 or smart devices are stored securely;
    - an account database 3162 for storing account information for user accounts, including user account information such as user profiles 3163, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;

a device information database 3164 for storing device information related to one or more devices such as device profiles 3165, e.g., device identifiers and hub device specific secrets, independently of whether the corresponding hub devices have been associated with any user account;

an event information database 3166 for storing event information such as event records 3168, e.g., event log information, event categories, and the like; and a persons database 3180 for storing information regarding detected and/or recognized persons, such as images (e.g., cropped headshots) 3182 of detected persons and feature characterization data 3184 for the persons.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above.

Figure 3B:
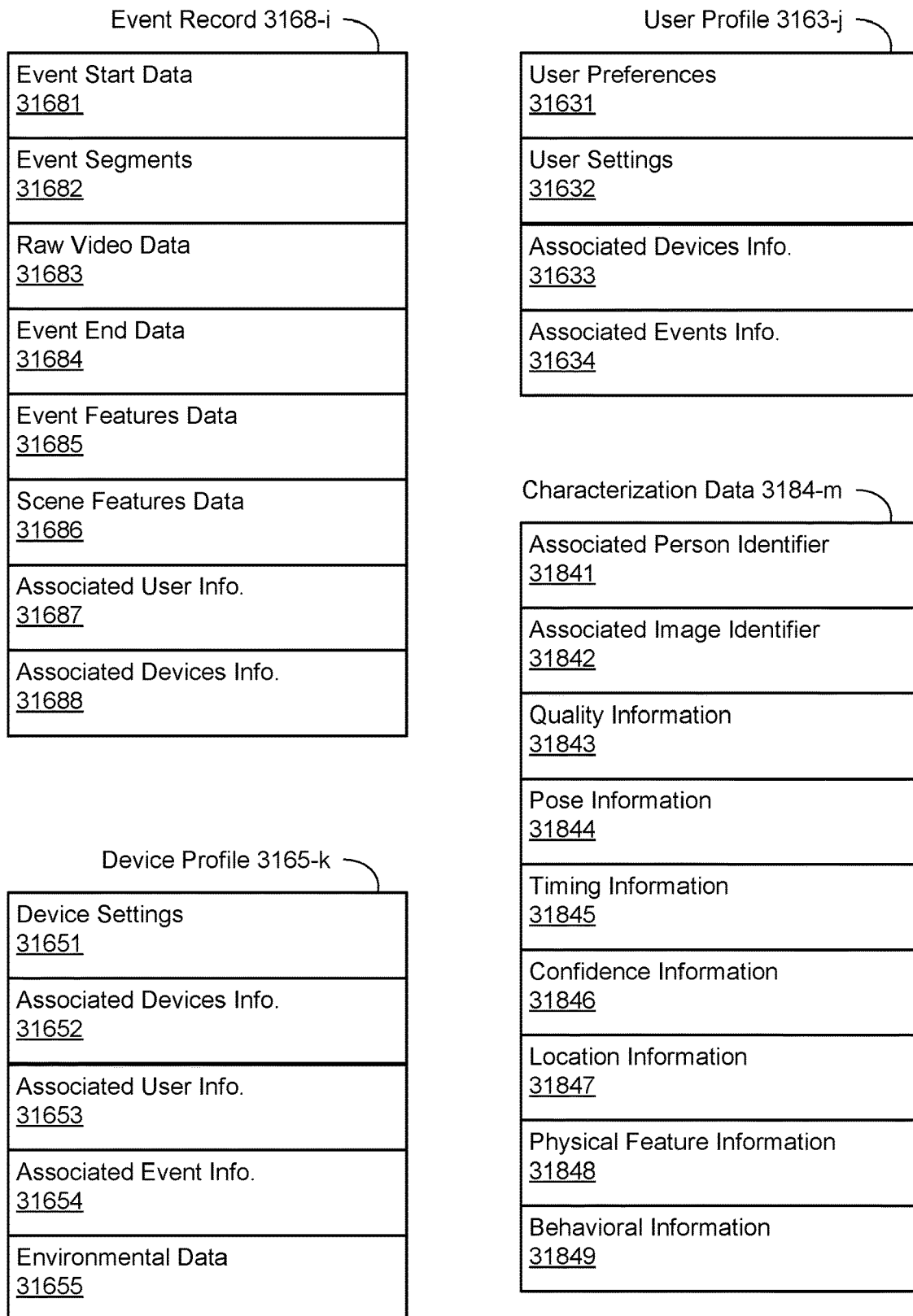
FIG. 3B illustrates various data structures used by some implementations.

FIG. 3B illustrates various data structures used by some implementations, including an event record 3168-i, a user profile 3163-j, a device profile 3165-k, and characterization data 3184-m. The event record 3168-i corresponds to an event 'i' and data for the event 'i'. In some implementations, the event 'i' includes one or more of: a motion event, a hazard event, an audio event, and a security event. In some instances, the data for a motion event 'i' includes event start data 31681 indicating when and/or how the event started, event segments data 31682, raw video data 31683, event end data 31684 indicating when and/or how the event ended, event features data 31685, scene features data 31686, associated user information 31687, and associated devices information 31688. In some instances, the event record 3168-i includes only a subset of the above data. In some instances, the event record 3168-i includes additional event data not shown such as data regarding event/motion masks.

The event start data 31681 includes date and time information such as a timestamp and optionally includes additional information such as information regarding the amount of motion present, a motion start location, amount of audio present, characteristics of the audio, and the like. Similarly, the event end data 31684 includes date and time information such as a timestamp and optionally includes additional information such as information regarding the amount of motion present, a motion start location, amount of audio present, characteristics of the audio, and the like.

The event segments 31682 includes information regarding segmentation of the motion event 'i'. In some instances, event segments are stored separately from the raw video data 31683. In some instances, the event segments are stored at a lower display resolution than the raw video data. For example, the event segments are optionally stored at 480p or 780p and the raw video data is stored at 1080i or 1080p. Storing the event segments at a lower display resolution enables the system to devote less time and resources to retrieving and processing the event segments. In some instances, the event segments are not stored separately and the segmentation information includes references to the raw video data 31683 as well as date and time information for reproducing the event segments. In some implementations, the event segments include one or more audio segments (e.g., corresponding to video segments).

The event features data 31685 includes information regarding event features such as event categorizations/classifications, object masks, motion masks, identified/recognized/tracked motion objects (also sometimes called blobs), information regarding features of the motion objects (e.g., object color, object dimensions, velocity, size changes, etc.), information regarding activity in zones of interest, and the like. The scene features data 31686 includes information regarding the scene in which the event took place such as depth map information, information regarding the location of windows, televisions, fans, the ceiling/floor, etc., information regarding whether the scene is indoors or outdoors, information regarding zones of interest, and the like. In some implementations, the event features data includes audio data, such as volume, pitch, characterizations, and the like.

The associated user information 31687 includes information regarding users associated with the event such as users identified in the event, users receiving notification of the event, and the like. In some instances, the associated user information 31687 includes a link, pointer, or reference to a user profile 3163 for to the user. The associated devices information 31688 includes information regarding the device or devices involved in the event (e.g., a camera 118 that recorded the event). In some instances, the associated devices information 31688 includes a link, pointer, or reference to a device profile 3165 for the device.

The user profile 3163-j corresponds to a user 'j' associated with the smart home network (e.g., smart home network 202) such as a user of a hub device 204, a user identified by a hub device 204, a user who receives notifications from a hub device 204 or from the server system 164, and the like. In some instances, the user profile 3163-j includes user preferences 31631, user settings 31632, associated devices information 31633, and associated events information 31634. In some instances, the user profile 3163-j includes only a subset of the above data. In some instances, the user profile 3163-j includes additional user information not shown, such as information regarding other users associated with the user 'j'.

The user preferences 31631 include explicit user preferences input by the user as well as implicit and/or inferred user preferences determined by the system (e.g., server system 164 and/or client device 220). In some instances, the inferred user preferences are based on historical user activity and/or historical activity of other users. The user settings 31632 include information regarding settings set by the user 'j' such as notification settings, device settings, and the like. In some instances, the user settings 31632 include device settings for devices associated with the user 'j'.

The associated devices information 31633 includes information regarding devices associated with the user 'j' such as devices within the user's smart home environment 100 and/or client devices 220. In some instances, associated devices information 31633 includes a link, pointer, or reference to a corresponding device profile 3165. Associated events information 31634 includes information regarding events associated with user 'j' such as events in which user 'j' was identified, events for which user i was notified, events corresponding to a smart home environment 100 of user 'j', and the like. In some instances, the associated events information 31634 includes a link, pointer, or reference to a corresponding event record 3168.

The device profile 3165-*k* corresponds to a device 'k' associated with a smart home network (e.g., smart home network 202) such a hub device 204, a camera 118, a client device 220, and the like. In some instances, the device profile 3165-*k* includes device settings 31651, associated devices information 31652, associated user information 31653, associated event information 31654, and environmental data 31655. In some instances, the device profile 3165-*k* includes only a subset of the above data. In some instances, the device profile 3165-*k* includes additional device information not shown such as information regarding whether the device 'k' is currently active.

The device settings 31651 include information regarding the current settings of device 'k' such as positioning information, mode of operation information, and the like. In some instances, the device settings 31651 are user-specific and are set by respective users of the device 'k'. The associated devices information 31652 includes information regarding other devices associated with device 'k' such as other devices linked to device i and/or other devices in the same smart home network as device 'k'. In some instances, the associated devices information 31652 includes a link, pointer, or reference to a respective device profile 3165 corresponding to the associated device.

The associated user information 31653 includes information regarding users associated with the device such as users receiving notifications from the device, users registered with the device, users associated with the smart home network of the device, and the like. In some instances, the associated user information 31653 includes a link, pointer, or reference to a user profile 3163 corresponding to the associated user.

The associated event information 31654 includes information regarding events associated with the device 'k' such as historical events involving the device 'k'. In some instances, the associated event information 31654 includes a link, pointer, or reference to an event record 3168 corresponding to the associated event.

The environmental data 31655 includes information regarding the environment of device 'k' such as information regarding whether the device is outdoors or indoors, information regarding the light level of the environment, information regarding the amount of activity expected in the environment (e.g., information regarding whether the device is in a private residence versus a busy commercial property), information regarding environmental objects (e.g., depth mapping information for a camera), and the like.

The characterization data 3184-*m* corresponds to a person 'm' detected by within the smart home environment 100. In some implementations, characterization data for persons designated as strangers is deleted. In some implementations, characterization data is deleted for persons who do not give consent to having their personally identifiable information stored. As shown in FIG. 3B, in accordance with some implementations, the characterization data 3184 includes an associated person identifier 31841, an associated image identifier 31842, quality information 31843, pose information 31844, timing information 31845, confidence information 31846, location information 31847, physical feature information 31848, and behavioral information 31849. In some implementations, the characterization data 3184 includes additional data not shown. In some implementations, the characterization data 3184 includes only a subset of the data shown.

The associated person identifier 31841 includes a label or other identifier for the person represented by the characterization data. In some implementations, the label is applied by a user upon review of the corresponding image. In some implementations, the identifier 31841 is assigned by the system in accordance with a determination that the characterization data 3184 matches, or is similar to, other characterization data associated with the identifier.

The associated image identifier 31842 identifies one or more images from which the characterization data 3184 was generated. In some implementations, there is a one-to-one mapping between the characterization data and the images, while in some other implementations, there is a many-to-one or one-to-many mapping. In some implementations, the associated image identifier 31842 includes a pointer or logical storage address for the one or more images.

The quality information 31843 includes a quality factor for the characterization data 3184. In some implementations, the quality factor is based on one or more of: a blurriness of the image, a resolution of the image, an amount of the person that is visible in the image, how many features of the person are visible in the image, and a distance between the person and the camera that captured the image.

The pose information 31844 identifies a pose of the detected person. In some implementations, the pose information 31844 includes information regarding an angle between the camera that captured the image and the detected person. In some implementations, the pose information 31844 includes information regarding a portion of the person's face that is visible in the image.

The timing information 31845 includes information regarding when the image was captured by the camera. In some implementations, the timing information 31845 indicates the time of day, the day, the month, the year, etc. that the image was captured. In some implementations, the characterization data 3184 includes operating information for the camera indicating the mode of operation and settings of the camera (e.g., indicating whether the camera was in a low-light mode when the image was captured). In some implementations, the timing information 31845 is used in conjunction with a device profile 3165 for the camera to determine operating information for the camera at the time the image was captured.

The confidence information 31846 indicates a confidence that the associated person identifier 31841 is accurate. In some implementations, the confidence information 31846 is based on a similarity between the characterization data 3184 and other characterization data for the associated person. In some implementations, the confidence information 31846 includes a confidence score for the characterization data 3184. In some implementations, in accordance with a determination that the confidence score is below a predetermined threshold, the association to the person is reevaluated and/or the characterization data 3184 and associated image is flagged as potentially having an incorrect associated person identifier 31841. In some implementations, flagged characterization data 3184 is presented to a user for confirmation or reclassification.

The location information 31847 includes information regarding a location for the image and/or the detected person. In some implementations, the location information 31847 indicates a location for the camera that captured the image. In some implementations, the location information 31847 identifies the camera that captured the image. In some implementations, the location information 31847 indicates a room or portion of the smart home environment that was captured in the image. In some implementations, the location information 31847 indicates a GPS or coordinates-based location for the image.

The physical feature information 31848 includes information regarding the physical features of the detected person. In some implementations, the physical feature information 31848 includes characterization of the person's physical features (e.g., nose, ears, eyes, and hair). In some implementations, the physical feature information 31848 includes information regarding the person's speech, gait, and/or posture. In some implementations, the physical feature information 31848 includes information regarding the person's dimensions, such as the distance between the person's eyes or ears, or the length of the person's arms or legs. In some implementations, the physical feature information 31848 includes information regarding of the person's age, gender, and/or ethnicity. In some implementations, the physical feature information 31848 includes information regarding the person's clothing and/or accessories (e.g., whether the person is wearing a hat, glass, gloves, and/or rings).

The behavioral information 31849 includes information regarding the behavior of the detected person. In some implementations, the behavioral information 31849 includes information regarding the detected person's mood and/or mannerisms.

Figure 4:
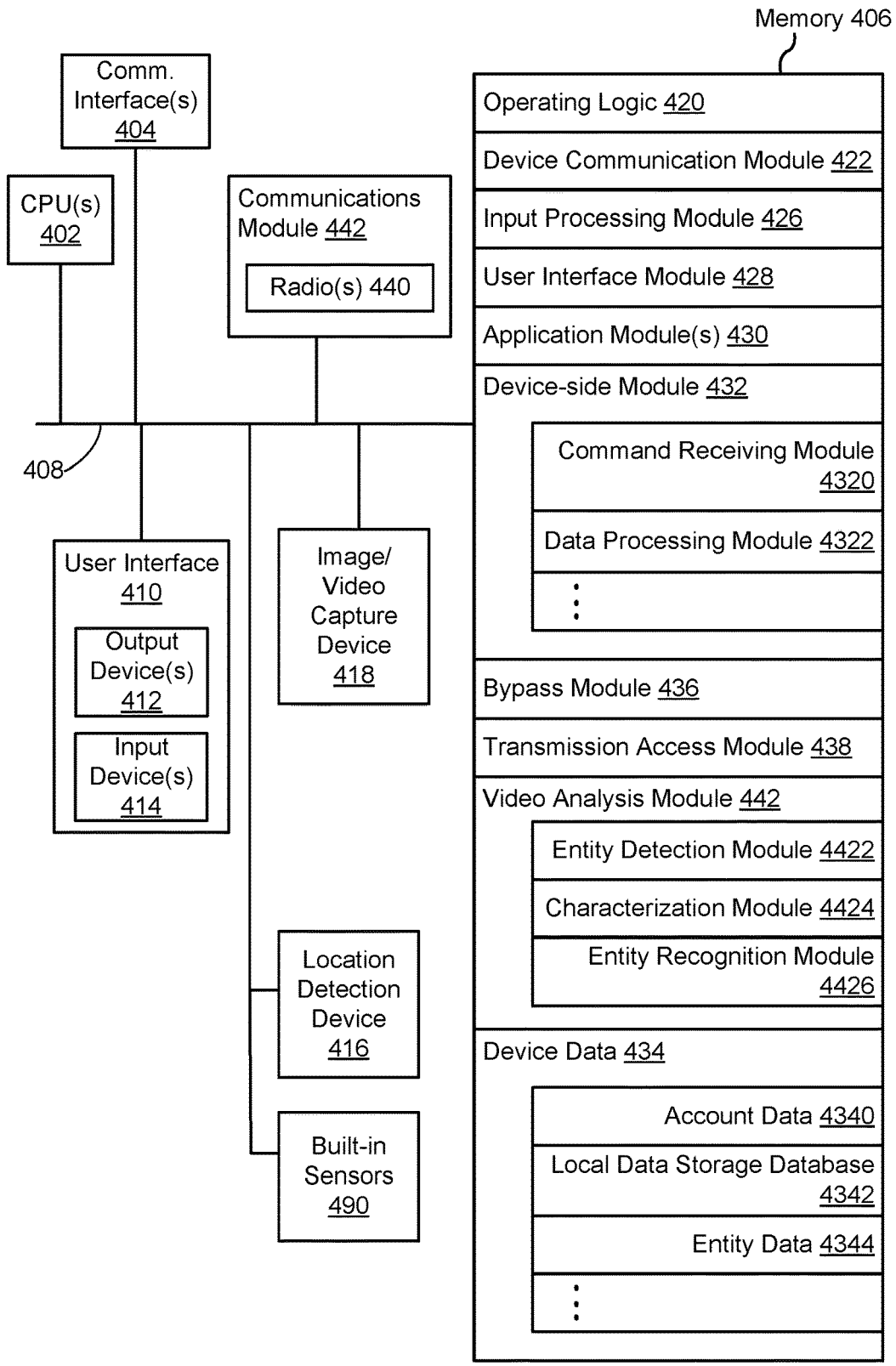
FIG. 4 is a block diagram illustrating a representative smart device in accordance with some implementations.

FIG. 4 is a block diagram illustrating a representative smart device 204 in accordance with some implementations. In some implementations, the smart device 204 (e.g., any devices of a smart home environment 100, FIG. 1) includes one or more processing units (e.g., CPUs, ASICs, FPGAs, microprocessors, and the like) 402, one or more communication interfaces 404, memory 406, communications module 442 with radios 440, and one or more communication buses 408 for interconnecting these components (sometimes called a chipset). In some implementations, the user interface 410 includes one or more output devices 412 that enable presentation of media content, including one or more speakers and/or one or more visual displays. In some implementations, the user interface 410 also includes one or more input devices 414, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 418 (e.g., cameras, video cameras, scanners, photo sensor units).

The built-in sensors 490 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 440 enable one or more radio communication networks in the smart home environments, and allow a smart device 204 to communicate with other devices. In some implementations, the radios 440 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) custom or standard wired protocols (e.g., Ethernet, HomePlug, etc.), and/or any other suitable communication protocol, including communication protocols not yet developed as of the filing date of this document.

The communication interfaces 404 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 406, or alternatively the non-volatile memory within the memory 406, includes a non-transitory computer readable storage medium. In some implementations, the memory 406, or the non-transitory computer readable storage medium of the memory 406, stores the following programs, modules, and data structures, or a subset or superset thereof:

- operating logic 420 including procedures for handling various basic system services and for performing hardware dependent tasks;
- a device communication module 422 for connecting to and communicating with other network devices (e.g., network interface 160, such as a router that provides Internet connectivity, networked storage devices, network routing devices, server system 164, etc.) connected to one or more networks 162 via one or more communication interfaces 404 (wired or wireless);
- an input processing module 426 for detecting one or more user inputs or interactions from the one or more input devices 414 and interpreting the detected inputs or interactions;
- a user interface module 428 for providing and displaying a user interface in which settings, captured data, and/or other data for one or more devices (e.g., the smart device 204, and/or other devices in smart home environment 100) can be configured and/or viewed;
- one or more applications 430 for execution by the smart device (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);
- a device-side module 432, which provides device-side functionalities for device control, data processing and data review, including but not limited to:
  - a command receiving module 4320 for receiving, forwarding, and/or executing instructions and control commands (e.g., from a client device 220, from a server system 164, from user inputs detected on the user interface 410, etc.) for operating the smart device 204; and
  - a data processing module 4322 for processing data captured or received by one or more inputs (e.g., input devices 414, image/video capture devices 418, location detection device 416), sensors (e.g., built-in sensors 490), interfaces (e.g., communication interfaces 404, radios 440), and/or other components of the smart device 204, and for preparing and sending processed data to a device for review (e.g., client devices 220 for review by a user);

- a bypass module 436 for detecting whether radio(s) 440 are transmitting signals via respective antennas coupled to the radio(s) 440 and to accordingly couple radio(s) 440 to their respective antennas either via a bypass line or an amplifier (e.g., a low noise amplifier);
- a transmission access module 438 for granting or denying transmission access to one or more radio(s) 440 (e.g., based on detected control signals and transmission requests);
- a video analysis module 442 for analyzing captured video data, e.g., to detect and/or recognize persons, objects, animals, and events, including but not limited to:
  - an entity detection module 4422 for detecting persons and other entities in the video data;
  - a characterization module 4424 for characterizing detected persons, entities, and/or events; and
  - an entity recognition module 4426 for recognizing detected persons and other entities, e.g., based on the determined characteristics; and
- device data 434 storing data associated with devices (e.g., the smart device 204), including, but is not limited to:
  - account data 4340 storing information related to user accounts loaded on the smart device 204, wherein such information includes cached login credentials, smart device identifiers (e.g., MAC addresses and UUIDs), user interface settings, display preferences, authentication tokens and tags, password keys, etc.,
  - local data storage database 4342 for selectively storing raw or processed data associated with the smart device 204 (e.g., video surveillance footage captured by a camera 118); and
  - entity data 4344 storing information related to detected persons and other entities, such as characterization information (e.g., characterization information 3184) and associated images.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 406, optionally, stores a subset of the modules and data structures identified above. Furthermore, the memory 406, optionally, stores additional modules and data structures not described above.

Figure 5:
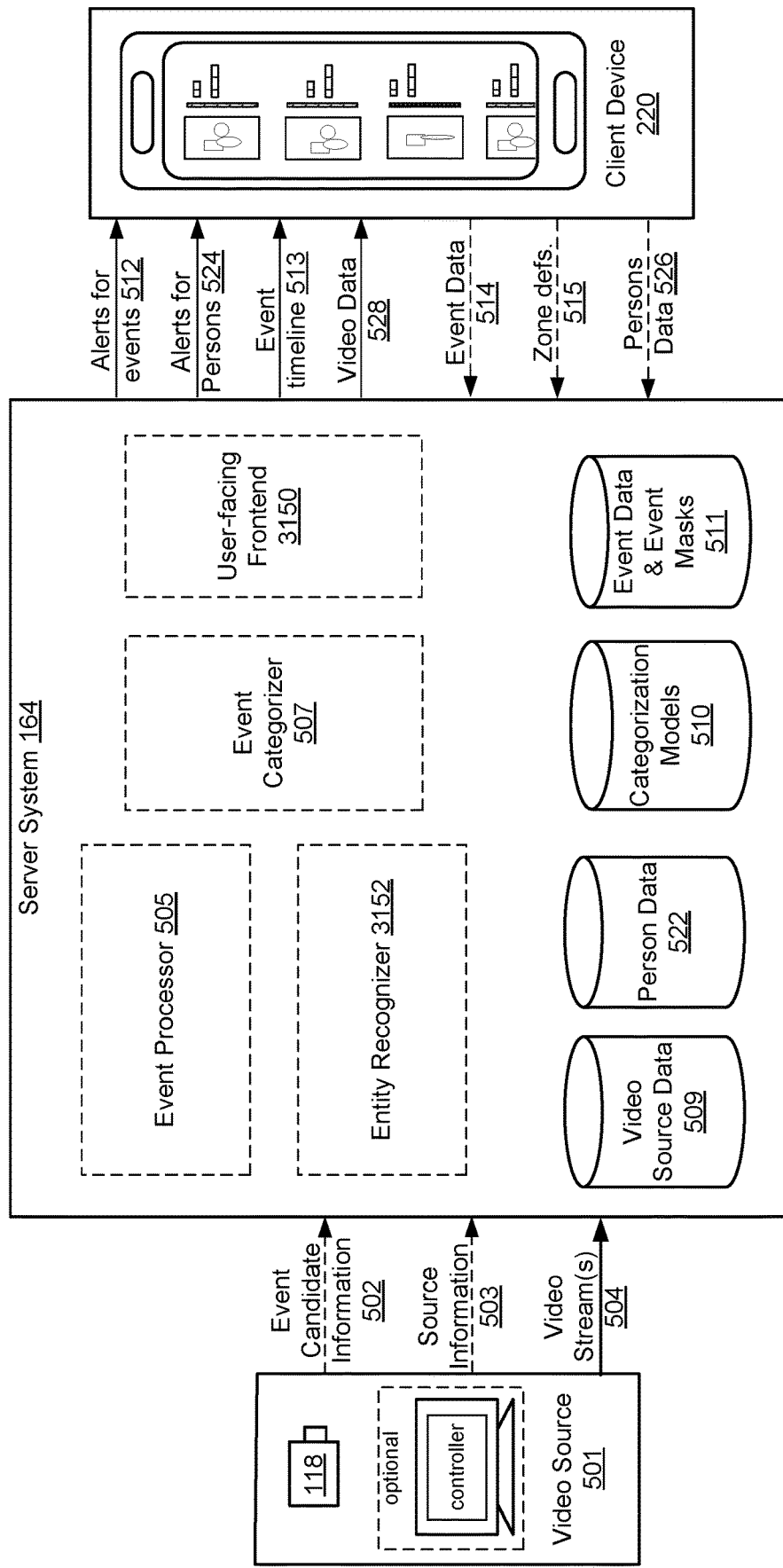
FIG. 5 illustrates representative system architecture for video analysis and categorization in accordance with some implementations.

FIG. 5 illustrates a representative system architecture 500. In some implementations, the server system 164 includes functional modules for an event processor 505, an event categorizer 507, an entity recognizer 3152, and a user-facing frontend 3150. The event processor 505 obtains the event candidates (e.g., by processing the video stream(s) 504 or by receiving event start information from the video source 501). In some implementations, the event candidates comprise motion event candidates. In some implementations, the event candidates include audio, electromagnetic, olfactory, and/or visual aspects. The event categorizer 507 categorizes the event candidates into different event categories (e.g., based on data from the event processor and/or the entity recognizer). The user-facing frontend 3150 generates event alerts and notifications, and facilitates review of the detected entities and events by a reviewer through a review interface on a client device 220. The user-facing frontend 3150 also receives user edits on the event and entity categories, user preferences for alerts and event filters, zone definitions for zones of interest, and the like. The event categorizer optionally revises event categorization models and results based on the user edits received by the user-facing frontend. The entity recognizer optionally revises entity classifications and/or labels based on the user edits received by the user-facing frontend. The server system 164 also includes a video and source data database 506, persons data 522, event categorization models database 510, and event data and event masks database 511. In some implementations, the persons data 522 includes persons database 3180. In some implementations, each of these databases is part of the server database 316 (e.g., part of data storage database 3160).

The server system 164 receives one or more video stream(s) 504 from the video source 501 and optionally receives event candidate information 502, such as preliminary characterization information for detected entities and events (e.g., entity and event metadata from processing performed at the camera 118), and source information 503 such as device settings for a camera 118 (e.g., a device profile 3165 for camera 118). In some implementations, the event processor 505 communicates with the video source 501, e.g., to request additional images such as high definition images or metadata for the video stream(s) 504. The server system sends alerts for events 512, alerts for detected persons 524, event timeline information 513, and/or video data 528 (e.g., video clips corresponding to the detected persons and/or events) to the client device 220. The server system 164 optionally receives user information from the client device 220, such as event information 514 (e.g., edits to event categories), and zone definitions 515, and persons data 526 (e.g., classification of detected persons).

A data processing pipeline processes video information (e.g., a live video feed) received from a video source 501 (e.g., including a camera 118 and an optional controller device) and/or audio information received from one or more smart devices in real-time (e.g., within 10 seconds, 30 seconds, or 2 minutes) to identify and categorize events occurring in the smart home environment, and sends real-time event alerts (e.g., within 10 seconds, 20 seconds, or 30 seconds) and a refreshed event timeline (e.g., within 30 seconds, 1 minute, or 3 minutes) to a client device 220 associated with a reviewer account for the smart home environment. The data processing pipeline also processes stored information (such as stored video feeds from a video source 501) to reevaluate and/or re-categorize events as necessary, such as when new information is obtained regarding the event and/or when new information is obtained regarding event categories (e.g., a new activity zone is obtained from the user).

After video and/or audio data is captured at a smart device, the data is processed to determine if any potential event candidates or persons are present. In some implementations, the data is initially processed at the smart device (e.g., video source 501 or camera 118). Thus, in some implementations, the smart device sends event candidate information, such as event start information, to the server system 164. In some implementations, the data is processed at the server system 164 for event start detection. In some implementations, the video and/or audio data is stored on server system 164 (e.g., in video and source data database 509). In some implementations, the video stream is stored on a server distinct from server system 164. In some implementations, after a motion start is detected, the relevant portion of the video stream is retrieved from storage (e.g., from video and source data database 509).

In some implementations, the event identification process includes segmenting the video stream into multiple segments then categorizing the event candidate within each segment. In some implementations, categorizing the event candidate includes an aggregation of background factors, entity detection and identification, motion vector generation for each motion entity, entity features, and scene features to generate motion features for the event candidate. In some implementations, the event identification process further includes categorizing each segment, generating or updating an event log based on categorization of a segment, generating an alert for the event based on categorization of a segment, categorizing the complete event, updating the event log based on the complete event, and generating an alert for the event based on the complete event. In some implementations, a categorization is based on a determination that the event occurred within a particular zone of interest. In some implementations, a categorization is based on a determination that the event candidate involves one or more zones of interest. In some implementations, a categorization is based on audio data and/or audio event characterization.

The event analysis and categorization process may be performed by the smart device (e.g., the video source 501) and the server system 164 cooperatively, and the division of the tasks may vary in different implementations, for different equipment capability configurations, and/or for different network and server load situations. After the server system 164 categorizes the event candidate, the result of the event detection and categorization may be sent to a reviewer associated with the smart home environment.

In some implementations, the server system 164 stores raw or compressed video data (e.g., in a video and source data database 509), event categorization models (e.g., in an event categorization model database 510), and event masks and other event metadata (e.g., in an event data and event mask database 511) for each of the video sources 501. In some implementations, the video data is stored at one or more display resolutions such as 480p, 780p, 1080i, 1080p, and the like.

In some implementations, the video source 501 (e.g., the camera 118) transmits a live video feed to the remote server system 164 via one or more networks (e.g., the network(s) 162). In some implementations, the transmission of the video data is continuous as the video data is captured by the camera 118. In some implementations, the transmission of video data is irrespective of the content of the video data, and the video data is uploaded from the video source 501 to the server system 164 for storage irrespective of whether any motion event has been captured in the video data. In some implementations, the video data may be stored at a local storage device of the video source 501 by default, and only video portions corresponding to motion event candidates detected in the video stream are uploaded to the server system 164 (e.g., in real-time).

In some implementations, the video source 501 dynamically determines at what display resolution the video stream is to be uploaded to the server system 164. In some implementations, the video source 501 dynamically determines which parts of the video stream are to be uploaded to the server system 164. For example, in some implementations, depending on the current server load and network conditions, the video source 501 optionally prioritizes the uploading of video portions corresponding to newly detected motion event candidates ahead of other portions of the video stream that do not contain any motion event candidates; or the video source 501 uploads the video portions corresponding to newly detected motion event candidates at higher display resolutions than the other portions of the video stream. This upload prioritization helps to ensure that important motion events are detected and alerted to the reviewer in real-time, even when the network conditions and server load are less than optimal. In some implementations, the video source 501 implements two parallel upload connections, one for uploading the continuous video stream captured by the camera 118, and the other for uploading video portions corresponding to detected motion event candidates. At any given time, the video source 501 determines whether the uploading of the continuous video stream needs to be suspended temporarily to ensure that sufficient bandwidth is given to the uploading of the video segments corresponding to newly detected motion event candidates.

In some implementations, the video stream uploaded for cloud storage is at a lower quality (e.g., lower resolution, lower frame rate, higher compression, etc.) than the video segments uploaded for motion event processing.

As shown in FIG. 5, the video source 501 includes a camera 118, and an optional controller device. In some implementations, the camera 118 includes sufficient on-board processing power to perform all necessary local video processing tasks (e.g., cuepoint detection for motion event candidates, video uploading prioritization, network connection management, etc.), and the camera 118 communicates with the server system 164 directly, without any controller device acting as an intermediary. In some implementations, the camera 118 captures the video data and sends the video data to the controller device for the necessary local video processing tasks. The controller device optionally performs the local processing tasks for multiple cameras. For example, there may be multiple cameras in one smart home environment (e.g., the smart home environment 100, FIG. 1), and a single controller device receives the video data from each camera and processes the video data to detect motion event candidates in the video stream from each camera. The controller device is responsible for allocating sufficient outgoing network bandwidth to transmitting video segments containing motion event candidates from each camera to the server before using the remaining bandwidth to transmit the video stream from each camera to the server system 164. In some implementations, the continuous video stream is sent and stored at one server facility while the video segments containing motion event candidates are send to and processed at a different server facility.

In some implementations, the smart device sends additional source information 503 to the server system 164. This additional source information 503 may include information regarding a device state (e.g., IR mode, AE mode, DTPZ settings, etc.) and/or information regarding the environment in which the device is located (e.g., indoors, outdoors, night-time, day-time, etc.). In some implementations, the source information 503 is used by the server system 164 to perform event detection, entity recognition, and/or to categorize event candidates. In some implementations, the additional source information 503 includes one or more preliminary results from video processing performed by the camera 118 (e.g., categorizations, object/entity recognitions, motion masks, etc.).

In some implementations, the video portion after an event start incident is detected is divided into multiple segments. In some implementations, the segmentation continues until event end information (sometimes also called an "end-of-event signal") is obtained. In some implementations, the segmentation occurs within the server system 164 (e.g., by the event processor 505). In some implementations, the segmentation comprises generating overlapping segments.

For example, a 10-second segment is generated every second, such that a new segment overlaps the prior segment by 9 seconds.

In some implementations, each of the multiple segments is of the same or similar duration (e.g., each segment has a 10-12 second duration). In some implementations, the first segment has a shorter duration than the subsequent segments. Keeping the first segment short allows for real time initial categorization and alerts based on processing the first segment. The initial categorization may then be revised based on processing of subsequent segments. In some implementations, a new segment is generated if the motion entity enters a new zone of interest.

In some implementations, after the event processor module obtains the video portion corresponding to an event candidate, the event processor 505 obtains background factors and performs motion entity detection identification, motion vector generation for each motion entity, and feature identification. Once the event processor 505 completes these tasks, the event categorizer 507 aggregates all of the information and generates a categorization for the motion event candidate. In some implementations, the event processor 505 and the event categorizer 507 are components of the video processing module 3144. In some implementations, false positive suppression is optionally performed to reject some motion event candidates before the motion event candidates are submitted for event categorization. In some implementations, determining whether a motion event candidate is a false positive includes determining whether the motion event candidate occurred in a particular zone. In some implementations, determining whether a motion event candidate is a false positive includes analyzing an importance score for the motion event candidate. The importance score for a motion event candidate is optionally based on zones of interest involved with the motion event candidate, background features, motion vectors, scene features, entity features, motion features, motion tracks, and the like.

In some implementations, the video source 501 has sufficient processing capabilities to perform, and does perform, entity detection, person recognition, background estimation, motion entity identification, the motion vector generation, and/or the feature identification.

Figure 6:
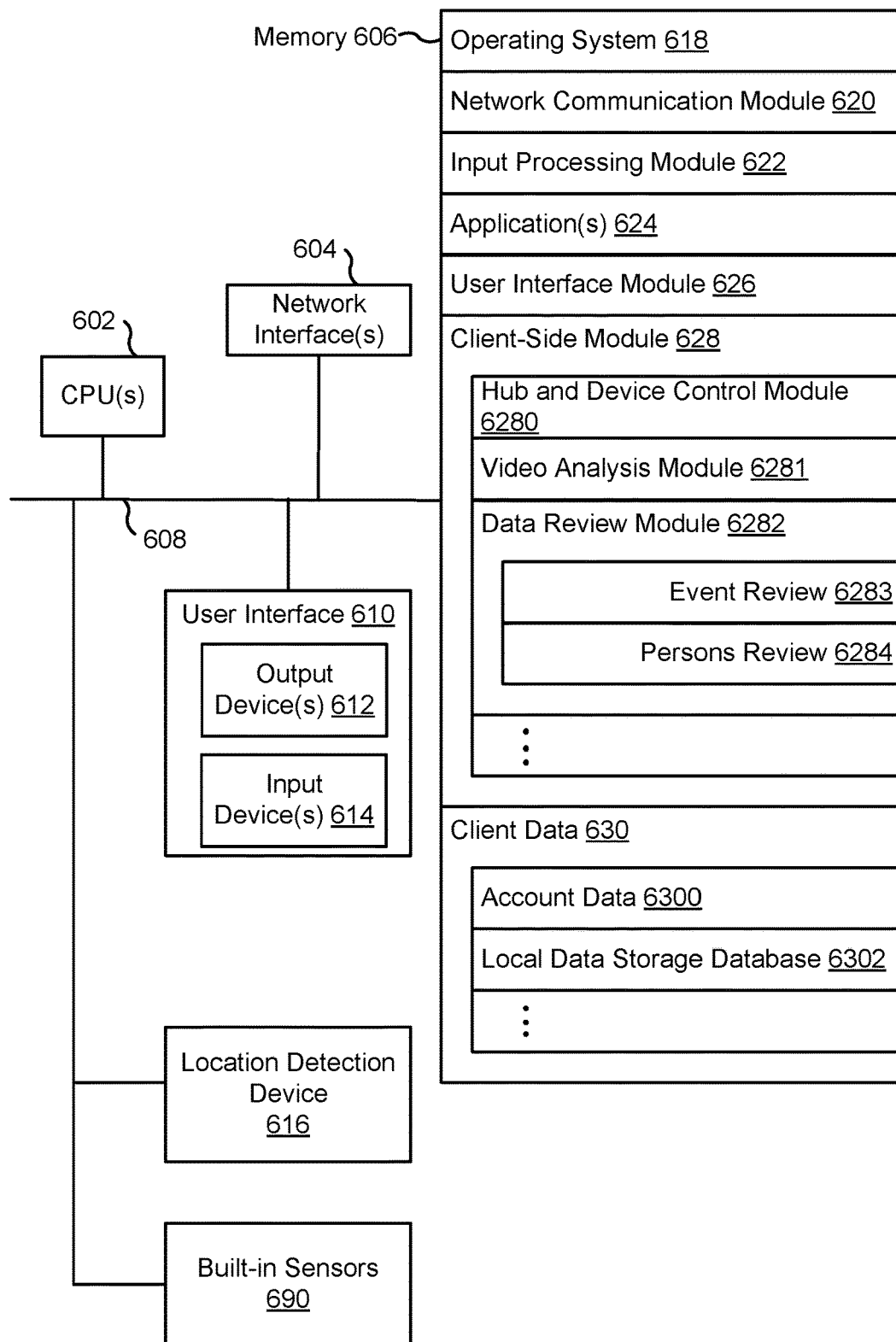
FIG. 6 is a block diagram illustrating a representative client device in accordance with some implementations.

FIG. 6 is a block diagram illustrating a representative client device 220 associated with a user account in accordance with some implementations. The client device 220, typically, includes one or more processing units (CPUs) 602, one or more network interfaces 604, memory 606, and one or more communication buses 608 for interconnecting these components (sometimes called a chipset). Optionally, the client device also includes a user interface 610 and one or more built-in sensors 690 (e.g., accelerometer and gyroscope). The user interface 610 includes one or more output devices 612 that enable presentation of media content, including one or more speakers and/or one or more visual displays. The user interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 616, such as a GPS (global positioning satellite) or other geo-location receiver, for determining the location of the client device.

The memory 606 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 606, optionally, includes one or more storage devices remotely located from one or more processing units 602. The memory 606, or alternatively the non-volatile memory within the memory 606, includes a non-transitory computer readable storage medium. In some implementations, the memory 606, or the non-transitory computer readable storage medium of the memory 606, stores the following programs, modules, and data structures, or a subset or superset thereof:

- an operating system 618 including procedures for handling various basic system services and for performing hardware dependent tasks;
- a network communication module 620 for connecting the client device 220 to other systems and devices (e.g., client devices, electronic devices, and systems connected to one or more networks 162) via one or more network interfaces 604 (wired or wireless);
- an input processing module 622 for detecting one or more user inputs or interactions from one of the one or more input devices 614 and interpreting the detected input or interaction;
- one or more applications 624 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);
- a user interface module 626 for providing and displaying a user interface in which settings, captured data, and/or other data for one or more devices (e.g., smart devices 204 in smart home environment 100) can be configured and/or viewed;
- a client-side module 628, which provides client-side functionalities for device control, data processing and data review, including but not limited to:
  - a hub device and device control module 6280 for generating control commands for modifying an operating mode of the hub device or the electronic devices in accordance with user inputs;
  - a video analysis module 6281 for analyzing captured video data, e.g., to detect and/or recognize persons, objects, animals, and events, such as described previously with respect to video analysis module 442; and
  - a data review module 6282 for providing user interfaces for reviewing data processed by the server system 164, including but not limited to:
    - an event review submodule 6283 for reviewing events (e.g., motion and/or audio events), and optionally enabling user edits and/or updates to the events; and
    - a persons review submodule 6284 for reviewing data and/or images regarding detected persons and other entities, and optionally enabling user edits and/or updates to the persons data; and client data 630 storing data associated with the user account and electronic devices, including, but not limited to:
  account data 6300 storing information related to both user accounts loaded on the client device and electronic devices (e.g., of the video sources 501) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and
  a local data storage database 6302 for selectively storing raw or processed data associated with electronic devices (e.g., of the video sources 501, such as a camera 118), optionally including entity data such as the entity data 4344 described previously.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various implementations. In some implementations, the memory 606, optionally, stores a subset of the modules and data structures identified above. Furthermore, the memory 606, optionally, stores additional modules and data structures not described above.

Figure 7A:
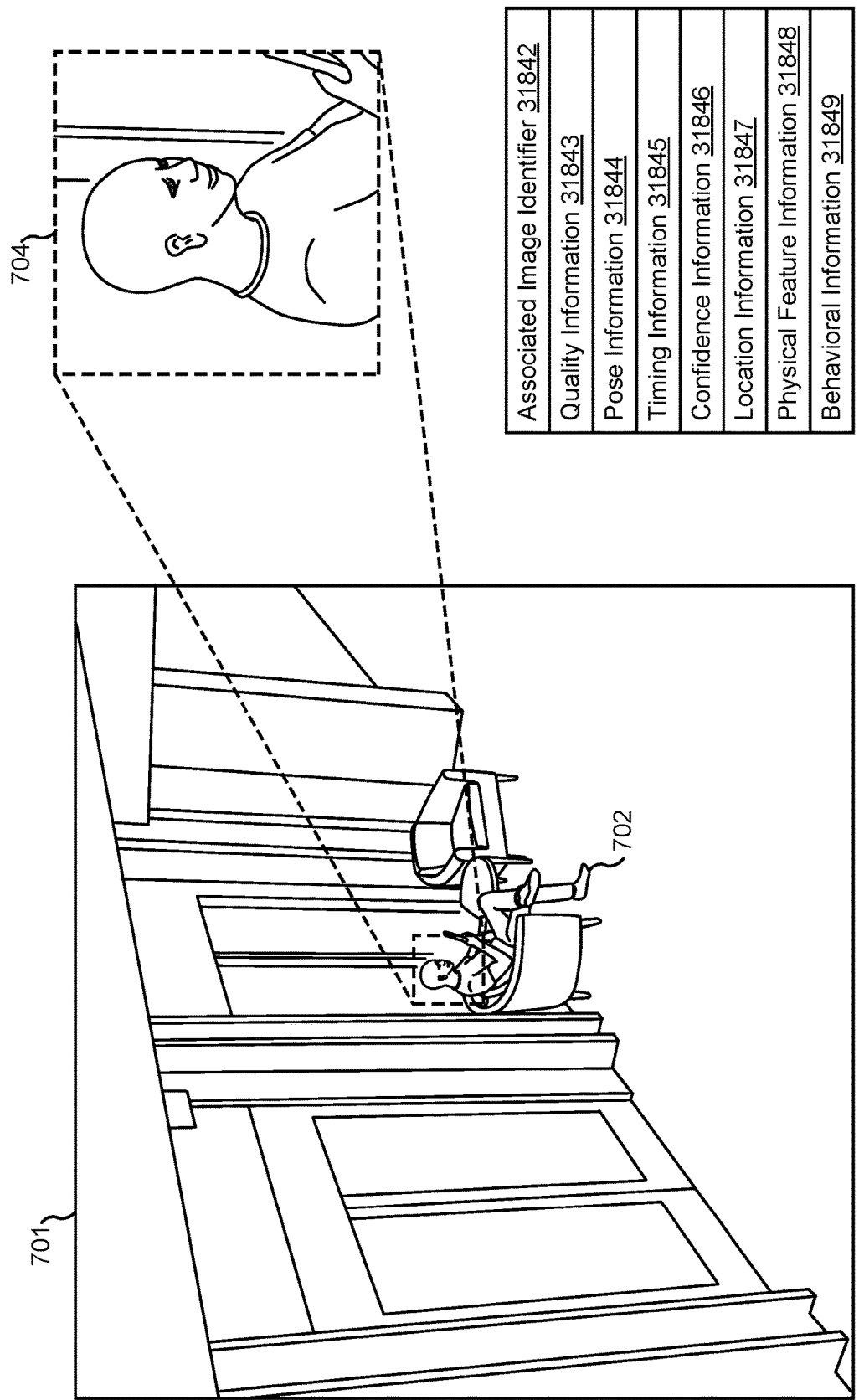
FIGS. 7A-7B illustrate a representative person detection and recognition process in accordance with some implementations.
Figure 7B:
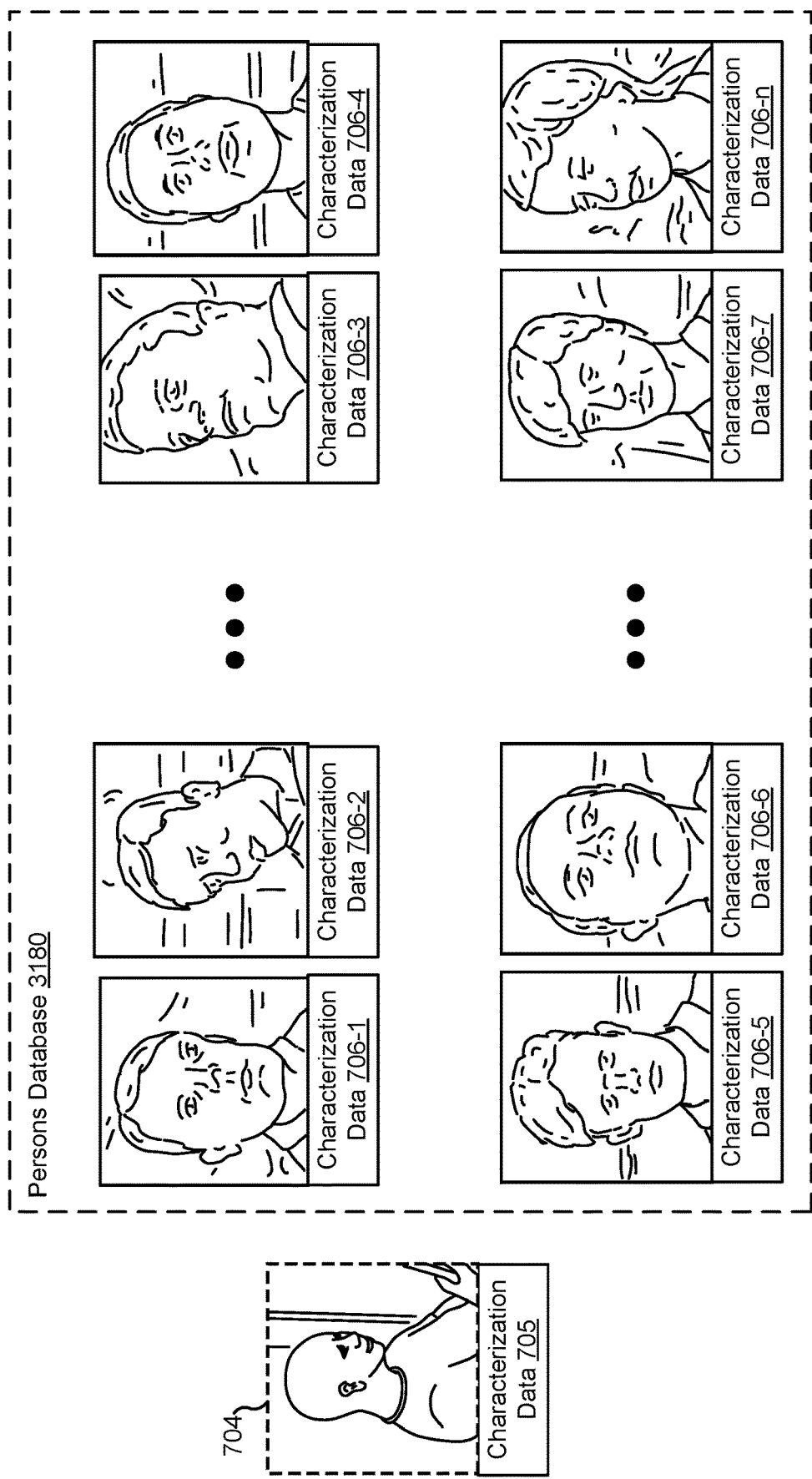

FIGS. 7A-7B illustrate a representative person detection and recognition process in accordance with some implementations. FIG. 7A shows an image 701 (e.g., corresponding to a camera 118's field of view) including a detected person 702. FIG. 7A also shows an image portion 704 of the image corresponding to the detected person 702, and characterization data 3184 obtained from an analysis of the image portion 704. In some implementations, the image portion 704 is cropped from the image 701. In some implementations, the image 701 represents a downsampled image from the camera (e.g., having first resolution) and the image portion 704 is cropped from a non-downsampled image (e.g., having a second resolution, higher than the first resolution). In some implementations, the characterization data 3184 is based on an analysis of image portion 704 and/or image 701. In some implementations, the characterization data 3184 is further based on additional input data, such as audio data and data from other smart devices in the smart home environment.

FIG. 7B shows the image portion 704 and corresponding characterization data 705 compared with stored images and characterization data 706 within the persons database 3180. In some implementations, the characterization data 705 is compared with each set of stored characterization data 706. In some implementations, the characterization data 705 is compared with aggregate stored characterization data (e.g., characterization data representing an average or medium of a subset of the stored characterization data 706). In some implementations, in accordance with a determination that the characterization data 705 is within a predetermined similarity to a stored characterization data 706, the system associates the image 704 with the image corresponding to the similar characterization data 706. For example, the system applies a label designating the detected person as "John" from the similar characterization data 706 to the characterization data 705 and/or image 704. In this example, the system associates the characterization data 705 and image 704 with a profile for the person designed as "John." In some implementations, in accordance with a determination that the characterization data 705 is not within a predetermined similarity to any of the stored characterization data 706, the system designates the image 704 and characterization data 705 as being for an unknown person. In some implementations, the system subsequently enables a user to label and/or classify the unknown person.

Figure 8:
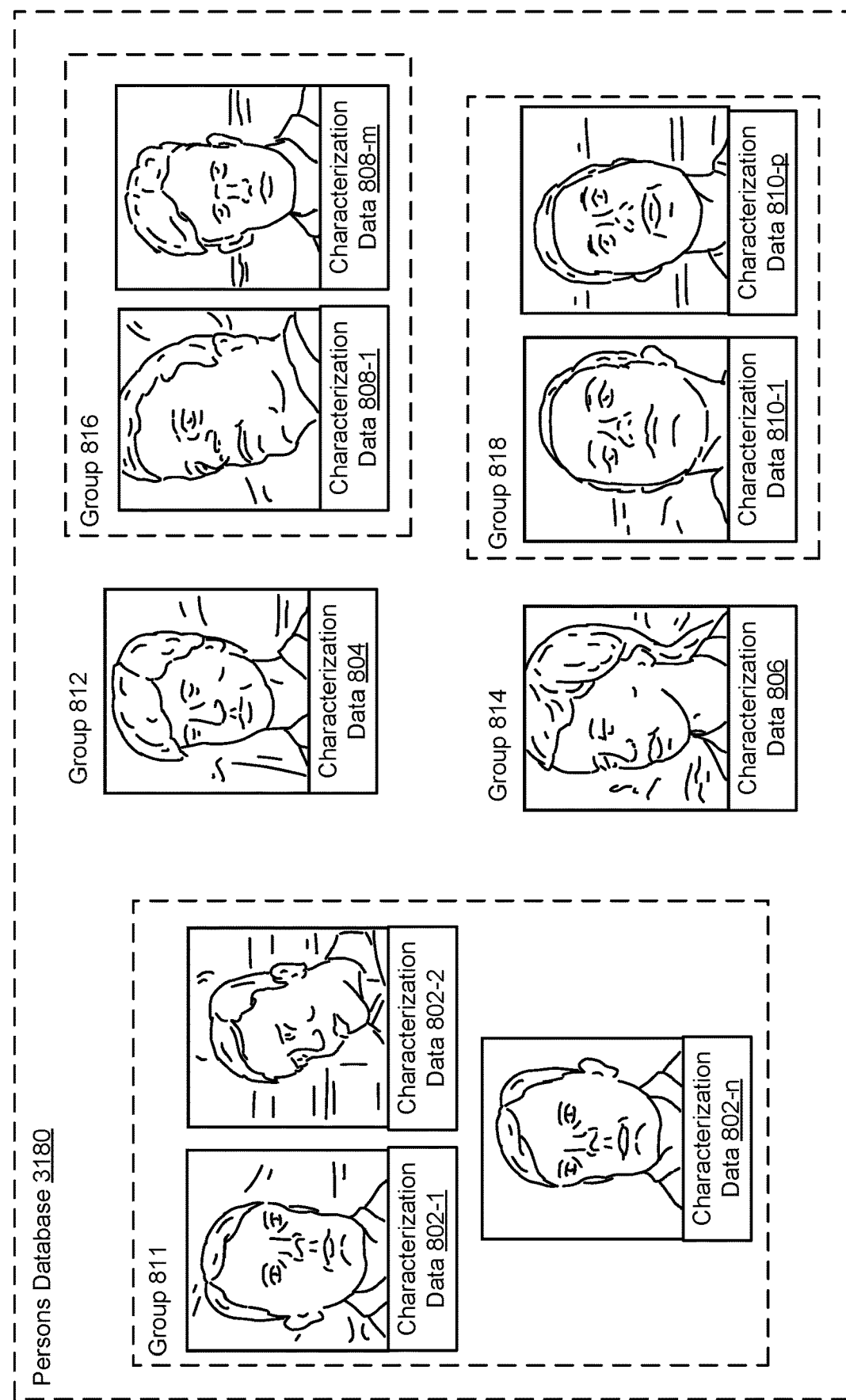
FIG. 8 illustrates a representative persons database in accordance with some implementations.

FIG. 8 illustrates elements of the persons database 3180 in accordance with some implementations. As shown in FIG. 8, the persons database 3180 includes a plurality of images and corresponding characterization data grouped into a plurality of groups (e.g., with each group representing a different person). In FIG. 8, characterization data 802 (e.g., 802-1 through 802-$n$) and corresponding images are grouped into group 811 (e.g., representing a first person), characterization data 804 and corresponding image is in a group 812 (e.g., representing a second person), characterization data 806 and corresponding image is in a group 814 (e.g., representing a third person), characterization data 808 (e.g., 808-1 through 808-$m$) and corresponding images are grouped into group 816 (e.g., representing a fourth person), and characterization data 810 (e.g., 810-1 through 810-$p$) and corresponding images are grouped into group 818 (e.g., representing a fifth person). In some implementations, one or more of the groups represent an unknown person (e.g., a person that has not yet been classified by a user). In some implementations, one or more of the groups represent an unknown person (e.g., a person that has not yet been classified by a user).

Figure 9A:
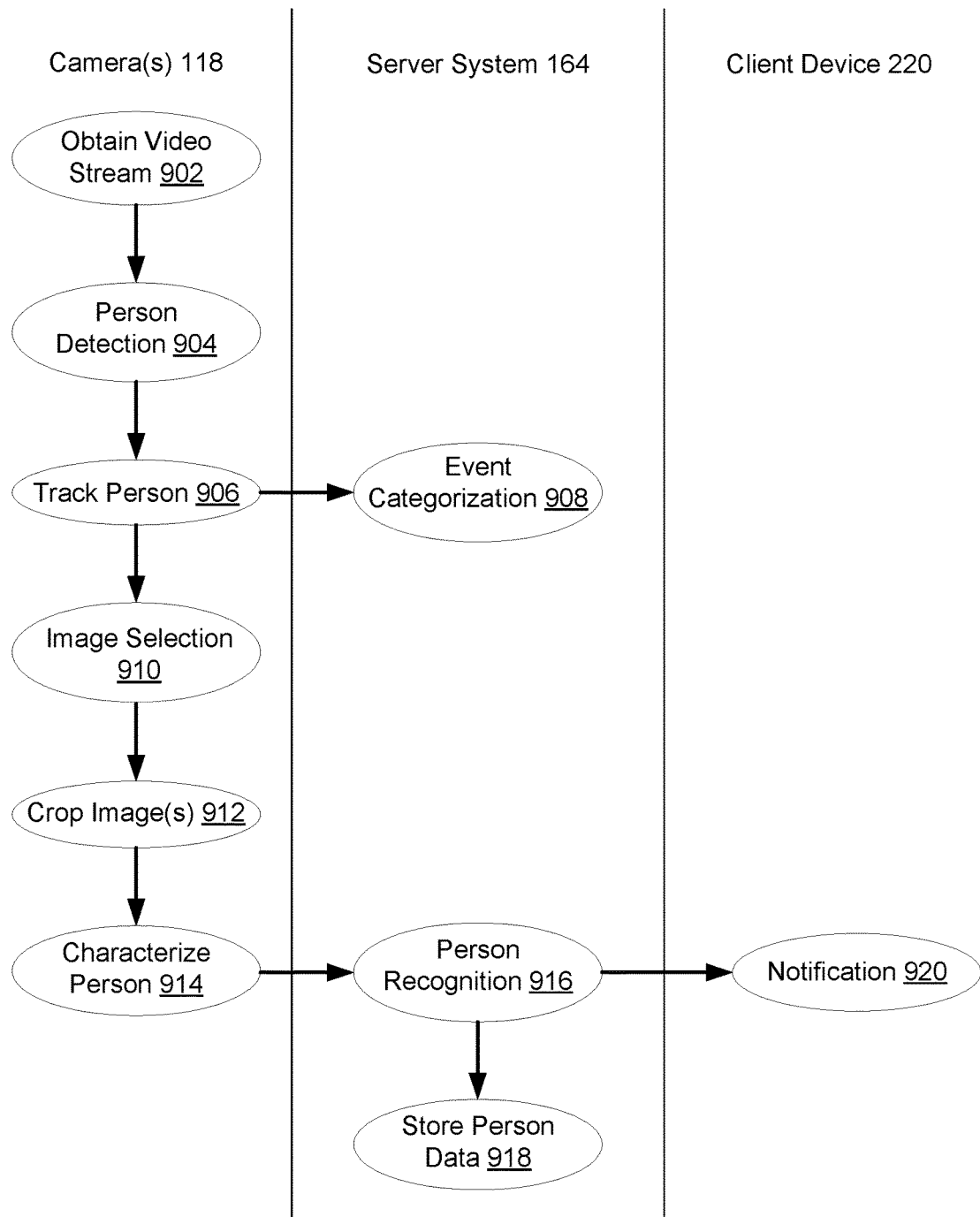
FIGS. 9A-9C are flow diagrams illustrating representative methods of person detection in accordance with some implementations.
Figure 9B:
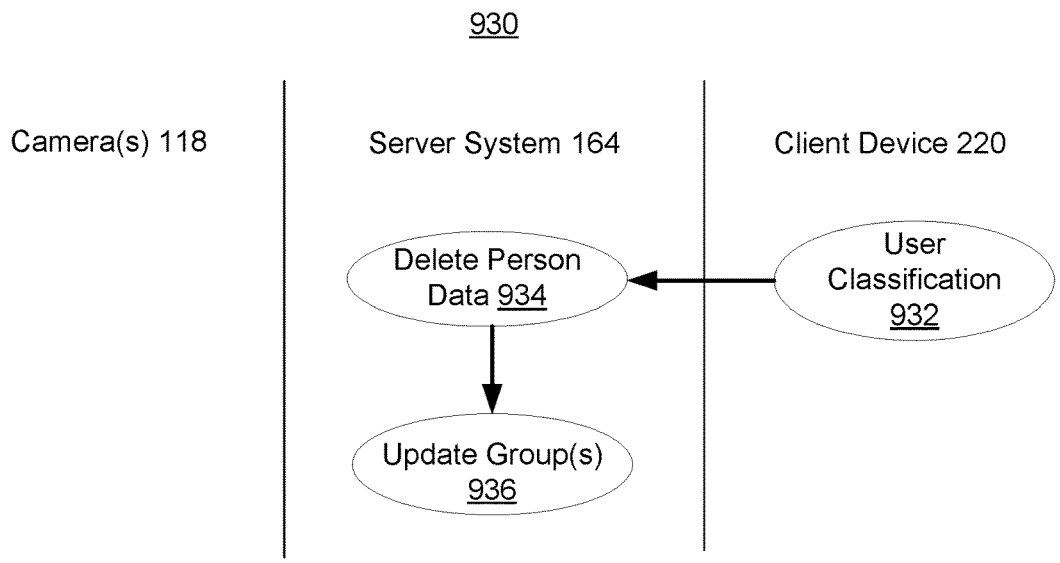
Figure 9C:
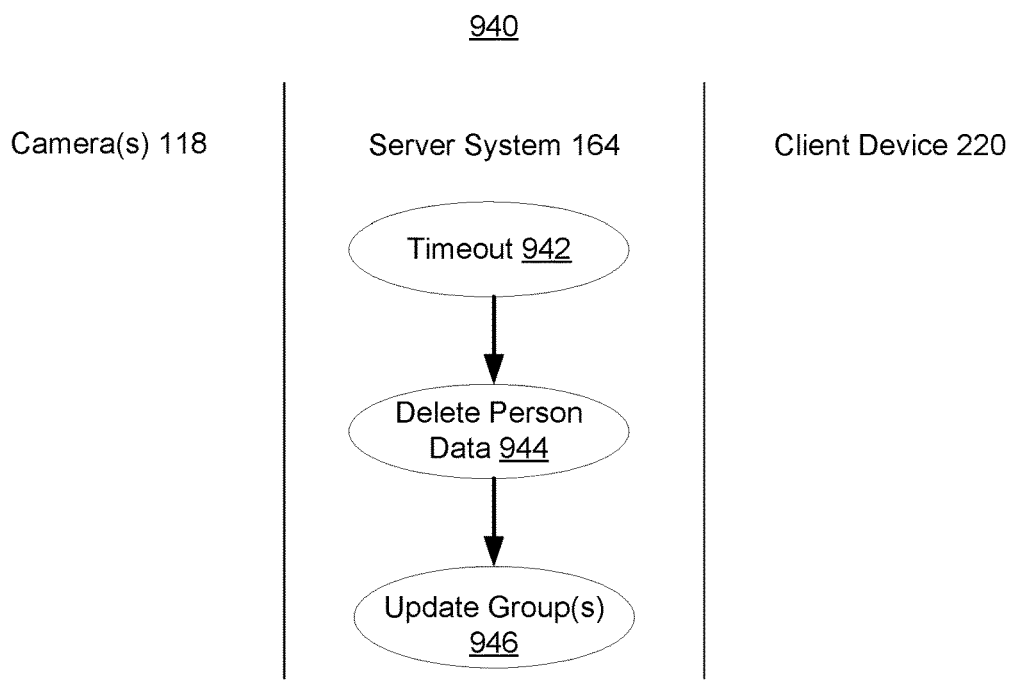

FIGS. 9A-9C are flow diagrams illustrating methods of person detection in accordance with some implementations. In some implementations, the methods are performed by: (1) one or more cameras 118; (2) the server system 164; (3) a client device 220; or (4) a combination thereof. In some instances and implementations, the various operations of the methods described herein are interchangeable, and respective operations of the methods are performed by any of the aforementioned devices, systems, or combination of devices and/or systems. For example, the person detection operation (904) is optionally performed by camera(s) 118 or server system 164. In some implementations, the methods are governed by instructions that are stored in one or more non-transitory computer-readable storage mediums, and that are executed by one or more processors, such as the CPU(s) 302 of server system 164 and/or the CPU(s) 402 of smart device 204 (e.g., a camera 118). For convenience, the method operations will be described below as being performed by particular component or device, but should not be construed as limiting the performance of the operation to the particular device in all implementations.

FIG. 9A shows a method 900 of recognizing persons in a video stream. The camera(s) 118 obtain (902) a video stream. In some implementations, a camera 118 captures the video stream via an image sensor (e.g., an image capture device 418).

The camera 118 performs person detection (904) on the obtained video stream (e.g., utilizing entity detection module 4422). In some implementations, performing person detection comprises analyzing one or more images of the video stream to detect one or more persons. In some implementations, the camera 118 performs person detection only in response to motion or audio being detected. In some implementations, the camera 118 performs person detection only in an area of the scene corresponding to where the motion/audio was detected. In some implementations, the camera 118 performs person detection a set interval (e.g., every 10th, 20th, or 100th frame). In some implementations, the camera 118 performs person detection at a set interval in response to a trigger event (such as the detection of motion or audio in the scene). In some implementations, the camera 118 performs person detection on a downsampled image. In some implementations, the camera 118 performs person detection by applying a face detection algorithm to image data. In some implementations, the camera 118 performs person detection utilizing a face detection library. In some implementations, the person detection (904) is performed by the server system 164. In some implementations, the camera 118 transmits the video stream to the server system 164 and the server system performs the person detection (e.g., in response to a start of a motion or audio event).

In some implementations, in accordance with detection of one or more persons, the camera 118 tracks (906) the detected person(s) (e.g., utilizing video analysis module 442). In some implementations, the camera 118 tracks the detected person(s) by performing person detection at set intervals (e.g., every frame, every 5th frame, or every 25th frame) and linking detected persons at a first time to detected persons at a second time. In some implementations, the camera 118 tracks the detected person(s) by performing a detection algorithm only to a portion of the scene at or near the previously detected person (e.g., within 50 or 100 pixels). In some implementations, the camera 118 tracks the detected person(s) by obtaining a pattern corresponding to the detected person and performing pattern recognition on subsequent frames or images. In some implementations, the person tracking (906) is performed by the server system 164.

In some implementations, information regarding the detected person(s) (e.g., location and tracking information for the person) is utilized in categorizing the event involving the detected person(s) (908). In some implementations, the camera(s) 118 transmit the detected persons information to the server system 164 and the server system 164 utilizes the detected persons information to categorize the event (e.g., a motion event) involving the detected persons (e.g., utilizing video processing module 3146 and/or event categorizer 507).

In some implementations, the camera(s) 118 select (910) one or more images for further analysis of the detected person(s) (e.g., utilizing characterization module 4424). In some implementations, the camera(s) generate a quality factor for each image in which the person is detected and select the one or more images based on the quality factor for each. In some implementations, the camera(s) determine a pose for the detected person(s) in each image and the one or more images are selected based on the determined poses. In some implementations, the camera(s) 118 select the one or more images after a preset amount of time has elapsed since first detection of the person(s) (e.g., 5 seconds, 10 seconds, 30 seconds, or 2 minutes). In some implementations, the image selection is performed by the server system 164.

In some implementations, the camera(s) 118 obtain (912) an image portion from the selected images for each detected person (e.g., utilizing characterization module 4424). For example, FIG. 7A shows image portion 704 obtained for detected person 702. In some implementations, the camera(s) 118 crop the selected images to obtain the image portions. In some implementations, the server system 164 obtains the image portions.

The camera(s) 118 characterize (914) the detected person(s) based on analysis of the image portions (e.g., utilizing characterization module 4424). For example, FIG. 7A shows characterization data 705 generated at least in part from analysis of image portion 704. In some implementations, characterizing a person comprises generating a feature signature for the person. In some implementations, characterizing a person comprises generating a facial feature signature for the person. In some implementations, characterizing a person comprises utilizing a deep convolutional network. In some implementations, characterizing a person comprises utilizing a mapping of facial images to a Euclidean space where distances correspond to a measure of face similarity. In some implementations, the server system 164 characterizes the detected persons.

The server system 164 performs person recognition (916) for the detected person(s) based on the characterization data (e.g., utilizing entity recognition module 3152). In some implementations, performing person recognition comprises comparing the characterization data of the detected person(s) with stored characterization data of previously detected persons. For example, as illustrated in FIG. 7B, the characterization data 705 is compared with the stored characterization data 706 corresponding to a plurality of previously detected persons. In some implementations, the camera(s) 118 perform the person recognition. In some implementations, in accordance with a determination that the detected person is recognized, the system associates the characterization data and image portion with the recognized person.

The server system 164 stores (918) the selected images, image portions, characterization data, and/or recognition information within a persons database (e.g., persons database 3180). In some implementations, the server system 164 stores a subset of the information based on whether the person was recognized (e.g., the system stores all information for recognized persons, but only a portion of the data for unknown persons).

Figure 10A:
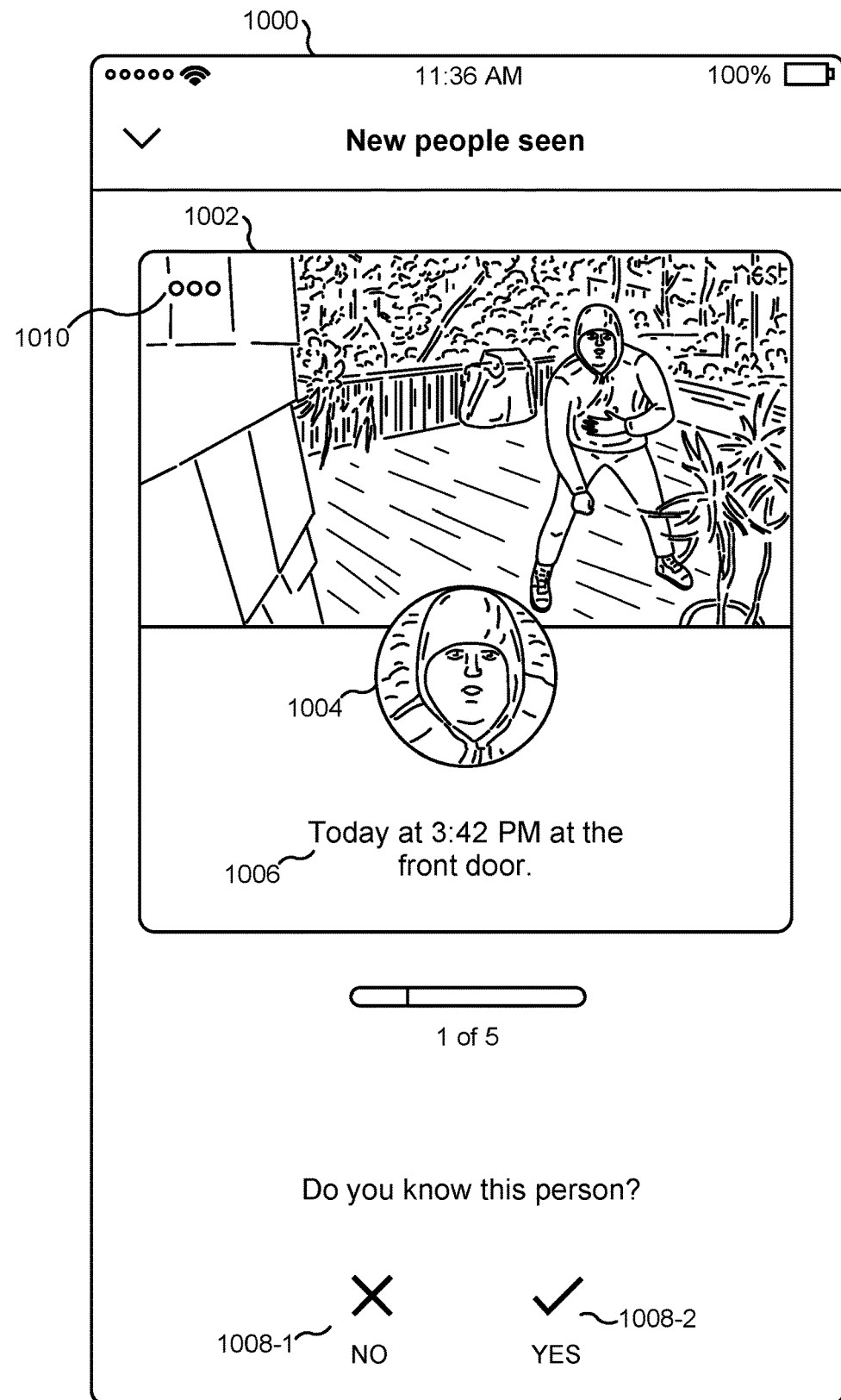
FIGS. 10A-10C are representative user interfaces for presenting person detection information in accordance with some implementations.

The server system 164 generates (920) a notification regarding the detected person(s) (e.g., utilizing user-facing frontend 3150). In some implementations, the server system 164 utilizes the person recognition results to characterize the event (908) involving the person(s). In some implementations, the server system 164 generates a notification incorporating information from both the person recognition and the event categorization. In some implementations, the notification specifies whether or not the detected person(s) were recognized (e.g., are known or unknown to the server system 164). In some implementations, the notification enables a user to classify the detected person(s) (e.g., as shown in FIG. 10A). In some implementations, the notification includes the image portion and an image corresponding to the camera's field of view. In some implementations, server system 164 generates the notification in real-time (e.g., within 10 seconds, 20 seconds, or 45 seconds of the initial person detection).

The client device 220 receives the notification (e.g., via network interface(s) 604) and presents it to a user of the device (e.g., utilizing user interface module 626 and/or client-side module 628). For example, the client device displays the notification within a smart home application running at the client device as shown in FIG. 11D.

Figure 10B:
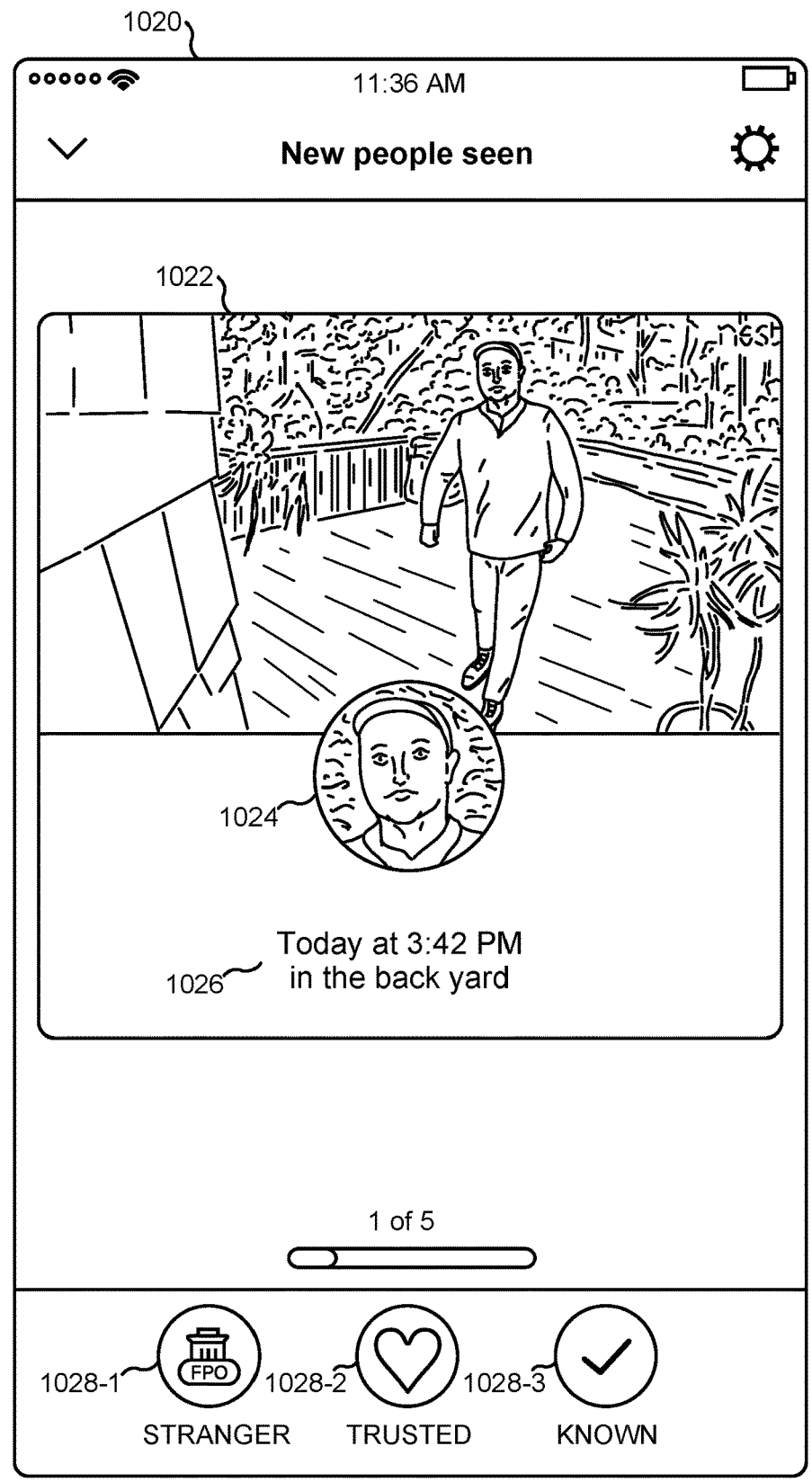

FIG. 9B shows a method 930 of curating a persons database (e.g., persons database 3180). The client device 220 receives (932) a classification of a detected person from a user. For example, the client device receives a classification for an unrecognized person via a user interface, such as is shown in FIG. 10B.

The server system 164 receives the classification from the client device 220 and updates the persons database accordingly. In accordance with a classification that the detected person is a stranger, the server system 164: (1) deletes (934)

the person data for the stranger (e.g., the selected images, image portions, characterization data, and/or recognition information for the stranger); and (2) updates (936) any group to which the stranger was assigned. For example, in some implementations, the server system 164 deletes the group(s) to which the stranger was assigned (e.g., in accordance with a determination that the stranger has not given consent to having his/her personal information stored). In some implementations, the user classification indicates that the stranger's data was misclassified by the system and, in response to receiving the user classification, the system deletes the stranger's data and updates the group(s) so as to not account for any characterization data of the stranger. For example, the system adjusts a profile and/or profile characterization data to remove any incorporation of the stranger's characterization data.

FIG. 9C shows a method 940 of curating a persons database (e.g., persons database 3180). The server system 164 determines (942) that a preset amount of time has elapsed since storing the person data for an unrecognized person (e.g., 3 days, 1 week, or 2 weeks) and that classification of the unrecognized person has not been received from a user. In some implementations, the preset amount of time is based on a subscription service for the user. For example, the user has a subscription service that stores recorded video for 14 days and thus the preset amount of time is 14 days. In some implementations, the preset amount of time is based on an individual subscription service for a particular camera. Thus, in some implementations and instances, person data collected by a first camera (e.g., having a corresponding 30-day subscription service) in a smart home is stored longer than person data collected by a second camera in the smart home (e.g., having a corresponding 7-day subscription service) based on the subscription services for each camera.

In accordance with the determination that the preset amount of time has elapsed and that a classification has not been received, the server system 164: (1) deletes (944) the person data for the unrecognized person (e.g., the selected images, image portions, characterization data, and/or recognition information for the unrecognized person); and (2) updates (946) any group to which the unrecognized person was assigned. For example, in some implementations, the server system 164 deletes the group(s) to which the unrecognized person was assigned (e.g., in accordance with a determination that the unrecognized person has not given consent to having his/her personal information stored).

Figure 10C:
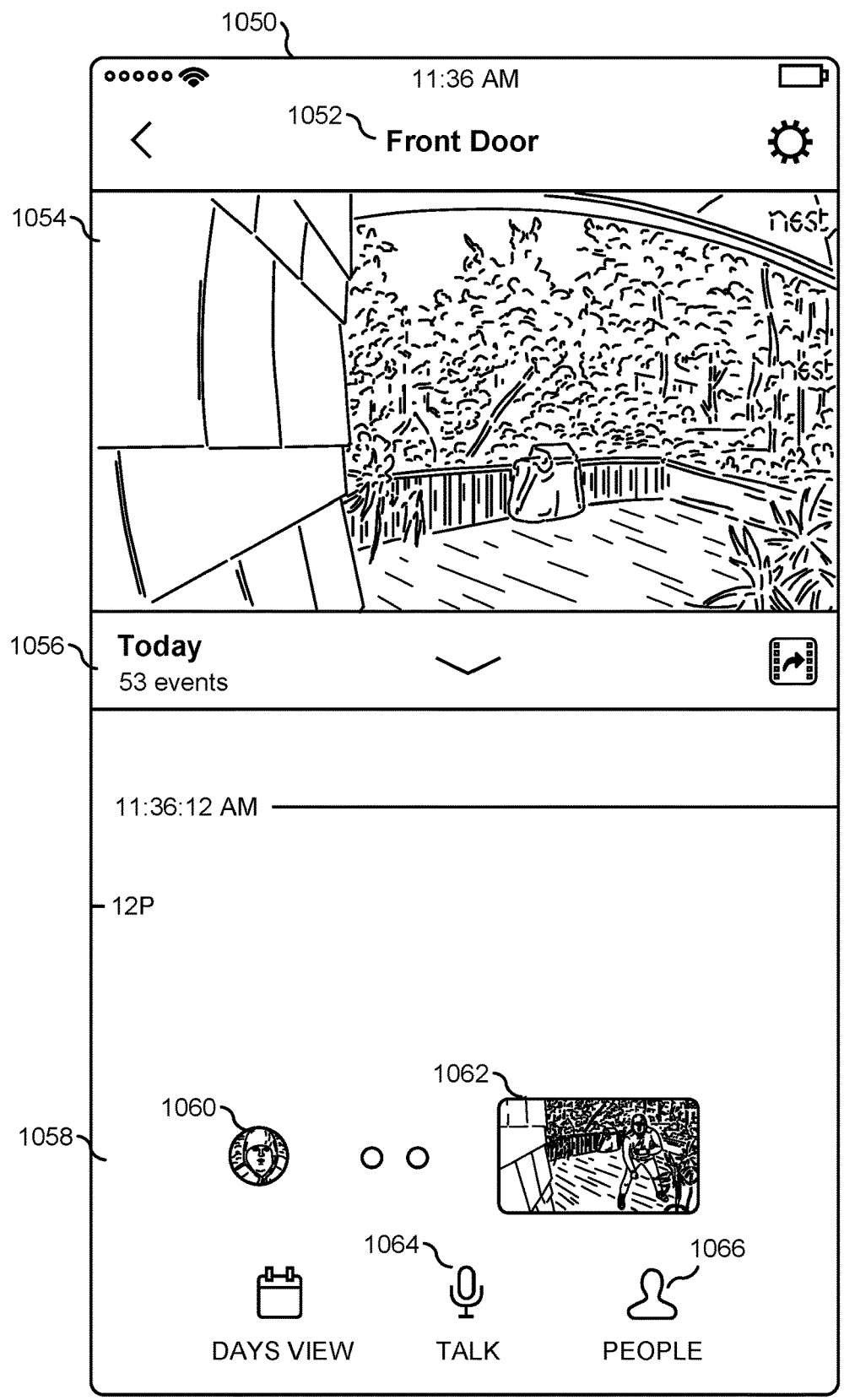

FIGS. 10A-10C are representative user interfaces for presenting person detection information in accordance with some implementations. FIG. 10A shows a user interface 1000 for presenting detected persons information to a user. In accordance with some implementations, the user interface includes an image of the scene 1002, an image portion for the detected person 1004, context information 1006, and classification affordances 1008 (e.g., a "Yes" affordance 1008-2 and a "No" affordance 1008-1). In some implementations, the user interface is presented at a client device 220 (e.g., utilizing user interface module 626 and/or persons review module 6284). In some implementations, the image of the scene 1002 is part of a video clip (e.g., in gif format) showing activity of the detected person. In some implementations, the video clip is composed of a plurality of frames from the camera (e.g., every 10th, 30th, or 100th frame) corresponding to an event involving the detected person. In some implementations, the image portion for the detected person 1004 is displayed at a higher resolution than the corresponding section of the image of the scene 1002. For example the image of the scene 1002 is downsampled from a higher resolution of the camera, whereas the image portion 1004 is at the higher resolution.

In accordance with some implementations, the user interface 1000 also includes a menu icon 1010 for displaying or toggling a menu of additional options. In some implementations, the menu includes options for labeling the person (e.g., as a particular person, such as a neighbor for friend), labeling the event, and/or designating the detected person as a false positive (e.g., not an actual person). In some implementations, the menu includes an option for viewing additional video information from the corresponding camera (e.g., for displaying user interface 1050 in FIG. 10C). In some implementations, the user interface 1000 includes an affordance enabling the user to label the detected person and/or the event. For example, the user interface includes an affordance (e.g., a button or checkbox) for identifying the detected person as a particular person (e.g., as "John, the neighbor").

FIG. 10B shows another user interface, user interface 1020, for presenting detected persons information to a user. In accordance with some implementations, the user interface 1020 includes an image of the scene 1022, an image portion for the detected person 1024, context information 1026, and classification affordances 1028. In accordance with some implementations, the classification affordances 1028 include a "Stranger" affordance 1028-1, a "Trusted" affordance 1028-2, and a "Known" affordance 1028-3. In some implementations, classification of a detected person as a stranger causes the stranger's characterization information to be deleted, adjustment of the classification of the corresponding event to indicate that the person involved was a stranger, and/or updating of an event timeline to indicate on the timeline that a stranger was involved in the corresponding event. In some implementations, classification of a detected person as known person generates a request to the user to label or otherwise identify the known person. In some implementations, classification of a detected person as known person results in an adjustment of the classification of the corresponding event to indicate that the person involved was a person known to the user, and/or updating of an event timeline to indicate on the timeline that a known was involved in the corresponding event. In some implementations, the classification of the detected person as a known person is utilized in subsequent events to determine whether to alert the user of the subsequent event. In some implementations, classification of a detected person as trusted person generates a request to the user to label or otherwise identify the trusted person. In some implementations, classification of a detected person as trusted person generates a request to the user to specify an authorization level for the trusted person. In some implementations, classification of a detected person as trusted person results in an adjustment of the classification of the corresponding event to indicate that the person involved was a trusted person, and/or updating of an event timeline to indicate on the timeline that a trusted person was involved in the corresponding event (or to remove the event from the timeline in accordance with a determination that the event was unimportant to the user). In some implementations, the classification of the detected person as a trusted person is utilized in subsequent events to determine whether to alert the user of the subsequent event.

FIG. 10C shows a user interface 1050 for displaying video information for a "Front Door" camera. As shown in FIG. 10C, the user interface 1050 includes an identifier 1052 for the camera, an image 1052 corresponding to the camera's field of view (e.g., a live image of the scene), a summary of events detected by the camera 1056, event information 1058 for a particular event (e.g., the event shown in FIG. 10A), a communication affordance 1064, and a people affordance 1066. In accordance with some implementations, the event information 1058 includes an image of the scene 1062 (e.g., corresponding to image 1010) at the time of the event and an image portion 1060 for the detected person (e.g., corresponding to image portion 1004). In accordance with some implementations, the communication affordance 1064 enables a user to communicate via the camera (e.g., outputs the user's voice via a speaker of the camera and/or outputs sounds captured by the camera via speakers of the client device). In accordance with some implementations, the communication affordance 1064 enables real-time two-way communication with a person at the camera. In accordance with some implementations, the communication affordance 1064 enables one-way audio communication with a person at the camera (e.g., relays the user's words to the person at the camera). In accordance with some implementations, the people affordance 1066 enables a user to view a listing of persons detected by the camera (e.g., involved in events detected by the camera) during a given time interval.

Figure 11A:
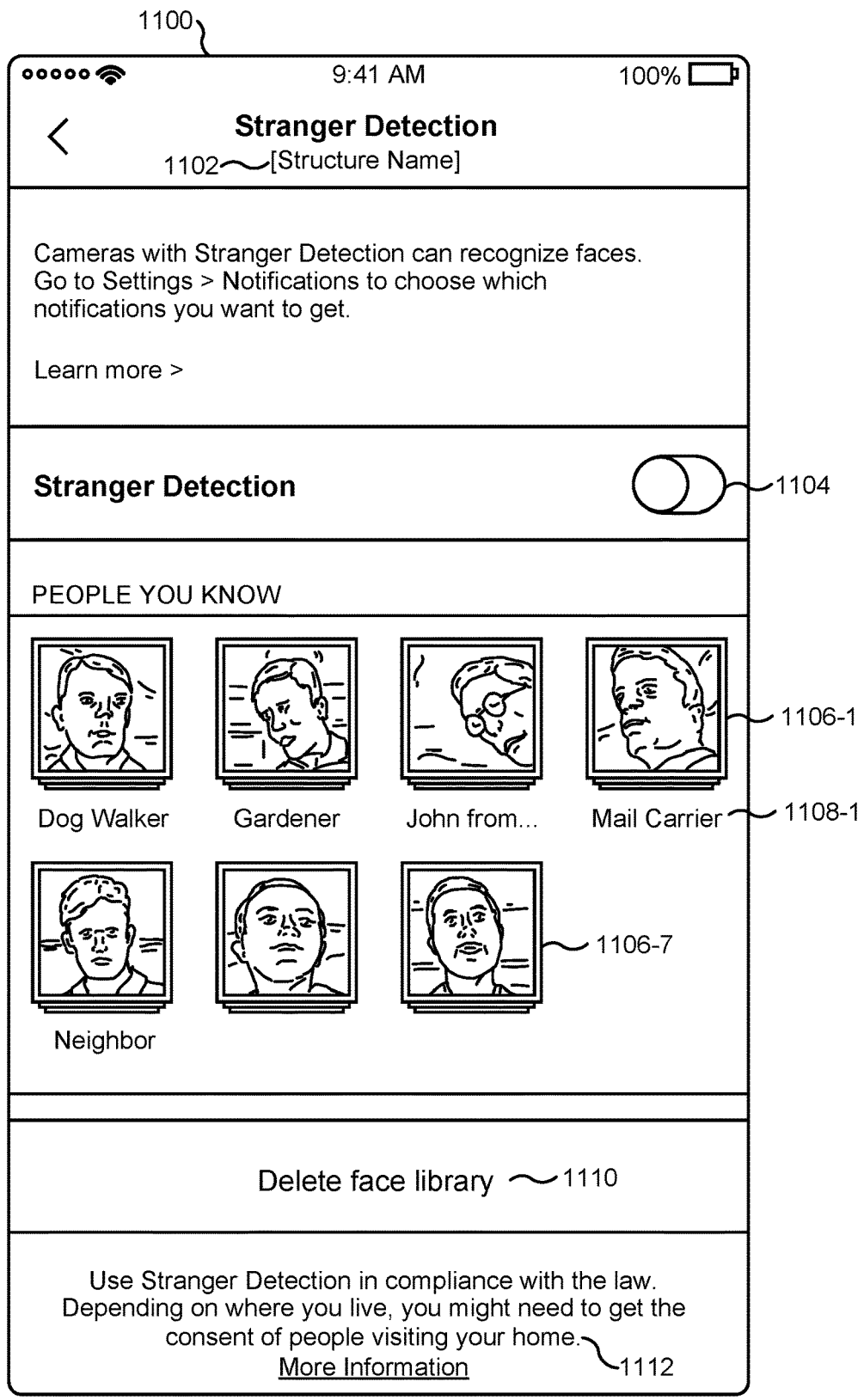
FIGS. 11A-11E are representative user interfaces for presenting detected person groups in accordance with some implementations.
Figure 11B:
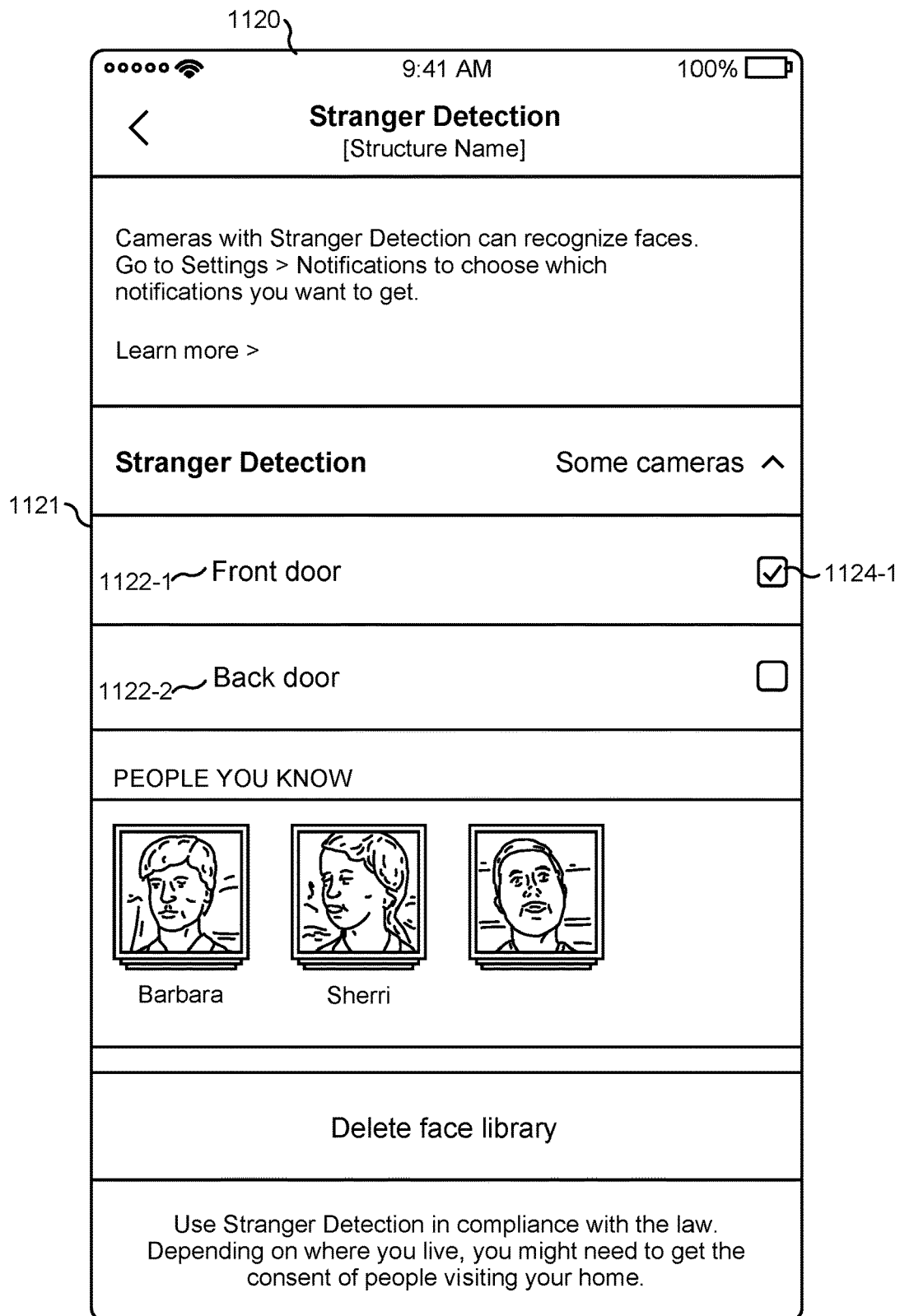
Figure 11C:
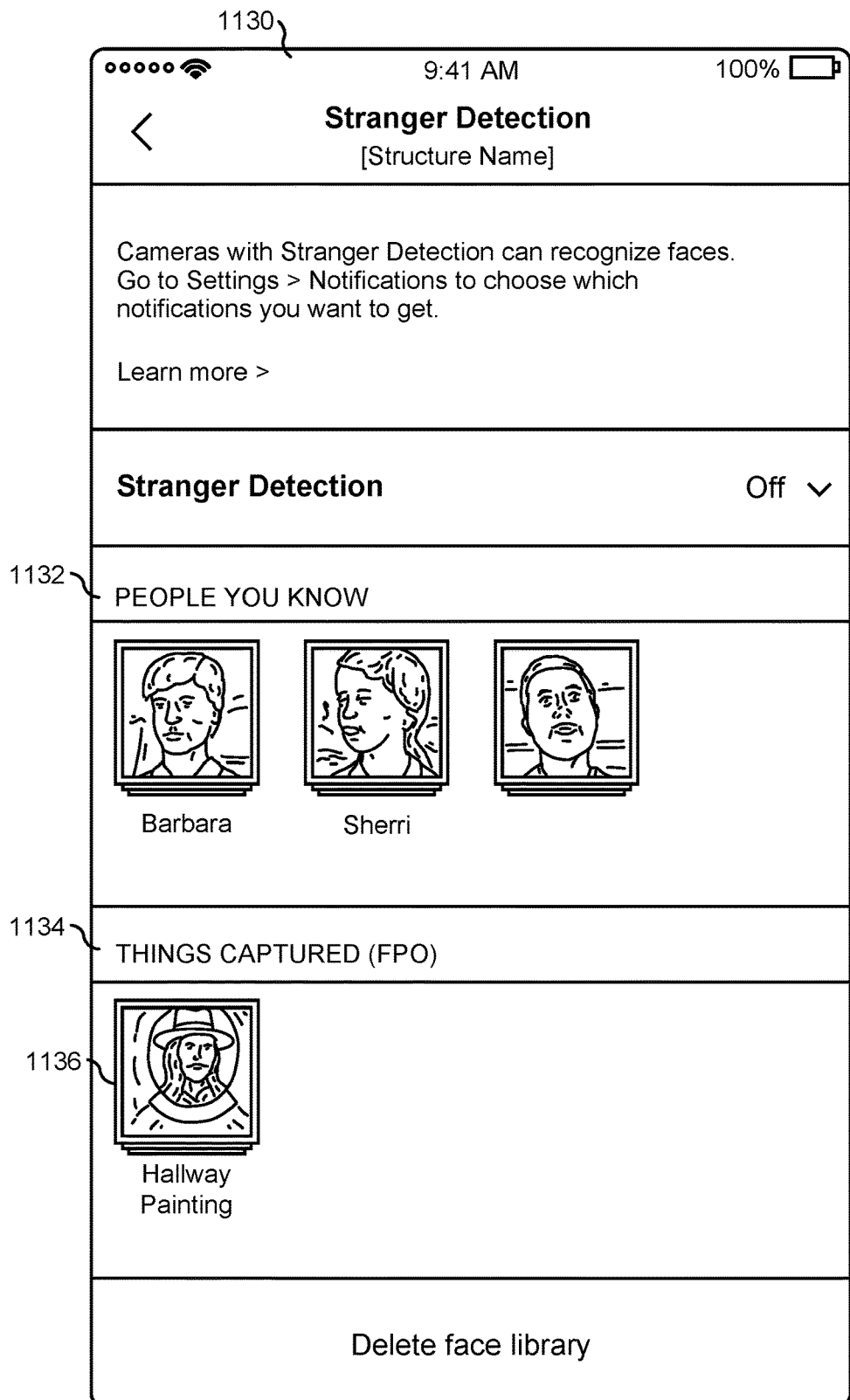
Figure 11D:
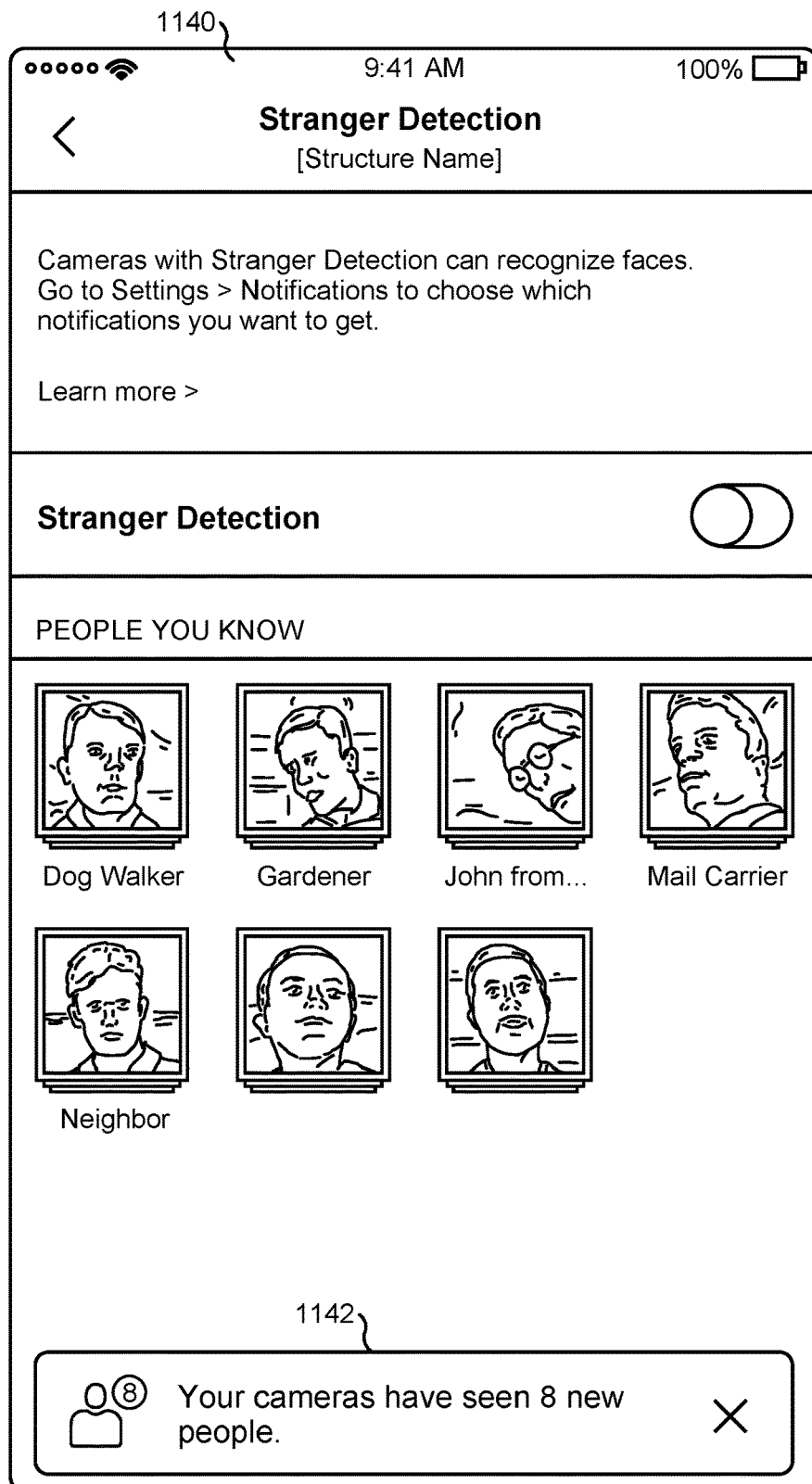

FIGS. 11A-11E are representative user interfaces for presenting detected person groups in accordance with some implementations. FIG. 11A shows a user interface 1100 showing persons information for a smart home environment. As shown in FIG. 11A, the user interface 1100 includes a label 1102 for the smart home environment, an affordance 1104 for enabling/disabling person detection, profile images 1106 (e.g., 1106-1 through 1106-7) representing known persons in the smart home environment, user labels 1108 corresponding to some of the profile images, a delete affordance 1110, and consent information 1112. In some implementations, the user is enabled to select a particular image group (e.g., the image group for 1106-7) and add or edit a label for the group. In some implementations, the user is enabled to rearrange the profile images (e.g., via drag and drop). In some implementations, the user is enabled to select the profile image for each person (e.g., by selecting the desired image then selecting a profile image affordance). In some implementations, selection of the delete affordance 1110 deletes all personally identifiable information previously stored by the smart home (e.g., including data stored at the server system 164 and the camera(s) 118). In some implementations, selection of the delete affordance 1110 deletes all personally identifiable information for a particular detected person. For example, a user may select the image 1106-1 and subsequently select the delete affordance 1110 to delete all personally identifiable information for the "mail carrier." In some implementations, disabling person detection via the affordance 1104 results in deletion of all personally identifiable information stored in the persons database (e.g., persons database 3180) for the smart home.

FIG. 11B shows a user interface 1120 displaying persons information for a smart home environment. As shown in FIG. 11B, the user interface 1120 includes a listing 1121 of the cameras in the smart home environment for which person detection can be enabled. In the example shown in FIG. 11B, the listing includes a label 1122 for each camera and a corresponding affordance 1124 to enable and disable person detection for the camera. In some implementations, the persons database is shared by all person detection devices within the smart home environment.

FIG. 11C shows a user interface 1130 displaying persons information for a smart home environment. As shown in FIG. 11C, the user interface 1130 includes a first section 1132 for detected persons and a second section 1134 for detected objects (e.g., objects resembling persons and/or objects previously classified by the system as persons). In the example of FIG. 11C, the second section 1134 includes a group 1136 for a hallway painting of a person. In some implementations, characterization data for detected objects is stored and used to prevent future notifications involving the objects (e.g., to avoid false positive person detection alerts).

FIG. 11D shows a user interface 1140 displaying persons information for a smart home environment. As shown in FIG. 11D, the user interface 1140 includes a notification 1142 that detected persons await classification by the user. In some implementations, a user is enabled to select the notification 1142 and, in response, a classification user interface is displayed (e.g., user interface 1000 or 1020). In some implementations, selection of the dismiss affordance on the notification 1142 results deletion of the unclassified persons personally identifiable information. In some implementations, selection of the dismiss affordance on the notification 1142 results in the notification 1142 not being displayed for a preset amount of time (e.g., 1 hour, 1 day, or 3 days). In some implementations, selection of the dismiss affordance on the notification 1142 results in the notification 1142 not being displayed until the smart home application is re-opened.

Figure 11E:
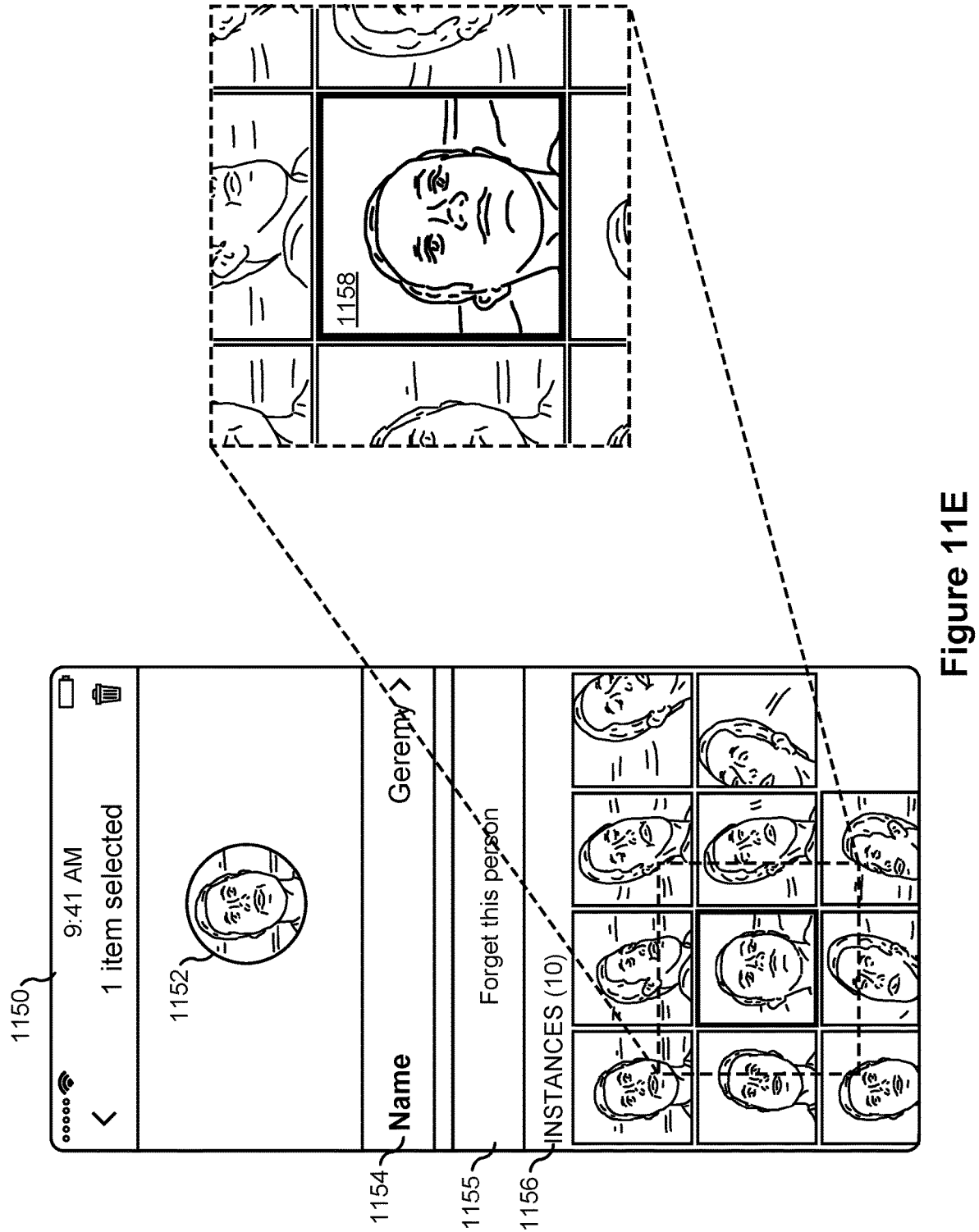

FIG. 11E shows a user interface 1150 displaying information for a particular person detected by the smart home environment. In some implementations, the user interface 1160 is displayed in response to a user selection of a profile image 1106 in FIG. 11A. As shown in FIG. 11E, the user interface 1150 includes a profile image 1152 for the person (sometimes also called a exemplar image or hero image), a label 1154 for the person, a delete affordance 1155, and a plurality of images 1156 associated with the person. In the example of FIG. 11E, the plurality of images 1156 include an image 1158 selected by a user. The image 1158 in this example is not an image of the particular person. In some implementations, the user is enabled to select the image 1158 and remove it from the particular person's library. In some implementations, removing the image 1158 also removes the characterization information corresponding to the image. In some implementations, the user is enabled to move the image to another preexisting image group or to a new image group based on whether the additional characterization information for the person in 1158 is stored in an existing group.

In light of the principles described above with reference to the figures, we now turn to certain implementations.

Some implementations include a method for recognizing a person in a video stream. In some implementations, the method includes: (1) obtaining a live video stream (e.g., via a camera 118); (2) detecting one or more persons in the live video stream (e.g., utilizing entity detection module 4422); (3) determining, from analysis of the live video stream, personally identifiable information (PII) that identifies a first person of the detected one or more persons (e.g., utilizing characterization module 4424); (4) determining, based on at least some of the personally identifiable information, that the first person is not a known person to the computing system (e.g., utilizing entity recognition module 4426); (5) in accordance with the determination that the first person is not a known person: (a) storing at least some of the personally identifiable information (e.g., storing it as characterization data 3184); and (b) requesting a user to classify the first person (e.g., utilizing user-facing frontend 3150); and (6) in accordance with (i) a determination that a predetermined amount of time has elapsed since the request was transmitted and a response was not received from the user, or (ii) a determination that a response was received from the user classifying the first person as a stranger, deleting the stored personally identifiable information (e.g., deleting the stored PII from persons database 3180).

In some implementations, the determination that the first person is not a known person is made by comparing the personally identifiable information (PII) with previously stored PII of one or more known persons (e.g., as illustrated in FIG. 7B). In some implementations, only a preset number of images are stored (e.g., 100, 200, or 300 images). In some implementations, if the preset number of images (e.g., 300) has already been stored for a particular person, a previously stored image is deleted and the new image is saved (e.g., the oldest previously stored image is deleted, or the previously stored image with the lowest determined quality is deleted). In some implementations, if the PII closely matches previously stored PII for the person, the image is not saved (e.g., too cumulative).

In some implementations, the predetermined amount of time is 1 day, 1 week, 2 weeks, or 1 month. In some implementations, the predetermined amount of time is equal to a subscription storage length associated with the computing system, or with a particular camera.

In some implementations, the classifications include one or more of: a known person, a trusted person, an authorized person, a stranger, an unknown person, etc. In some implementations, the user designates a person as trusted, known, or unknown. In some implementations, the designation is associated with the image and/or the PII of the first person (e.g., is included in associated person identifier 31841).

In some implementations, the computing system comprises one or more cameras (e.g., cameras 118) communicatively coupled to a remote server system (e.g., server system 164). In some implementations, storing at least some of the PII includes storing an image and corresponding PII (e.g., within persons data 522) for comparison with PII of subsequently detected persons. In some implementations, for each detected person, the method includes: (1) storing an image of the detected person and corresponding PII; (2) in accordance with a determination that the detected person is a known person to the computing system, associating the stored image and corresponding feature characterization information with a label for the known person; and (3) in accordance with a determination that the detected person is not a known person to the computing system, generating a new label for the stored image and corresponding feature characterization information.

In some implementations, determining the personally identifiable information includes: (1) selecting one or images of the first person from the live video stream; and (2) characterizing a plurality of features of the first person based on the one or more images. In some implementations, the plurality of features is characterized based on an analysis of only a portion of the image (e.g., image portion 704). In some implementations, a camera device (e.g., a camera 118) determines the portion and sends the portion of the image, but not the remainder of the image, to a server system (e.g., server system 164) for further analysis and recognition. In some implementations, the method further includes acquiring from the camera a higher quality version of the portion of the image (e.g., with more pixels) and performing the characterization on the higher quality version. In some implementations, the plurality of features includes one or more features that can personally identify the first person. In some implementations, the plurality of features includes one or more facial features of the first person. In some implementations, the method includes: (1) generating a facial signature for the first person based on the characterization of the plurality of features; and (2) determining that the first person is not a known person is based on a comparison of the generated facial signature with one or more previously stored facial signatures.

In some implementations, the method further comprises: (1) identifying a pose of the first person (e.g., performed by a camera 118); and (2) in accordance with a determination that an image of the first person in the identified pose has not previously been stored, storing (i) the image of the first person in the identified pose, and (ii) corresponding pose information (e.g., storing within persons database 3180). In some implementations, the method includes determining (e.g., by a camera 118 and/or a server system 164) and storing quality information for the image, timing information for the image, location information for the image, and the like.

In some implementations, the method further includes: (1) receiving, from the user, a designation that the first person is not a person; and (2) responsive to the designation, storing the designation in association with the personally identifiable information of the first person (e.g., as illustrated in FIG. 11C). In some implementations, the first person is an image of a person (e.g., a picture or a scene on a display). In some implementations, the first person is an animal rather than a person. In some implementations, the first person is a reflection or shadow of a person. In some implementations, future detections of the first person are not notified as a result of the first person being designated as not a person. In some implementations, future detections of the first person are notified as activity not involving a person.

In some implementations, the method further includes, in accordance with the determination that the first person is not a known person, generating a timely notification of detection of an unknown person. In some implementations, a timely notification is a notification sent within 10 seconds, 1 minute, 10 minutes, or 1 hour. In some implementations, the notification comprises a real-time notification sent within 5 seconds, 10 seconds, or 30 seconds. In some implementations, the notification includes a cropped portion of the image of the first person and a high resolution (e.g., 4K) version of the image showing the camera's field of view. In some implementations, the notification comprises one or more of: an email, a push notification, a text message, a voice message, and an audio alert (e.g., via an electronic assistant).

In some implementations, the method further includes: (1) detecting a second person in the live video stream; (2) characterizing a plurality of features of the second person based on one or more images of the second person in the live video stream; and (3) determining whether the second person is a same person as the first person by comparing the plurality of characterized features of the second person with the stored PII of the first person.

In some implementations, detecting the one or more persons includes detecting the one or more persons within a first predefined threshold time (e.g., 5 seconds, 10, seconds, or 30 seconds). For example, the camera is constrained to make a determination as to whether or not a particular image includes a person within the first predefined threshold time, so as to be able to make timely notifications to the user.

In some implementations: (1) the method further includes comparing the personally identifiable information of the first person with stored personally identifiable information of one or more persons previously classified by the user; and (2)

determining that the first person is not a known person comprises determining that the personally identifiable information of the first person does not match, within a predetermined threshold, the stored personally identifiable information of the one or more persons previously classified by the user.

In some implementations, the method further includes: (1) determining that the first person is a known person to the computing system; and (2) in accordance with the determination that the first person is a known person, forgoing requesting the user to classify the first person.

In some implementations, the method further includes forgoing generating a timely notification in accordance with the determination that the first person is a known person. In some implementations, the first person is determined to be a known person without having gone through an enrollment process (e.g., the person is determined to be a known person based on prior candid/unposed images).

In some implementations, the method further includes generating a timely notification identifying the first person in accordance with the determination that the first person is a known person. In some implementations, the method further includes: (1) determining a location of the first person; (2) determining whether the first person has previously been authorized by the user to access the location; and (3) generating the timely notification identifying the first person and the location in accordance with a determination that the first person has not previously been authorized to access the location. For example, a child may be allowed to play in the living room, but should not access the workshop, garage, or home office.

In some implementations, the method further includes: (1) detecting the first person by performing facial detection on a first frame in the live video stream; and (2) tracking the first person through time by analyzing a plurality of video frames in the live video stream, the plurality of video frames subsequent to the first frame. In some implementations, the detecting comprises analyzing the entire frame, whereas the tracking comprises analyzing only a portion of the frames (e.g., only an area at or around the location where the person was detected). In some implementations, the method further includes obtaining one or more additional live video streams; detecting one or more persons in the one or more additional live video streams; and determining whether any of the one or more persons in the one or more additional live video streams are known to the computing system. In some implementations, the method further includes determining, for each detected person of the one or more detected persons in the live video stream and the one or more detected persons in the one or more additional live video streams, whether the detected person is a same person as another of the one or more detected persons in the live video stream or the one or more detected persons in the one or more additional live video streams; and in accordance with a determination that a detected person is a same person as another detected person, tracking the detected person in all corresponding live video streams.

In some implementations, the method further includes: (1) for each video frame of the first frame and the plurality of video frames, determining an identification quality factor for the video frame; (2) selecting one or more video frames of the first frame and the plurality of video frames based on the determined identification quality factors; and (3) determining personally identifiable information based on an analysis of the selected one or more images.

In some implementations, the method further includes: (1) determining an activity of the first person based on the tracking of the first person; and (2) sending a notification with identification of the first person and the determined activity. In some implementations, the system sends the notification to a user. In some implementations, based on the determined activity, the system sends a notification to the first person (e.g., in addition to, or alternative to, sending a notification to the user). In some implementations, the server system 164 instructs the camera that recorded the live video stream (or a nearby device) to provide an audible and/or visual alert upon determining that the activity is a nefarious activity (e.g., stealing a package, looking in a window, breaking a window, kicking a door, etc.). In some implementations, the audible alert comprises a verbal warning to the first person. In some implementations, the verbal warning includes reference to one or more detected qualities of the first person (e.g., the color and/or type of the first person's clothing). For example, the first person is wearing a hat and red jacket and the verbal warning says "You, with the hat and the red jacket, stop what you are doing."

In some implementations, the method further includes providing a notification to the first person in accordance with the determination that the first person is not a known person. In some implementations, the server system 164 instructs the camera that recorded the live video stream (or another device within audible range of the first person) to emit an audible alert, such as a siren or verbal warning. In some implementations, the system instructs the camera that recorded the live video stream (or another device within visual sight of the first person) to provide a visual alert, such as activation of a light or light ring (e.g., a red light ring). In some implementations, the system determines a time of day for the detection of the first person and provides a notification based on the time of day (e.g., provides a notification upon determining that it is night-time).

In some implementations a method includes: (1) obtaining a plurality of images collected by one or more video cameras in a smart home environment, each image of the plurality of images including a detected person; (2) for each image of the plurality of images, obtaining personally identifiable information of the detected person, the personally identifiable information generated from analysis of the image; (3) grouping the plurality of images into a first group of a plurality of groups based on the personally identifiable information, each group of the plurality of groups representing a unique one of a plurality of detected persons; (4) receiving from a user a request to remove a first image from the first group; and (5) in response to the request: (a) removing the first image from the first group; and (b) disassociating the corresponding personally identifiable information from the first group. In some implementations, the plurality of images includes a plurality of image portions cropped from video feeds of the video cameras, each image portion including a detected person. In some implementations, the plurality of images is grouped based on similarities in the personally identifiable information (PII).

In some implementations: (1) the method further includes presenting to the user one or more images of the first group, including presenting the first image; and (2) the user request to remove the first image corresponds to a user selection of the first image and a subsequent user action.

In some implementations, the method further includes: (1) obtaining a new image including the detected person; (2) obtaining new personally identifiable information of the detected person, the new personally identifiable information generated from analysis of the new image; (3) determining that the new image includes the detected person based on a comparison of the new personally identifiable information with personally identifiable information associated with the first group; and (4) in accordance with the determination that the new image includes the detected person: (a) including the new image in the first group; and (b) associating the new personally identifiable information with the first group.

In some implementations, the method further includes, for each group of the plurality of groups, selecting an image of the group as a profile image for the group.

In some implementations, the profile image is selected based on a determined mood of the detected person in each image. In some implementations, only images of the person while happy are considered for the profile image. In some implementations, the image is selected based on a quality factor for each image. In some implementations, the image is selected based on a pose of the person in each image (e.g., only frontal images are considered).

In some implementations, the method further includes displaying a listing of the one or more groups, the listing including display of the profile image for each group. In some implementations, the listing includes one or more labels for each group (e.g., user labels such as the person's name and/or automated labels such as "Unidentified Person 1".

In some implementations, the method further includes displaying an event timeline corresponding to at least one of the one or more video cameras, including: (1) displaying on the timeline indication of one or more detected events; and (2) for at least one of the one or more detected events, displaying one or more profile images corresponding to one or more persons in the detected event.

In some implementations, the plurality of images are grouped into the first group in response to a determination that the personally identifiable information corresponding to each image in the plurality of images is within a similarity threshold to other personally identifiable information for the first group. In some implementations, in accordance with a determination that the PII is within a threshold amount to at least one PII of the first group, the image and PII is deemed to be of the first group. In some implementations, in accordance with a determination that the PII is within a threshold amount to an average or mean PII set for the group, the image and PII is deemed to be of the first group.

In some implementations, the method further includes, for a first image of the plurality of images, adjusting the personally identifiable information based on a determined pose of the person in the image. In some implementations, the pose is normalized when determining the PII (e.g., a person's facial features are extrapolated from a profile-view image of the person).

In some implementations, the o method further includes, for a first image of the plurality of images, adjusting the personally identifiable information based on a camera operating mode. For example, the PII is adjusted to account for the camera being in a low-light mode (e.g., when determining skin tone, hair color, eye color, etc.). In some implementations, PII from low-light mode images is only compared with other PII from low-light mode images.

In some implementations: (1) the request to remove the first image comprises a request to assign the first image to a different group of the plurality of groups; (2) removing the first image from the first group comprises assigning the first image to the different group; and (3) disassociating the personally identifiable information of the first image comprises associating the personally identifiable information with the different group. For example, the user indicates that one of the images was incorrectly deemed to include the same detected person and instead includes a different person known to the user. In some implementations, the different group comprises a new group.

In some implementations, the method further includes: (1) receiving from the user a request to remove a group of the plurality of groups; and (2) in response to the request: (a) deleting all images in the group; and (b) deleting corresponding personally identifiable information.

In some implementations, the personally identifiable information comprises facial feature information of the detected person. In some implementations, the personally identifiable information comprises a feature signature for the detected person, the feature signature generated based on analysis of the image.

In some implementations, the method further includes: (1) receiving, from the user, identification information of the detected person for the first group; and (2) removing the first group from the plurality of groups based on the received identification information.

In some implementations: (1) the identification information indicates that the detected person is a stranger to the user; and (2) removing the first group comprises deleting (i) all images in the first group, and (ii) the corresponding personally identifiable information.

In some implementations: (1) the identification information indicates an identity of the detected person; and (2) removing the first group comprises combining the first group with another group representing the same identity. For example, the user identifies the group has images of Joe and the group is combined with another group of images for Joe.

In some implementations: (1) the request to remove the first image comprises a request to delete the first image; (2) removing the first image from the group comprises deleting the first image; and (3) disassociating the personally identifiable information of the first image comprises deleting the personally identifiable information.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method comprising:
   at a computing system having one or more processors and memory:
   obtaining a live video stream;
   detecting a first person in the live video stream;
   responsive to the detection of the first person in the live video stream, determining, from analysis of the live video stream, first information that identifies an attribute of the first person;
   determining, based on at least some of the first information, that the first person is not identifiable to the computing system;
   storing in a database at least some of the first information; and
   in response to: (i) a determination that the first person is a stranger or (ii) not receiving a user classification of the first person within an amount of time,
   deleting the at least some of the stored first information or a portion of the at least some of the stored first information.

2. The method of claim 1, wherein determining the first information comprises:
   selecting one or more images of the first person from the live video stream; and
   characterizing a plurality of features of the first person based on the one or more images.

3. The method of claim 2, further comprising:
   identifying a pose of the first person in each of the one or more images; and
   for each identified pose, in accordance with a determination that an image of the first person in the identified pose has not previously been stored, storing (i) the image of the first person in the identified pose, and (ii) corresponding pose information.

4. The method of claim 2, wherein the plurality of features includes one or more features that can personally identify the first person.

5. The method of claim 2, wherein the plurality of features includes one or more facial features of the first person.

6. The method of claim 1, wherein:
   detecting the first person comprises detecting an entity in the live video stream; and
   the method further comprises:
   receiving, from the user, a designation that the detected entity is not a person; and
   responsive to the designation, storing the designation in association with the first information of the first person.

7. The method of claim 1, further comprising, in accordance with the determination that the first person is not identifiable, generating a timely notification of detection of an unknown person.

8. The method of claim 1, further comprising:
   detecting a second person in the live video stream;
   characterizing a plurality of features of the second person based on one or more images of the second person in the live video stream; and
   determining whether the second person is a same person as the first person by comparing the plurality of characterized features of the second person with the stored first information regarding a plurality of characterized features of the first person.

9. A computing system comprising:
   one or more processors; and
   memory coupled to the one or more processors, the memory storing one or more programs configured to be executed by the one or more processors, the one or more programs including instructions for:
   obtaining a live video stream;
   detecting a first person in the live video stream;
   responsive to the detection of the first person in the live video stream, determining, from analysis of the live video stream, first information that identifies an attribute of the first person;
   determining, based on at least some of the first information, that the first person is not identifiable to the computing system;
   storing in a database at least some of the first information; and
   in response to: (i) a determination that the first person is a stranger or (ii) not receiving a user classification of the first person within an amount of time,
   deleting the at least some of the stored first information or a portion of the at least some of the stored first information.

10. The system of claim 9, wherein detecting the first person comprises detecting the first person within a first predefined threshold time.

11. The system of claim 9, wherein the one or more programs further include instructions for comparing the first information of the first person with stored first information of the first person previously classified by the user; and
    wherein determining that the first person is not identifiable comprises determining that the first information of the first person does not match, within a predetermined threshold, the stored first information of the first person previously classified by the user.

12. The system of claim 9, wherein the one or more programs further include instructions for:
    determining that the first person is identifiable to the computing system; and
    in accordance with the determination that the first person is identifiable, forgoing receiving the user classification of the first person.

13. The system of claim 12, wherein the one or more programs further include instructions for forgoing generating a timely notification in accordance with the determination that the first person is identifiable.

14. The system of claim 12, wherein the one or more programs further include instructions for generating a timely notification identifying the first person in accordance with the determination that the first person is identifiable.

15. The system of claim 14, wherein the one or more programs further include instructions for:
    determining a location of the first person;
    determining whether the first person has previously been authorized by the user to access the location; and
    wherein generating the timely notification identifying the first person comprises generating the timely notification identifying the first person and the location in accordance with a determination that the first person has not previously been authorized to access the location.

16. A non-transitory computer-readable storage medium storing one or more programs, the one or more programs comprising instructions, which when executed by a computing system, cause the system to:
    obtain a live video stream;
    detect a first person in the live video stream;

responsive to the detection of the first person in the live video stream, determine, from analysis of the live video stream, first information that identifies an attribute of the first person;

determine, based on at least some of the first information, that the first person is not identifiable to the computing system;

store in a database at least some of the first information; and in response to: (i) a determination that the first person is a stranger or (ii) not receiving a user classification of the first person within an amount of time, delete the at least some of the stored first information or a portion of the at least some of the stored first information.

17. The non-transitory computer-readable storage medium of claim 16, wherein the one or more programs further comprise instructions, which when executed by the computing system, cause the system to:

detect the first person by performing facial detection on a first frame in the live video stream; and track the first person through time by analyzing a plurality of video frames in the live video stream, the plurality of video frames subsequent to the first frame.

18. The non-transitory computer-readable storage medium of claim 17, wherein the one or more programs further comprise instructions, which when executed by the computing system, cause the system to:

for each video frame of the first frame and the plurality of video frames, determine an identification quality factor for the video frame;

select one or more video frames of the first frame and the plurality of video frames based on the determined identification quality factors; and wherein determining the first information comprises determining first information based on an analysis of the selected one or more video frames.

19. The non-transitory computer-readable storage medium of claim 17, wherein the one or more programs further comprise instructions, which when executed by the computing system, cause the system to:

determine an activity of the first person based on the tracking of the first person; and send a notification with identification of the first person and the determined activity.

20. The non-transitory computer-readable storage medium of claim 16, wherein the one or more programs further comprise instructions, which when executed by the computing system, cause the system to provide a notification to the first person in accordance with the determination that the first person is not identifiable.

\* \* \* \* \*